United States Patent
Johnson et al.

(10) Patent No.: US 10,203,134 B2
(45) Date of Patent: Feb. 12, 2019

(54) SOLID STATE SOLAR THERMAL ENERGY COLLECTOR

(71) Applicants: Richard Lee Johnson, Suffolk, VA (US); Braden Eric Hines, Pasadena, CA (US); Guido Hamacher, San Diego, CA (US); Russ Neff, Glendale, CA (US); John Terry Bailey, Greenville, SC (US)

(72) Inventors: Richard Lee Johnson, Suffolk, VA (US); Braden Eric Hines, Pasadena, CA (US); Guido Hamacher, San Diego, CA (US); Russ Neff, Glendale, CA (US); John Terry Bailey, Greenville, SC (US)

(*) Notice: Subject to any disclaimer, the term of this patent is extended or adjusted under 35 U.S.C. 154(b) by 55 days.

(21) Appl. No.: 14/949,588

(22) Filed: Nov. 23, 2015

(65) Prior Publication Data

US 2016/0146507 A1 May 26, 2016

Related U.S. Application Data

(60) Provisional application No. 62/083,297, filed on Nov. 23, 2014.

(51) Int. Cl.
*F24J 2/38* (2014.01)
*F24S 60/00* (2018.01)
(Continued)

(52) U.S. Cl.
CPC .............. *F24S 60/00* (2018.05); *C02F 1/14* (2013.01); *F03D 9/007* (2013.01); *F24S 20/25* (2018.05);
(Continued)

(58) Field of Classification Search
CPC .. F24S 60/00; F24S 23/79; F24S 23/12; F24S 20/25
(Continued)

(56) References Cited

U.S. PATENT DOCUMENTS

| 608,755 | A | * | 8/1898 | Cottle | F24J 2/07 |
| | | | | | 126/620 |
| 965,391 | A | * | 7/1910 | Little | F24J 2/0494 |
| | | | | | 126/620 |

(Continued)

FOREIGN PATENT DOCUMENTS

| DE | 3405466 A1 | 8/1985 |
| WO | WO 2007/058834 A2 | 5/2007 |

(Continued)

OTHER PUBLICATIONS

Ho, Clifford K., "High Temperature Falling Particle Receiver", Power Point Presentation, Apr. 23-25, 2013, 28 pages, SunShot CSP Program Review, Phoenix, AZ.

(Continued)

*Primary Examiner* — Vivek Shirsat
(74) *Attorney, Agent, or Firm* — Lewis Roca Rothgerber Christie LLP

(57) ABSTRACT

A system for receiving, transferring, and storing solar thermal energy. The system includes a concentrating solar energy collector, a transfer conduit, a thermal storage material, and an insulated container. The insulated container contains the thermal storage material, and the transfer conduit is configured to transfer solar energy collected by the solar energy collector to the thermal storage material through a wall of the insulated container.

27 Claims, 43 Drawing Sheets

(51) Int. Cl.
| | |
|---|---|
| F24S 80/60 | (2018.01) |
| C02F 1/14 | (2006.01) |
| F03D 9/00 | (2016.01) |
| F28D 20/00 | (2006.01) |
| F24S 23/00 | (2018.01) |
| F24S 20/25 | (2018.01) |
| F24S 23/79 | (2018.01) |
| F24S 30/45 | (2018.01) |
| F24S 23/30 | (2018.01) |
| F24S 23/77 | (2018.01) |
| F24S 50/20 | (2018.01) |

(52) U.S. Cl.
CPC ............... *F24S 23/00* (2018.05); *F24S 23/12* (2018.05); *F24S 23/31* (2018.05); *F24S 23/77* (2018.05); *F24S 23/79* (2018.05); *F24S 30/45* (2018.05); *F24S 80/60* (2018.05); *F28D 20/0056* (2013.01); *F24S 50/20* (2018.05); F28D 2020/006 (2013.01); F28D 2020/0026 (2013.01); F28F 2270/00 (2013.01); Y02A 20/212 (2018.01); Y02B 10/20 (2013.01); Y02E 10/43 (2013.01); Y02E 10/44 (2013.01); Y02E 10/47 (2013.01); Y02E 10/72 (2013.01); Y02E 60/142 (2013.01); Y02E 70/30 (2013.01)

(58) Field of Classification Search
USPC .................................. 126/617, 670, 640–642
See application file for complete search history.

(56) References Cited

U.S. PATENT DOCUMENTS

| | | | | |
|---|---|---|---|---|
| 2,553,073 | A * | 5/1951 | Barnett ................... | F24J 2/0494 126/638 |
| 3,985,119 | A * | 10/1976 | Oakes, Jr. .............. | F24S 30/452 126/600 |
| 4,026,267 | A * | 5/1977 | Coleman .................... | F24J 2/06 126/617 |
| 4,471,760 | A * | 9/1984 | Wille ......................... | F24J 2/28 126/620 |
| 4,686,959 | A * | 8/1987 | Marksberry .......... | F24H 7/0416 126/400 |
| 5,479,913 | A | 1/1996 | Adams | |
| 8,000,018 | B2 | 8/2011 | Benitez et al. | |
| 8,167,041 | B2 * | 5/2012 | Chiesa .................... | E21B 43/24 126/688 |
| 8,640,689 | B1 | 2/2014 | Kribus et al. | |
| 8,674,541 | B2 | 3/2014 | Peitzke et al. | |
| 8,791,355 | B2 | 7/2014 | Haight et al. | |
| 2008/0000231 | A1 | 1/2008 | Litwin et al. | |
| 2008/0092877 | A1 | 4/2008 | Monsebroten | |
| 2008/0245401 | A1 | 10/2008 | Winston et al. | |
| 2009/0260619 | A1 * | 10/2009 | Bailey ........................ | F24J 2/07 126/578 |
| 2010/0109601 | A1 | 5/2010 | Coyle et al. | |
| 2010/0212660 | A1 | 8/2010 | Schilder | |
| 2010/0282295 | A1 * | 11/2010 | Gomery ..................... | F24J 2/16 136/246 |
| 2010/0326424 | A1 | 12/2010 | Bennett | |
| 2011/0179791 | A1 * | 7/2011 | Butler ....................... | F24J 2/16 60/641.15 |
| 2011/0220096 | A1 | 9/2011 | Margankunte et al. | |
| 2011/0283995 | A1 | 11/2011 | Kesseli et al. | |
| 2012/0080161 | A1 | 4/2012 | Kelly | |
| 2012/0132398 | A1 | 5/2012 | Jeter et al. | |
| 2012/0216863 | A1 * | 8/2012 | Wen .......................... | F24J 2/06 136/259 |
| 2013/0098036 | A1 * | 4/2013 | Falcey ...................... | F03G 6/06 60/641.15 |
| 2013/0223826 | A1 | 8/2013 | Bruce et al. | |
| 2014/0334007 | A1 | 11/2014 | Monreal | |

FOREIGN PATENT DOCUMENTS

| | | |
|---|---|---|
| WO | WO 2009/004476 A2 | 1/2009 |
| WO | WO 2009/129233 A2 | 10/2009 |
| WO | WO 2014/031605 A1 | 2/2014 |
| WO | WO2014/072952 A1 | 5/2014 |

OTHER PUBLICATIONS

Roos, Thomas, "Thermal Storage Options for CSP", Power Point Presentation, Sep. 4-5, 2012, 20 pages, CSIR, Solar Energy Africa, Cape Town, South Africa.
Tian, Yuan et al., "A Review of Solar Collectors and Thermal Energy Storage in Solar Thermal Applications", Applied Energy, 2013, 56 pages, vol. 104.
Website: "Edisun Heliostats Obtains Approval-In-Concept From Nelha Board for Energy Project", Natural Energy Laboratory of Hawaii Authority, http://nelha.hawaii.gov/main/edisun-heliostats-obtains-approval-in-concept-from-nelha-board-for-energy-project/, printed Jun. 17, 2016, (2 pages).
Website: "Graphite Storage—How It Works", Remote Area Power Systems, ESM, https://web.archive.org/web/20140125163016/http://rapsystems.com.au/esm.html, printed Jun. 17, 2016, (2 pages).
Website: "Grid Scale Energy Storage", Ares North America, http://www.aresnorthamerica.com/grid-scale-enero-storage, printed Jun. 17, 2016, (2 pages).
Website: "Nonimaging optics", Wikipedia, https://en.wikipedia.orci/wiki/Nonimaging_optics, printed Jun. 17, 2016, (14 pages).
Website: "Project Profile: High-Temperature Falling-Particle Receiver", U.S. Department of Energy, http://energy.gov/eere/sunshot/proiect-profile-high-temperature-falling-particle-receiver, printed Jun. 17, 2016, (3 pages).
Website: "Sopogy MicroCSP: Solar Thermal, Simplified", Sopogy, https://web.archive.org/web/20130825194712/http://www.sopogy.com/, printed Jun. 17, 2016, (2 pages).
Website: "Standardised Graphite Panel Design", Graphite Energy, http://www.graphiteenergy.com/sgpd.php, printed Jun. 17, 2016, (3 pages).
Winston, R., "Nonimaging Optical Systems", Nonimaging Optics, Dec. 22, 2004, 26 pages, Academic Press.
International Search Report and Written Opinion issued in corresponding Int'l Application No. PCT/US15/062193, dated Feb. 12, 2016, 12 pages.
Levinson, R., "5 Reasons Why the Off Grid Solar Revolution will be Driven by Cell Phones," https://gigaom.com/2012/12/07/5-reasons-why-the-off-grid-solar-revolution-will-be-driven-by-cell-phones/; Dec. 7, 2012, 10 pages.
"Solar Enhanced Oil Recovery, an in Country Value Assessment for Oman," http://www.ey.com/Publication/vwLUAssets/EY-Solar-enhanced-oil-recovery-in-Oman-January-2014/$FILE/EY-Solar-enhanced-oil-recovery-in-Oman-January-2014.pdf Jan. 2014, 55 pages.
Micangeli, A. et al., Sustainability after the Thermal Energy Supply in Emergency Situations: The Case Study of Abruzzi Earthquake (Italy). Sustainability, vol. 5, No. 8, Aug. 14, 2013, 13 pages, http://www.dmpi.com/2071-1050/5/8/3513.
European Patent Office Extended Search Report, dated May 8, 2018, for Patent Application No. 15860538.6, 11 pages.
Examination Report for AU 2015349641, dated Feb. 12, 2018, 4 pages.

* cited by examiner

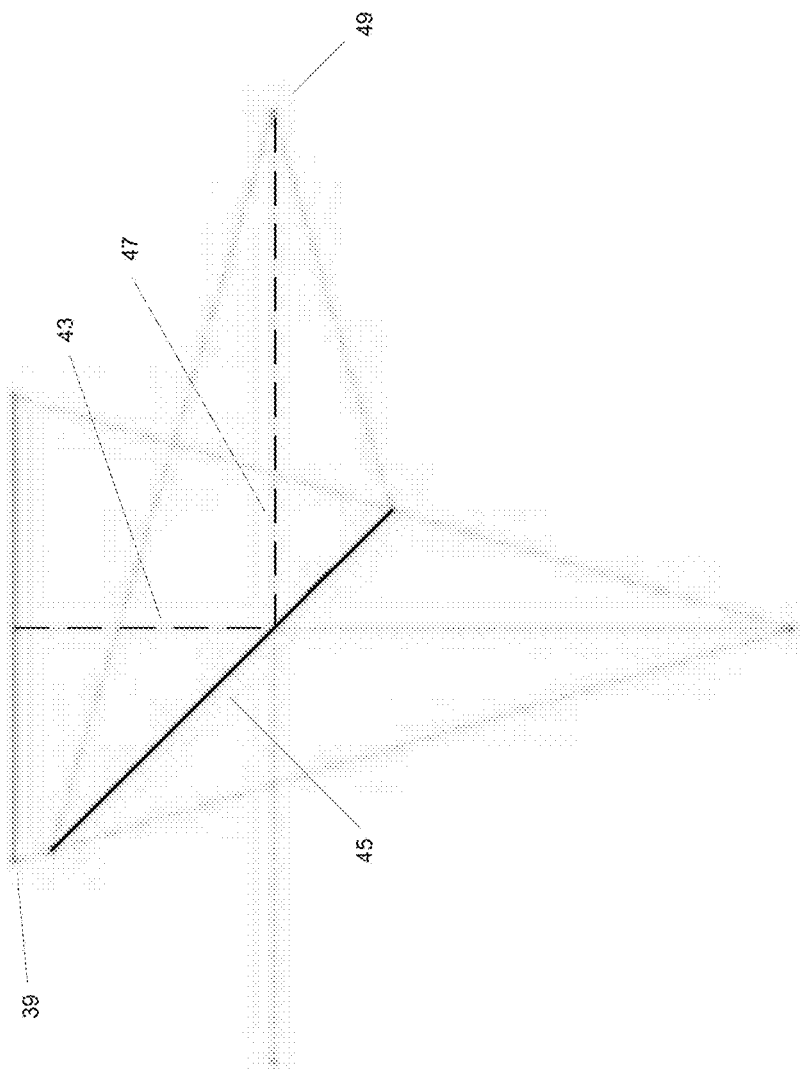

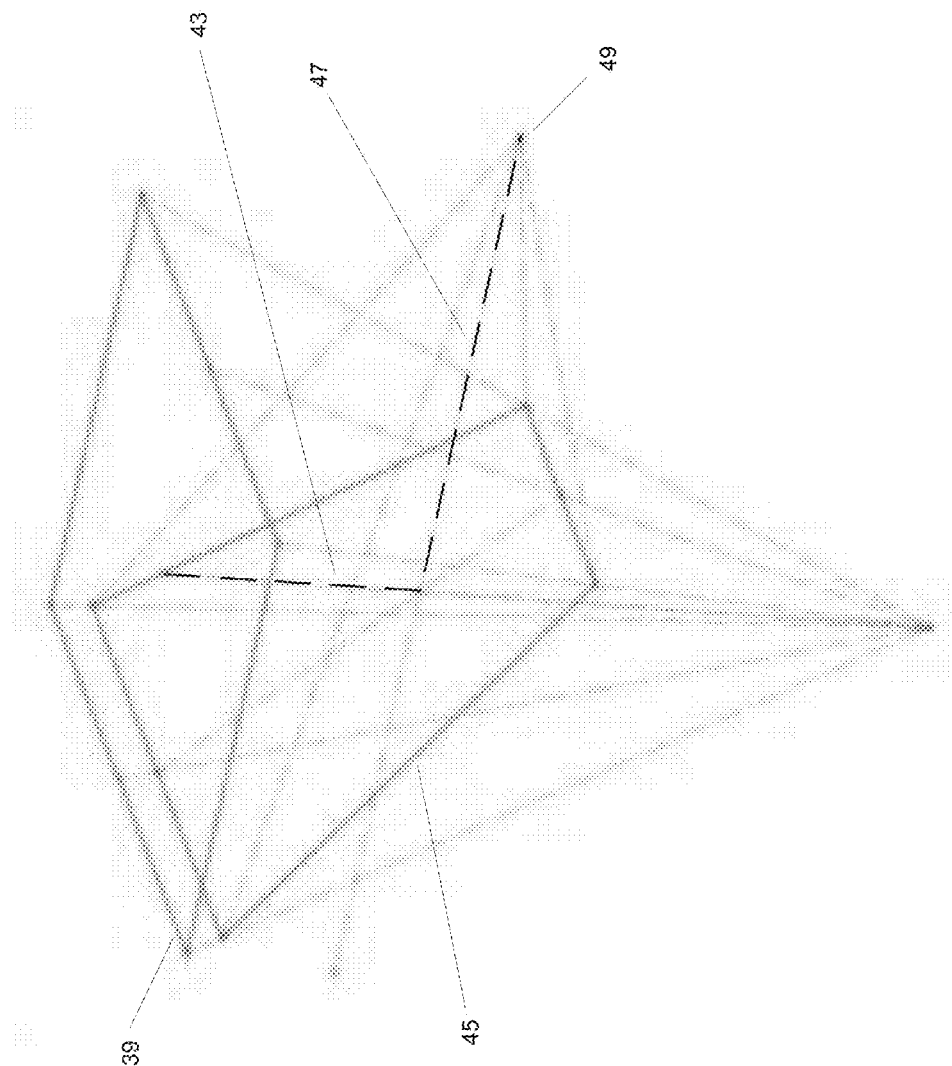

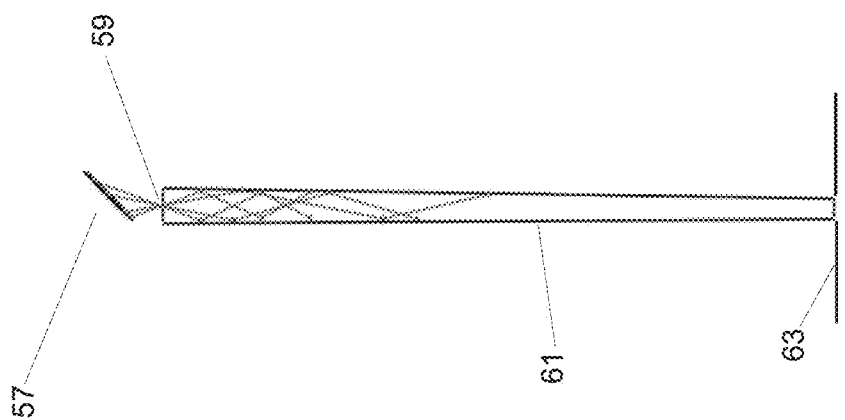

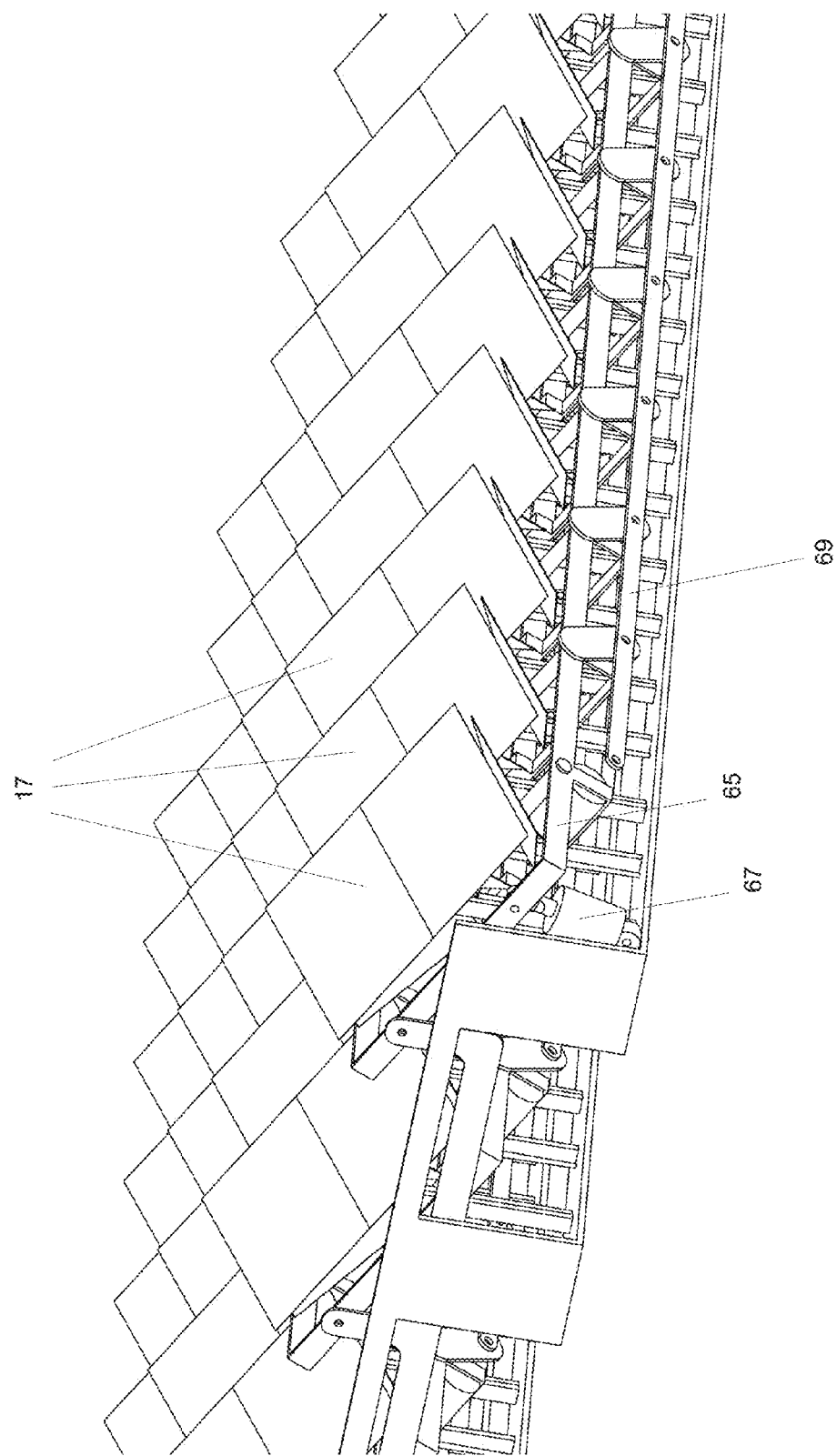

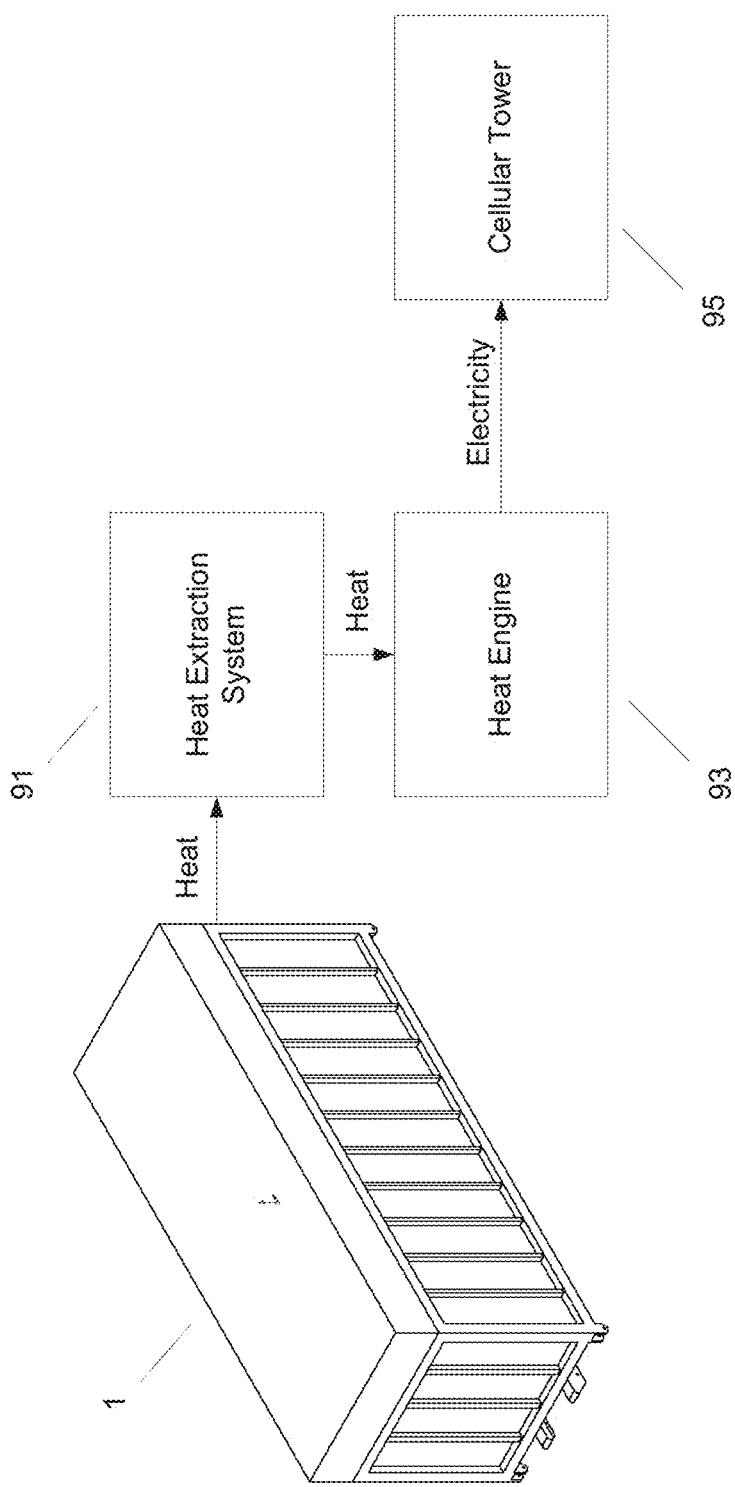

SOLID STATE SOLAR THERMAL ENERGY COLLECTOR

PRIORITY CLAIM

The present non-provisional patent application claims under 35 USC § 119(e) priority to and the benefit of U.S. Provisional Patent Application having Ser. No. 62/083,297, filed on Nov. 23, 2014, and titled SOLID STATE SOLAR THERMAL ENERGY COLLECTOR, wherein the entirety of said provisional patent application is incorporated herein by reference.

FIELD

The invention relates generally to the field of solar energy, specifically solar thermal energy. The solar heat that is collected may either be used directly as heat or to generate electricity. The invention also relates generally to the field of solar energy storage.

BACKGROUND

The field of solar thermal energy is well established in the prior art. In one form, solar collectors and receivers are arranged into so-called concentrating solar power (CSP) systems. CSP systems traditionally involve large arrays of mirrors that reflect the sun to a focal point or line, where the intense concentrated sunlight is used to heat fluid. Systems that focus light to a point are generally known as "power tower" or just "tower" systems, in reference to the tall tower that supports the energy collector at the focus of the array of mirrors. Systems that focus light to a line are generally known as "trough" systems, since the long linear focusing mirrors resemble large troughs.

In some systems, this fluid (typically water, which is turned into steam) is used directly to produce electric energy. This is often accomplished by using steam to spin a turbine which drives a generator. In other systems, an intermediate fluid is heated, and then used to produce energy, by likewise using the hot fluid to produce steam. Other approaches are also known, such as using the heat to produce very hot air which drives a gas turbine.

In some cases, the intermediate fluid is stored in a tank for use later. By way of example, there are commercial systems in operation today that use molten salt as the heat transfer fluid, and store the heated salt in large tanks, until such time as energy production is desired, thus providing for the ability to store the collected solar energy for use at a later time.

Another less commonly used approach to generate electricity from solar thermal energy is called a Solar Updraft Tower. In its traditional form, it comprises a chimney in fluid communication with a greenhouse that surrounds it. The greenhouse is open around its outside perimeter, and serves as an air inlet. Sunlight warms the ground under the greenhouse, which causes air to flow towards and then up the chimney, driven by natural convection. Wind turbines placed at the base of or inside the chimney are used to generate electricity.

There is one well-publicized example of storing the solar energy directly in a solid. The Australian company Graphite Energy has demonstrated a system that uses a field of mirrors to heat a large central block of graphite, weighing many tons, that is located at the top of a tall tower. The mirrors focus on the bottom of the block of graphite. The large thermal mass of the graphite block means that it can be used to store energy just as the tanks of molten salt do at other CSP plants. Pipes run through the graphite block to allow the energy to be transferred into a heat transfer fluid or working fluid (which flows through the pipes) when energy production is desired.

Likewise, residential- and commercial-scale solar thermal energy systems are also well known, most often used for heating water. Residential systems typically include a large, well-insulated tank to hold the heated water, since, while energy collection is mostly during the middle of the day, the heated water is generally used mostly in the morning. This tank can add substantially to the cost of the system.

In general, presently marketed commercial and residential systems are based on heating a liquid. If storage is desired, the heated liquid is then stored in a tank.

Unfortunately, storage tanks, and the associated plumbing, valves, pumps, and controls add cost to both residential/commercial and utility-scale systems. Further, these pumps, valves, tanks, and plumbing can be expensive, especially in utility-scale systems where the temperatures are very high, and the materials somewhat exotic. (A pump capable of reliably pumping molten salt at 540° C. is not a common item, and many of the tanks and tubes for use with molten salt have to be made of expensive stainless steel that is capable of withstanding high temperatures.)

CSP using molten salt makes use of this fluid as both a heat transfer fluid, which conveys the heat energy away from the receiver, and as a storage material, which stores the heat energy for later use. While this may seem an efficient use of a resource, combining these functions into a common material ends up making compromises in the performance of both functions.

It would be beneficial to have a system in which distinct materials, that are specifically chosen for each role, perform the heat transfer and energy storage functions, allowing each to perform its role more efficiently.

It would likewise be desirable to be able to store energy without having to handle liquids. The Graphite Energy system has addressed this by providing a very large block of graphite. However, such an enormous block of graphite is itself an exotic item, and there is substantial expense involved in erecting a tower capable of supporting the block, and in fabricating the block with embedded plumbing to allow heat extraction. A further drawback of this system is that it is not extensible to large solar fields, since only mirrors that are close to the graphite block have a clear view of the bottom of the block.

It would be beneficial to have a system that provided the advantages of solid state energy storage, without requiring the solid material to be in an exotic form or placed so high in the air.

One attempt to provide an alternative system has been to embed pipes into blocks of graphite or concrete located on the ground, such as the systems from NEST (pipes in blocks of concrete) or from RAPS Systems (pipes in blocks of graphite). In these systems, heat collection takes place away from the storage system and the heat is piped to the storage medium. Such a system naturally incurs losses during heat absorption, transport, injection, and extraction, and there is significant cost in deploying a system whose only function is energy storage (as compared to systems like molten salt CSP that make dual use of the molten salt as a heat transfer fluid and an energy storage medium).

Other prior art systems have been proposed that use bundles of optical fibers to transport concentrated sunlight across a distance to a remote location where the bundle comes together with other bundles to heat a storage material, such as molten salt. However, these fiber bundles are very expensive. A solution that could eliminate the long-distance transportation of concentrated sunlight could help to reduce this cost.

Other prior art systems have taught the technology of pebble beds for energy storage. In a typical system, energy is collected and transferred to a gaseous heat transfer fluid, typically air (often pressurized) or perhaps nitrogen. The heated air is then forced through the pebble bed, heating the pebbles. Later, when energy extraction is desired, ambient air is forced through the pebble bed, getting hot in the process. The heated air can then be used to turn a gas turbine, create steam, or drive a Stirling engine.

However, pebble bed systems tend to be difficult to work with. Among other things, such systems generally operate at pressures well above ambient, and there is substantial energy loss in forcing dense, pressurized air through the pebbles, and there is a fair amount of cost in the pressure vessel and in the plumbing to deliver the pressurized air to the bed. A more efficient approach to storing and retrieving solar energy from such solid material would be desirable.

Likewise, for home and commercial systems, it would be desirable to have a system that could provide hot water on demand without requiring extra plumbing and large tanks.

If the heat that is produced and stored is of sufficiently high temperature, it can also be used efficiently to generate electricity, instead of or in addition to being used simply for heating. One example of a useful generator to pair with such a system is a Stirling engine. Typical residential- and commercial-scale solar thermal collectors do not heat their water to sufficiently high temperatures to be used for cost-effective electricity production. Efficient production would require heating the water to temperatures over 100° C., meaning that a boiler or high-pressure water system would be required, which would add too much to the cost.

It would thus be beneficial to have a residential- or commercial-scale solar thermal energy collection system that could produce and store heat at temperatures in excess of 100° C. in a medium other than water.

Some companies (e.g. Glasspoint) are using solar thermal energy to aid in the extraction of fossil fuels. The use of heat to help extract fossil fuels from the ground is called Enhanced Oil Recovery (EOR). However, existing systems only operate when the sun is out. It would be beneficial to be able to provide heat on demand for these operations.

Some operations, like oil recovery, and off-grid mining, desire to have portable energy generation. Currently available solar energy devices tend to not be portable. It would be desirable to have solar energy generation and storage that is portable, to help meet these needs.

SUMMARY

The invention relates to apparatus and methods to provide a concentrating solar energy collection system that stores its energy in a proximal bed of solid state material. Whereas the application of the invention disclosed herein is presented in the contexts of home solar thermal systems and of concentrating solar power, the apparatus and methods are generally applicable to any system in which it is desirable to store large amounts of heat in a small volume, for later use.

From the background description above, it can be seen that current utility-scale CSP systems with storage suffer from numerous problems that tend to make them difficult or costly to implement. Both trough and tower systems have their shortcomings. In a typical power plant design, system designers have to make a choice between the shortcomings of a trough system and the shortcomings of a tower system.

Trough systems suffer from the need to have miles of evacuated pipes (so as to avoid heat loss), miles of plumbing (typically one mile per megawatt of generating capacity), the need to operate at (relatively) lower temperatures (leading to inefficient energy generation, and making molten salt impractical), expensive and/or dangerous heat transfer fluids, and the difficult task of regularly cleaning acres of large curved mirrors.

Molten-salt-based tower (or "power tower") systems suffer from the high cost of the tower, the expense of equipment for handling molten salt, including heat tracing and exotic pumps, atmospheric attenuation resulting from propagating sunlight beams over up to a mile near ground level, poor land use efficiency due to the large spaces required between heliostats in the outer parts of the heliostat field, the difficulties associated with cleaning acres of large, widely distributed mirrors with the associated costs of wiring and grounding and reduced wind tolerance, avian and aircraft safety issues, and the inability to take advantage of the full temperature difference available, else the molten salt would freeze. These systems also suffer from the requirement to point their mirrors with high precision, such as 3 milliradians or better optically, which translates to 1.5 milliradians of mechanical motion, in order to direct the reflected sunlight onto the receiver.

Both types of systems suffer from the fact that they use receivers comprising metal and other materials, that end up being subjected to very large daily temperature swings, and very high thermal gradients. For example, the illuminated side of the receiver may be 100° C. or more hotter than the other side. These gradients and temperature swings present difficult engineering challenges, and lead to limits on the total amount of sunlight that can safely be placed on the receiver, and also lead to strict requirements on uniformity of illumination.

Related, these systems must take care to not put concentrated sunlight on any surface not designed to be subjected to it. These systems therefore typically must have expensive heat shielding to protect components near the receiver from unwanted heat. The energy that misses the receiver is called spillage, and represents lost energy and lost revenue.

Avian and aircraft safety are related to the fact that highly concentrated sunlight is propagated across open space. This is a more significant issue for power tower systems than for troughs, but both trough and tower systems tend to propagate concentrated light through a volume of open space between the collector and receiver.

Both types of systems also suffer from the fact that they tend to use large mirrors that are exposed to high wind forces while needing to maintain high precision, and the structures required to withstand these forces are expensive. Further, these structures typically require significant foundations in order to remain anchored to the ground in high winds. Both types of systems, and especially towers, suffer from an inability to scale to small size. Also, a "soft start" is not usually possible—usually construction of the entire plant must be completed before energy production can commence. Lastly, even power towers still operate at temperatures much lower than a typical fossil fuel plant, which has a detrimental effect on the efficiency of energy generation. Operating at higher temperatures could easily result in ⅓ more energy production than is possible today from a molten salt power tower plant.

The operating expenses associated with cleaning and otherwise maintaining these acres of exposed mirrors and miles of plumbing can run into tens of millions of dollars per year.

Because of the massive scale of construction involved, these plants are very expensive, and they are permanent installations, and it takes many years—typically as many as 30 years—to fully amortize the cost of the plant so that it becomes a profitable enterprise. This leads to a significant business restriction, in that the development of a project is generally contingent on finding a buyer who will agree to purchase the energy for 30 years at a pre-negotiated price.

Embodiments of the present invention offer solutions to these problems by taking a new, holistic approach to the problem of collecting and storing solar energy. That is, traditional technology takes a piecemeal approach to the problem. In a tower system, for example, first light is collected. Then it is thrown up to a mile across the site to a tower, requiring very precise pointing accuracy. Next, the concentrated light is collected on a receiver that may be exposed to up to 500 MW or more of heat. Like a high performance rocket, one tiny technical hiccup can lead to catastrophic failure of the entire power plant.

Dense and viscous molten salt must then be pumped through the receiver using exotic pumps, at high energy cost. Also, the salt must never be allowed to freeze, which, for a typical salt, means it must be kept at a temperature of 200° C. or higher for the life of the power plant. These and other power requirements result in unwanted power consumption. This consumption is called "parasitic power" and can represent a significant impact to power plant profitability.

The heated salt must then be stored in an enormous tank. In some cases, it may be up to 6 stories high and as large as a baseball diamond. Because of the high temperatures involved, this tank usually must be constructed of expensive stainless steel so that it doesn't rapidly corrode away when exposed to the molten salt.

Lastly, when energy production is desired, the molten salt must again be pumped through an exotic molten salt steam generator. At this point, at last, conventional power plant technology takes over and energy production begins.

In many ways, today's high-tech CSP systems are extremely complex and intrinsically frail, but people have been working on the problems for so many years now that they are actually starting to make them work. However, today's CSP plants are not cost-competitive with other forms of energy, and construction cycles are long, which increases the effective cost of the energy produced.

Likewise, Solar Updraft Towers, while conceptually simple and elegant, are difficult to implement in practice, due to the low peak temperatures, which result in a very low sunlight-to-delivered-energy efficiency (typically less than 1%). This leads to very large land requirements, and the low buoyancy difference resulting from the low peak temperature means that very tall towers are required, as tall as 1000 m in some proposed systems.

Embodiments of the invention described herein eliminate the many compromises and technology challenges involved in conventional CSP, by recasting the problem into a much more modular form. That is, whereas a typical CSP plant has a field of mirrors, which then focus light on a receiver, which then absorbs heat, which then is transferred into salt, which is then pumped into an enormous salt tank, some embodiments of the invention described parcel a CSP plant up into modular units or components which may each contain these functional components individually.

Further, it is possible, by pairing the high temperatures of this invention with solar updraft technology, to enable solar updraft energy production at much higher efficiency, reduced land area, reduced environmental impact, and reduced cost.

An embodiment of the invention therefore comprises a module which includes the functions of sun tracking, light focusing, heat absorption, and energy storage. The module may be provided in standalone form, or it may be coupled to other modules, comprising a "conduit" module. By keeping all these functions proximal to one another in a single module, the vexing problems of transport (of light, heat, energy, or hot liquids) over large distances and in great volumes are ameliorated. An exemplary embodiment therefore does not propagate concentrated light through open space. The region of concentrated light in this embodiment is thus generally inaccessible, helping to improve safety to workers, birds, and aircraft. In another embodiment, the entire assembly is situated beneath a glass cover or other transparent cover, making the region of concentrated light yet more inaccessible. In one embodiment, the height of the enclosed volume beneath the glass or other cover is small enough, even as small as 3 feet in height, or even shorter, that worker access to the interior is impractical without removing the glass or other cover.

The modules may be manufactured at a factory, rather than at the power plant site, thus leveraging the benefits of mass production, and reducing project implementation schedules and costs.

In one embodiment, the invention comprises a bed of thermal energy storage material. In one exemplary embodiment, it comprises a solid aggregate material, for example, including materials such as grains of sand or pebbles. Any suitable material, including sand, pea gravel, or the like, will do, but one embodiment comprises particles of basalt sand or graphite as the bed material. In this embodiment, the material(s) selected have the following properties: low cost, high thermal conductivity, high melting point, very high ignition temperature (that is, they are not flammable in normal atmosphere at the temperatures being considered), lubriciousness (in some applications), chemical stability, and non-corrosiveness. Basalt sand, for example, may be used because it exhibits excellent thermal conductivity and chemical stability. Graphite, in a powder or flake form, may be used because it is excellent with respect to all these properties. Sand (which is mostly silicon dioxide) can also be a useful material in an embodiment where thermal conductivity and lubriciousness are less critical.

Any amount of storage material may be used. One embodiment includes at least 10 kg of storage material, or as much as 100,000 kg, or even as much as one billion kg of storage material. There is no practical upper limit on the amount of storage material aside from the size of the installation site.

While the previous embodiment provided a bed of solid aggregate material, a bed of solid material may be provided in any form, including blocks, sheets, or even the underlying soil beneath the module. The material may be provided as one or more distinct components, or it may be provided as a portion of another component—for example, in one embodiment, the inside walls of the module comprise a bed of energy storage material. In another embodiment, structural members within the interior of the module may also comprise a bed of energy storage material.

In order to retain the thermal energy once collected, an exemplary embodiment includes an insulated container to hold the bed of thermal energy storage material.

One aspect of embodiments of the invention is direct heating of the bed of thermal storage material by concentrated sunlight. Unlike prior art systems that use mirrors to heat a central pipe or receiver, an exemplary embodiment of the invention provides a concentrating solar thermal energy collector, comprising light concentrating optics, proximal to the bed of solid thermal storage material, heating it directly, as opposed to transporting in heat that has been collected at another location. In one embodiment, the collecting optics are above or beside the bed of material and focus concentrated sunlight onto it. Another embodiment comprises reflecting optics, such as a modified Compound Parabolic Concentrator (CPC). However, an embodiment that uses refractive optics such as Fresnel lenses would also be practicable.

An inventive step in one embodiment is providing the storage material proximal to the collecting optics, for example, as close as ten meters, or as close as five meters, or even as close as one meter or even as close as ten centimeters or even closer. The proximity is limited only by the practical requirement to include a layer of insulation between the collecting optics and the bed of storage material.

A further inventive step in one embodiment is using the same material for energy absorption and energy storage, with no other material interposed between the incident sunlight and the energy storage material. While a material may be interposed, the inventive step in the embodiment is that such a material may be omitted without substantially affecting the function or performance of the embodiment, thus helping to reduce cost and complexity.

In one embodiment, the collecting optics are packed closely together, with only small gaps between adjacent collectors, including gaps of less than one foot, or even gaps as small as one inch or even smaller.

In one embodiment, the concentration factor of the collecting optics is at least 25×, or even as high as 500×, or even 1000×, or even higher.

One embodiment for residential hot water heating includes a fixed bed of material. In this embodiment, a water tube extracts heat from the material on demand, however, a heat pipe may be used instead of the water tube. In this embodiment, the bed of material is heated to in excess of 200° C., but much higher temperatures of 400° C., or even 1000° C. or more may be desirable for some applications of embodiments of the invention. The higher the temperature, the more heat is stored in the same amount of material.

In a related embodiment, an air tube may be used to extract heat from the material.

One useful embodiment of a residential system heats the bed of material to about 400° C. This provides dramatically higher energy density than typical solar water heaters, which might heat the water in their tanks to 50° C. or so. 400° C. provides a useful balance between a desired high energy density and a desired minimum required amount of insulation. With this dramatically higher energy density (compared to a tank of hot water), the bed of material may be kept to modest size, being incorporated directly within the body of a rooftop or ground-mounted "solid-state thermal solar panel", thus providing a "tankless solar water heater" in approximately the same footprint as a traditional solar hot water panel.

In one embodiment, the stored heat can be used to heat air for space heating of a home or business, or to drive a Stirling engine for generating electricity. Stirling engines, especially, can benefit from the higher temperatures made possible by the invention, producing electricity much more efficiently than from lower temperature heat.

In another embodiment, the invention can be used as a tankless solar water heater, providing hot water on demand, such as when a homeowner turns on a faucet. In a further embodiment, a backup heating source is included to provide hot water during periods when there is high hot water demand or limited sunshine. Such a backup heating source may comprise any convenient heating source, possibly comprising conventional heat sources such as an electrical heating element, a natural gas burner, or a catalytic gas heater.

In another embodiment, the invention instead may act as a thermal "battery" to be used in conjunction with a traditional water heater. In this case, a backup heating source is not needed, since the traditional water heater already has the ability to heat water.

In this embodiment, a solid-state thermal solar panel may be operatively coupled to a conventional hot water heater. When the temperature of the water in the tank of the traditional heater drops below a desired temperature, water may be caused to be circulated through the solid state solar panel and then back into the tank. Inasmuch as the temperature inside the solid-state thermal solar panel is higher than the desired temperature, the water in the tank will thus be heated by the solid-state solar panel. If the contents of the solid-state solar panel are not hot enough to heat the water to a desired temperature, then the system may be configured so that the conventional water heater's conventional heat source heats the water, thus helping to provide a backup heat source when insufficient stored solar energy is available.

In a related embodiment, air or another fluid may be caused to be circulated through the solid state solar panel and into the tank, rather than circulating the tank water itself through the solid state solar panel.

There are other embodiments that may be useful when the invention is used at a commercial (such as hot water for a winery or laundry) or industrial scale. In one commercial-scale embodiment, the solar thermal energy collector and bed of thermal storage material may be coupled to a flatbed trailer with the collection system on the back.

One industrial-scale embodiment comprises a dumpster or shipping container or other container containing thermal storage material, with the sunlight collecting optics on top. Also at industrial scale, one exemplary embodiment may be tied directly into a factory's boiler, either to produce steam directly, or to pre-heat combustion air for a conventional boiler.

One industrial-scale embodiment couples the collection and storage device of the invention with a water purification plant, such as a desalination plant, helping to provide heat to remove impurities from water.

Another commercial/industrial-scale embodiment couples the collection and storage device of the invention with a remote communications site, such as a cellular phone tower. By providing solar-powered energy with long-duration storage, the need to provide a diesel generation system, and to truck in fuel, may be eliminated.

Yet another commercial/industrial-scale embodiment couples the device to one or more water pumps, to provide agricultural irrigation. Farmers frequently move their irrigation pumping equipment to different locations, and the modularity of embodiments of the invention helps to provide portability.

Another embodiment couples the system with an oilfield that is engaged in Enhanced Oil Recovery (EOR). The embodiment would help to allow operation at night, and would help to allow the energy production and storage units to easily be moved to new wellheads as needed.

At both commercial and industrial scales (and also possible at residential scale), a truly novel possibility offered by the trailer/dumpster/container approach is afforded by the intrinsic portability of the unit. This portability enables a new paradigm of "solar as a service", wherein the thermal storage material can be heated at a remote, sunny, site where land costs are low, and then transported to the user's site for energy extraction.

For example, in one embodiment, a module according to the invention might take up to 30 days or more to fully heat up under normal conditions, whereas the end customer might desire to consume one module's worth of heat per day, yet might have space for only one or two units.

A "solar as a service" provider can keep a "farm" of solar thermal energy collection units, e.g. out in the desert, that are always being "charged". (The word "charged" is used in this document to mean "heated to a desired temperature". Likewise, the word "spent" is used to mean a unit that has cooled back down to a lower temperature.) So a given end user of solar energy might have 30 units allocated to himself out on the farm, but only one unit at his end use site at any given time. In one embodiment, each day, the service provider may bring a charged unit and swap it for the spent unit, which is returned to the farm for recharging.

The intrinsic portability and scalability and self-charging nature of the units all help to enable a method of providing emergency and disaster relief, wherein modules can provide energy for emergency and disaster response operations. In an embodiment providing emergency or disaster relief, modules may be deployed to a disaster location and left for an extended period of time, without requiring an ongoing supply line. The modules may provide thermal energy for heating and cooling, electricity generation, sanitary water, and even heat for cooking Embodiments of this method may include the deployment of small household-sized units for use by individual families, community-sized modules, and/or large scale power, water, or heating systems.

A related embodiment includes a similar system for general energy infrastructure for a remote community. The embodiment may include the deployment of small household-sized units for use by individual families, community-sized modules, and/or large scale power, water, or heating systems.

In one embodiment of the invention, the bed of material may be housed in a mobile container, so that the heated material can be easily transported to a central location (e.g. a power generation site at a utility-scale power plant) where energy can be extracted.

In the off-grid mining sector, the invention may be deployed at "utility scale", providing tens or even hundreds of megawatts of power needed to operate mining equipment, which otherwise might require diesel fuel to be trucked in hundreds of kilometers. Often, these mines like to relocate every few years. The intrinsic portability of the collecting units makes this relocation straightforward. Therefore, in one embodiment, the collecting units may be relocated after a period of time.

One useful embodiment of a collection and storage unit comprises an insulated railroad hopper car. A hopper car containing a graphite bed, basalt sand bed, or other useful material may be heated to very high temperatures by concentrated sunlight, over the course of perhaps a week or a month, or as short as a day or even shorter, or as long as two months or even longer. A well-insulated railroad car can keep its contents hot for weeks, losing as little as 1% of the stored heat per day, or even less. In this embodiment, many hopper cars may be provided at a utility-scale power plant, with each hopper car comprising a "lid" comprising an array of Fresnel lens concentrating optics capable of heating the contents, such as amorphous or flake graphite, basalt sand, or other useful material, to temperatures as high as 1100° C., or even hotter. Once the contents of the railroad car are hot enough, the car may be stored, or it may be staged for energy extraction. When it is desired to produce electricity, the hopper car may be transported to a dumping station. In one embodiment of a power plant using the invention, at the dumping station, standard coal-handling equipment dumps the hot graphite, basalt sand, or other material onto an array of boiler tubes or air tubes, producing steam to drive a steam turbine, or hot gases to drive a Brayton cycle gas turbine. At the bottom of the heat extraction chamber, cooled graphite or other material may be transported by standard coal-conveyor equipment back to a waiting hopper car, and then the cycle may repeat.

Another embodiment may use a standard or customized ocean-going shipping container as the mobile collection and storage unit. Still another embodiment may use a standard or customized dumpster as the mobile collection and storage unit.

Since they include the energy storage material and the energy storage container, these box-like containers tend to have significant mass, and tend to exhibit minimal aerodynamic lift in the wind, so an embodiment may not require a foundation or other significant site preparation, resulting in significant cost savings.

Further, the high wind tolerance means that an embodiment may be suitable for installation in locations that are otherwise not practical for CSP deployment. For example, mining operations in northern Australia could advantageously use CSP energy, to save on the cost of trucked-in fuel. But some of these facilities are in zones that are subject to cyclones. A suitably ruggedized embodiment of the invention may be safely deployed in these areas.

In one embodiment, heat extraction is done using one or more bulk solid heat transfer units such as those provided by Solex Thermal (U.S. Pat. No. 8,578,624), the entirety of which is incorporated herein by reference.

However, in an alternative embodiment, the collecting unit stays fixed, and a service vehicle periodically stops by and extracts the hot thermal storage material for transport to a central location for heat extraction.

Mobile units may be more useful in some power plants, since a utility-scale embodiment may also include a cleaning facility, not unlike a car wash, at the dumping station. In one embodiment, the entire collecting unit may go through the cleaning facility. In another embodiment, the solar collector "lid" is removed from the hopper car prior to dumping and it may be sent through an automated cleaning station, much like a car wash, in order to clean its cover glass. This compares favorably to traditional CSP systems, which require expensive mobile trucks to rove through the field, carefully mating with each mirror in order to clean it. The "car wash" approach also is favorable in terms of water use and soaps or other chemicals. In a traditional mobile CSP cleaning system, 100% water recovery is difficult, and, because of water loss, the inclusion of soap or other chemicals in the cleaning water may be prohibited. In one embodiment of the car wash approach, the water and cleaning solutions may all be contained within the cleaning facility, helping to permit easy water recovery and decontamination.

Maintenance is likewise simplified. Just like at a railyard, in one embodiment, maintenance bays may be provided at the site, either at or near the dumping station, or at any convenient location. There the hopper cars and solar collector arrays may be easily serviced without affecting plant operations and without requiring expensive field operations.

These improved cleaning and maintenance aspects of the invention can lead to significantly reduced costs for operations and maintenance of the power plant.

The mobility of the collector modules means that a power plant using the system may not have to be a permanent installation. In one exemplary embodiment of a power plant, after a period of a few years, the collector modules (and optionally the power block as well) may be moved to a new location. One embodiment thus includes short-term energy contracts, meaning shorter than 30 years, even as short as 5 years, or even as short as 2 years, depending on the requirements of the customer.

Nonetheless, mobile modules represent a compromise in a utility-scale installation. The need for mobility and handling limits the size of the module, and dedicated systems are required to extract the heat from the transported material when it arrives at the central power block. This will be appropriate for some applications, while for others it may be desirable to not have to transport and handle the heated solid.

Another embodiment of the invention provides fixed collection modules. Instead of transporting the heated modules, the modules may be coupled together to form a conduit, through which a fluid may be passed to extract and transport the heat. In contrast to many prior art systems, one embodiment uses ordinary air, at ambient pressure, as this heat transfer fluid, providing a great simplification in many engineering requirements. Nonetheless, other embodiments may use other fluids and other pressures.

In an embodiment of a fixed collection module, the module comprises an insulated conduit. As compared to the mobile module, the fixed module has a pair of ports, for example at the ends of the module, which may be coupled to another module to another insulated conduit. Segments of non-insulated conduit may be used but may tend to result in high thermal losses.

Like the portable module, the fixed collection module also comprises a bed of heat absorbing and storage material, a sun tracking system, light concentrating optics, and a means to transfer the collected concentrated solar energy into the interior of the module. The fixed collection module also includes a means to move a fluid, such as air, through the module, via entry and exit ports. The fluid tends to absorb heat energy from the heat absorbing and storage material, conveying it to a different location where the heat can be used for any useful purpose, such as generating electricity. Optionally, the module may also comprise a valve or baffle to help control the flow of fluid through the module.

The heated fluid may be transported to a location where it may be used with any device that can make use of the heat, including hot water heaters, home air heaters, factory furnaces, Stirling engines, thermoelectric devices, steam turbines, gas turbines, or any useful device.

An important aspect of the invention is that the thermal energy storage bed is also used as the energy absorber, and is not required to perform any structural function. Traditional CSP receivers comprise pipes which carry a heat transfer fluid, and thus they must be carefully designed to maintain structural integrity over the life of the plant while carrying hot fluids. Since an exemplary embodiment does not place any structural requirements on the energy absorbing material (one embodiment being a bed of solid aggregate), these problems can be ameliorated.

Nonetheless, structural elements may participate in energy storage if desired. In one embodiment, the inner walls of the module may comprise thermal energy storage material.

In another embodiment, the module may comprise the soil beneath he module, with the soil itself providing thermal storage and/or insulation to the module.

In another embodiment, the module comprises a trench dug into the soil, so that the soil may comprise some or all of the outer walls of the module.

In another embodiment, the soil may be engineered into various forms to help provide structure, insulation, or improved thermal transfer. For example, clay may be added to the soil (or the soil comprises sufficient clay to begin with), and the resulting soil may be "fired", potentially with concentrated solar energy, to form ceramic-like structures within the module. Said structures may provide structural support, surface area to help with heat transfer, or the like.

Fixed collection modules may be any size, but as compared to mobile modules, they can be readily made in very large sizes. The larger the modules, the less insulating wall area is needed per unit volume, which tends to result in lower overall cost. Large modules can also accommodate vast volumes of air or other fluid. Since large volumes are readily achievable, there tends to be less need to pressurize the fluid to high pressure. And since the energy storage material in many embodiments is chemically stable and not flammable, air is a practical choice as a heat transfer fluid. Unlike traditional CSP heat transfer fluids, air is free and can be used at very high temperatures. Higher operating temperatures are important because energy conversion efficiency tends to increase with temperature. Even a small efficiency increase from a utility scale power plant can offer significant benefits in terms of economic performance of the plant.

It is difficult to use air as a heat transfer fluid in a traditional CSP plant because it has relatively low heat capacity. So large amounts of air must be transported through the CSP receiver in a short time, which ends up calling for high pressures, which increase cost and complexity of the system. An embodiment of fixed collection modules with large air volume allows for transporting of large amounts of heat without requiring pressure.

Both the mobile and fixed collection modules thus separate the thermal absorption and storage requirement from the heat conveyance requirement, thereby allowing a more effective system design. The energy absorption and storage material does not need to be pumped, opening up the possibility of using large quantities of low cost, solid materials. In the fixed collection module embodiment, those materials, once installed, never have to be moved again.

A utility-scale embodiment may heat its material beds to higher temperatures than in some residential embodiments. With the much larger volume of a railroad hopper car, it is practical to use very thick insulation, as thick as one foot, or even two feet or more, without overly reducing the volumetric capacity of the hopper car. And with the larger volume of the hopper car compared to a rooftop solar panel, much less insulation is required per volume of thermal storage material, so more expensive insulation may be used without impacting cost appreciably. The still larger volumes available to the fixed module embodiments allow for even less total insulation material. For these reasons, one embodiment may heat the thermal storage material beds to as high as 1000° C., or even as high as 1400° C., or even higher. 1550° C. is a desirable temperature in order to help match the desired input temperature of a combined cycle air Brayton generator. In all of these cases, insulating materials repurposed from the ore smelting industry may be used. Up to about 1000° C., the materials might be called "conventional". Materials that go up to 1400° C. are also readily available, although slightly exotic. Still higher temperatures are possible and are used in a further embodiment. Higher temperatures are desirable because the efficiency of turning heat into electricity increases as the temperature increases. At 1400° C., the temperature of the material bed is approximately equal to the temperature of combustion gases inside a gas turbine, so heating the thermal storage bed to this temperature or a little higher would allow the use of very efficient gas turbines that are already being used for energy production at gas-fired power plants.

Due to the configuration of the modules, a much larger surface area of energy absorption material (many orders of magnitude more) is available to absorb the incoming flux than is available in a traditional CSP plant. This means that the energy absorbing and storage material can have much lower thermal conduction properties, since it absorbs energy at a much lower rate than a heat transfer fluid in a prior art CSP plant.

Both types of modules exhibit good scalability. Embodiments may be sized for anything from residential rooftop installation all the way up to utility scale.

Either type of module comprises an enclosure comprising insulated walls, floors, or ceilings. However, the modules need not be boxlike—the "walls, floors, and ceilings" may comprise a tube or any convenient shape. The enclosure may be closed, as in embodiments of the mobile modules, or may have one or more ports to allow a heat transfer fluid to enter and exit.

The enclosure may be of any convenient construction. One embodiment uses self-supporting structural insulation material with a cavity cut into it. Such materials may include fiberglass, foamed concrete, fumed silica board, or ceramic, among others.

Another embodiment provides a wall over at least a portion of the interior surface of the insulation. This inner wall may provide structural support, protect the insulation from light, or may provide any useful function. Convenient inner wall materials may include stainless steel, aluminum, graphite, silicon carbide, glass, ceramic, or concrete, among others.

In one embodiment, the insulation and/or its walls comprise an opaque assembly, in order to help prevent loss of stored energy via re-radiation. In one embodiment, the opaque assembly is highly reflective (either specular or lambertian reflection or any combination) in order to help minimize re-radiation losses.

Likewise, the enclosure may provide an outer wall on the outer surface of the insulation, to provide environmental protection, structural support, or any convenient function.

In one embodiment, the combination of inner and/or outer wall together with the insulation, may comprise a tube. In another, it may comprise a box. In one embodiment, the enclosure may have open ends, so that it comprises an insulated conduit.

In one embodiment, the walls themselves comprise thermal energy absorption and/or storage functions.

In one embodiment with inner walls, the walls comprise features that increase the surface area of the inner walls, to help improve heat transfer between the walls and the heat transfer fluid.

In one embodiment with both inner and outer walls on the insulation, at least a portion of the insulation is fully enclosed in a sealed volume, helping to prevent air exchange within the insulation, helping to improve thermal performance.

In a related embodiment, the sealed volume is evacuated of air, helping to eliminate convection as a heat loss mechanism.

One exemplary embodiment uses 500× sunlight concentration to help to achieve a desired internal temperature. One benefit of this embodiment is that this concentration can be achieved with reduced pointing precision relative to what is required of a power tower system, even though the embodiment is capable of producing much higher temperatures than a typical power tower. By using a well-designed optical system, pointing errors of up to almost 1 degree (17 milliradians) may be tolerated. Thus this embodiment helps to make pointing much easier, by providing collectors that are much smaller than typical conventional CSP mirrors, by sheltering the collectors from the wind, and by reducing the required pointing accuracy by a factor of 5 or more, compared to conventional heliostat pointing requirements.

Another embodiment may concentrate sunlight by as little as 25×. Another embodiment may concentrate sunlight by 750× or even as high as 1000× or even higher.

One further embodiment recognizes the often complementary nature of wind and solar resources. In this embodiment, in addition to the solar collectors, small wind turbines are mounted on or near the collector unit. Unlike conventional wind turbines, however, their output shafts are not tied to an electricity generation system. Instead, they create mechanical motion which is converted to heat, which may be used to further heat the thermal storage material, even at night. In one embodiment, the mechanical motion may be converted to heat by causing a set of vanes to spin in a viscous fluid, heating the fluid, which may then be moved into thermal contact with the solid-state thermal storage medium to store the heat. In another embodiment, eddy current heating is used to transfer the heat, thus obviating the need for plumbing and maintaining the completely solid state nature of the device.

One aspect of the invention is the sunlight collection system which concentrates and transfers light into the interior of the unit. Those skilled in the art will be familiar with the typical light concentration systems used in concentrating photovoltaics (CPV), for example.

However, the requirements on the optics in the present example are more challenging than for CPV. Typically, CPV systems articulate the receiver (the target for the concentrated light), so that the receiver is always aligned with the optical axis.

As will be seen in the detailed description, unlike CPV, it is difficult to move the target point in many embodiments, so it is desirable to provide an optical system that can deliver concentrated light to a fixed point, and at a specific angle.

In particular, one embodiment has thick insulation, with a narrow path, or "transfer conduit", for the concentrated light to pass from outside the insulation into the interior of the unit. In order for a substantial portion of the concentrated light to successfully make this transit, it must be generally aligned in both position and angle with the transfer conduit.

The invention therefore benefits from configurations of optical elements that achieve this goal.

One embodiment of a collector module that meets these needs includes a pair of focusing apertures that articulate together. The light focused by the apertures is then folded at approximately 90 degrees by a pair of primary fold mirrors. The optical axis of these two mirrors comprises the secondary rotation axis of the collector module.

The folded light then proceeds to a point where it strikes a secondary fold mirror, oriented at approximately 45 degrees (i.e., about 45 degrees), that is shared by both apertures. The approximate center of this mirror comprises the primary rotation axis of the collector module. The twice-folded beam now proceeds to a fixed tertiary mirror, which folds it downward at a fixed angle, to a fixed point. An optional concentrating secondary optic then further concentrates the light and transports it to an entrance port into the thermal storage cavity.

In a typical embodiment, the concentrated light from the sunlight collection system must be transported through a thick layer of insulation. The challenge is to provide a transfer conduit that transports light, without allowing undue heat loss due to convection.

One typical embodiment therefore provides a transfer conduit through a layer of insulation by providing thin "portholes" in the insulation, which allow concentrated sunlight in, while allowing only minimal heat to escape. One embodiment of these portholes provides a set of glass rods of a material such as fused silica or borosilicate glass, or any suitable optical material, providing for low-loss transport via total internal reflection. One embodiment surrounds the glass rod with a hollow ceramic "straw", so as to provide a required air gap outside the glass rod, while also minimizing losses due to convection.

A light transfer conduit thus may comprise a light transfer optic, such as a glass rod or any suitable optical material, and a surrounding support element, such as a ceramic straw or any useful structure.

One embodiment includes a light transfer conduit that is substantially straight, with little to no curvature, and does not include significant numbers of transfer conduits with significant curvature.

In one embodiment, the light transfer conduit comprises a substantially solid monolith of transparent optical material, and does not include significant amounts of fibers or strands.

In one embodiment, the transfer conduit is between 0.10 meters and 5.00 meters long and between 0.5 and 5.0 cm in diameter, but may be less than 1.00 meter long or even less than 10 cm long or even shorter, and it may be less than 0.3 cm in diameter or even less.

Embodiments of the transfer conduit need not be circular in cross section. In the case of a non-circular transfer conduit, the diameter may be considered to be the diameter of a circle having the same area as the cross-section of the transfer conduit. In one embodiment, the transfer conduit has a square cross-section of less than 5 cm×5 cm.

At night, or anytime insufficient sunlight is available to further heat the interior, it may be desirable to cover the portholes. One embodiment therefore places small moveable "cap" mirrors atop the holes, thus preventing thermal radiation from the interior from escaping.

Another embodiment may provide yet more collecting area, in order to help heat up the thermal storage material faster. Therefore one embodiment provides additional light collection area that extends beyond just the top surface of the container below. In one embodiment, this additional collecting area takes the form of "wings" which extend beyond the edge of the container, yet nonetheless direct concentrated light into the interior of the container.

In one embodiment comprising fixed collection modules, the modules may be placed end-to-end and connected to one another to form a long conduit. Conduit subassemblies may be fabricated in a factory and delivered to site as individual modules. Such subassemblies may comprise interlocking features to create an overlap between the inside surface of one segment and the outside surface of an adjacent segment. Likewise, the insulation layers between segments can nest in a similar manner, helping to reduce heat loss. The interlocking features may help mitigate the effects of thermal expansion of the conduits, as the overlap can accommodate growth or shrinkage of the modules.

In one embodiment, the collection module comprises a trench formed into the ground, and insulation on the bottom and two vertical walls to reduce heat transfer to the ground. An insulated cover may be placed over the top to create an enclosed passageway for a fluid. Structural material may be added to help prevent the soil from collapsing into the trench. The structural material used on the trench floor and walls can be made from any suitable material that can maintain the desired passageway shape, and withstand the exposure to high temperatures. Materials comprising steel, aluminum, glass, and concrete can serve this purpose adequately. Other materials comprising wood, plastic, and foam can be considered if protected from undue heat.

In one embodiment, the ground beneath the module comprises the floor of the module. The module may include insulation above the floor, or it may place its energy storage material directly on the ground, and/or it may include the ground as part of its energy collection and storage bed.

In one embodiment, materials may be added to the soil beneath the module or in its trench, to help improve the insulative, thermal storage, or other properties of the soil.

In one embodiment, soil may be excavated, some material may be placed in the gap to provide some useful property, then soil may be placed back over the material.

In one embodiment, adjacent modules provide for a mechanical coupling between the modules, permitting a single actuator to control the mechanical (e.g. sun tracking) components of multiple modules. The modules may also share other mechanical components such as a counterweight, and may share electronics components.

In one embodiment comprising fixed collection modules, features may be added into the air cavity to help increase turbulence in the heat transfer fluid, helping to improve heat transfer into the fluid. The features may include stakes driven into the ground beneath the module, rocks placed within the air cavity, or any convenient obstruction.

In one embodiment, there are structural elements included within the cavity. This helps to provide structural support to permit larger modules, thus helping to reduce the amount of insulation required.

In one embodiment, the structural elements also provide turbulating features.

In one embodiment, the structural and/or turbulating elements comprise local materials from the site, particularly the soil.

In one embodiment, the soil is combined with another material, such as particles of fused silica or clay, that is then fused to form a hardened object for structural, turbulating, dust suppression, or other purpose.

In one embodiment, the soil beneath the module may be compacted during construction, thus helping to mitigate the impact of voids that may appear when water or other volatiles or combustibles exit once the material is heated.

Decommissioning a system at the end of its life is an important consideration in a product life cycle. One embodiment is decommissioned by returning some of its parts to the soil, e.g. by bulldozing them or by crushing them, as with a steam roller, and then tilling the soil to mix the particles back into the soil layer.

In one embodiment, the thermal absorption and storage material may be solid, or compacted.

In another embodiment, the thermal absorption and storage material may be an aggregate. The size of the aggregate may be selected to give desirable fluid flow and heat transfer properties. The volume of the thermal storage material and the volume of any air gap within the module may likewise be selected to give desirable fluid flow and heat transfer properties.

Embodiments comprising fixed modules may include a way to transport the fluid, and to extract energy from it. The fluid may be forced through the collecting modules, or means may be provided to permit it to flow via natural convection. The fluid may be continuously recirculated through the modules (a "closed" system), or it may be allowed to escape after use and be replaced with fresh fluid (e.g. air). Embodiments may also comprise hybrid systems that recirculate a portion of the fluid. An open system suffers thermal losses to the degree that the exhaust air is above ambient temperature, but it may offer other advantages, such as simpler natural convection, eliminating the parasitic power consumption required by forced convection.

An embodiment comprising fixed modules may include a heat transfer fluid at ambient pressure, or it may include a pressurized heat transfer fluid, or both. Due to the large volume of heat transfer fluid within the fixed module system, large amounts of heat can be transported even with a nominally low-thermal-capacity fluid such as air at ambient pressure. While prior art systems have relied on more efficient heat transfer fluids such as water, oil or molten salt, which must be contained within a closed and/or pressurized heat transfer loop, adding to the complexity and cost of the system, the large heat transfer fluid volume of this embodiment helps to enable the use of ambient-pressure air and its concomitant cost reduction.

Analogously, the large volume of low-cost thermal storage material helps to enable an extremely large thermal storage capacity at low cost. An embodiment may include as much as several days of storage, or several weeks, or even a month or more.

In one embodiment, a fan or blower may be used to force air through the modules. A high temperature blower may be used if the blower is placed at a location where the fluid temperature is high (such as the exit of the modules), or a lower temperature blower may be used if placed at a place where fluid temperature is lower (such as at an inlet or exhaust point).

In one embodiment, natural convection is achieved by including a chimney at the exhaust of the system. The height of the chimney is a physical characteristic that can be adjusted to achieve a target pressure differential utilizing the stack effect. The stack effect moves air up the chimney by buoyancy, which is caused by a difference in density between the air inside and outside the chimney. A pressure differential is created by this air density difference and described by the equation $\Delta P = Cah(1/T_o - 1/T_i)$, where $\Delta P$ is the available pressure difference, C is a constant equal to 0.0342 Kelvin/meter, a is the atmospheric pressure, h is the height of the chimney, $T_o$ is the absolute outside temperature in Kelvin and $T_i$ is the average absolute temperature inside the chimney, also in Kelvin.

In one embodiment a wind turbine may placed upstream from or inside the chimney to generate electricity. This forms a solar updraft tower, but one that operates at much higher temperatures than prior art towers, thereby permitting greatly reduced chimney height. If the air temperature exceeds the maximum allowable operating temperature of the wind turbine, ambient temperature air can be drawn into the air flow upstream of the wind turbine to help drop the temperature to a suitable value. Although this would tend to reduce the pressure differential provided by the stack effect, and thus the overall system efficiency, it may prove cost-effective. Nonetheless, a turbine capable of high temperature operation would tend to provide the highest efficiency.

In another embodiment, the heated fluid passes through both a heat exchanger and a wind turbine, providing dual-stage energy extraction. This may be desired or advantageous, since systems such as steam turbines operate well only at high temperatures, while an updraft turbine can make use of more modest temperatures. Even though this would reduce the pressure differential provided by the chimney stack effect, it might still allow for harvesting of energy that might otherwise be wasted to the environment.

In another embodiment, a chimney helps to provide air flow to draw air through the insulated conduit. The chimney may also help to provide air flow to other sub-systems. For example, in a configuration that uses a steam turbine as one of the energy-utilization sub-systems, the chimney stack effect may be used to draw cooling air across the condensing heat exchanger on the downstream side of the steam turbine.

In another embodiment, some of the heat energy extracted from the condensing heat exchanger may be used to help drive an updraft turbine, thus harvesting useable energy that would otherwise be wasted to the environment.

Valves or baffles may be used in some embodiments. In one embodiment, valves or baffles may be used to seal off or open different banks of modules, allowing some to be used solely for collecting energy, while others are used for energy extraction, or any combination. By way of example, a "nighttime solar power plant" could close off all its conduits during the day, and open them at night to begin energy production. In one embodiment, valves and baffles are used to manage temperatures within the system, throttling heat flow when any part of the system starts to become too hot.

One embodiment includes one or more manifolds where the air circuits of multiple module groups may come together for energy extraction using shared equipment. It is to be appreciated that any other suitable fluid could also be used. In one embodiment, fluid from various modules circuits is routed in a round-robin fashion through the equipment, each circuit taking its turn dumping its heat once it becomes fully "charged" with thermal energy.

In another embodiment, a chimney may be used as part of a closed system, by configuring it in a counterflow configuration for natural convection. In this embodiment, hot air is introduced at the base of a chimney. The buoyant air flows up through the chimney. Within the chimney, a heat exchanger is provided that extracts heat to produce energy. At the top of the chimney, the cooler air is routed back down a second chimney/conduit back to ground level. A second heat exchanger in the downward conduit extracts further heat, further cooling the air and helping to increase the thermosiphon effect. The cool air is then routed back to the solar modules for further extraction of stored heat. In such an embodiment, the hot and cold heat exchangers may comprise a standard counterflow heat exchanger configuration.

Another embodiment uses a similar configuration, but with forced air convection instead of natural convection. Forced air may permit higher airflow through smaller conduits, if that is desired.

One embodiment is a system for receiving, transferring, and storing solar thermal energy, comprising:
  (a) A concentrating solar energy collector for collecting solar energy,
  (b) a transfer conduit for transferring the received energy,
  (c) a thermal energy storage material for absorbing and storing the received energy as heat, and
  (d) an insulated container to help retain the heat wherein the concentrating solar energy collector, transfer conduit, and energy storage material are all proximal to one another, and wherein the transfer conduit is coupled to the energy storage material in such a way that the energy from the concentrating solar energy collector is substantially transferred to the energy storage material via the transfer conduit, and wherein the transfer conduit passes through the insulation layer from an uninsulated area of the insulated container to an insulated area of the insulated container.

In one embodiment, the storage material is within as close as ten meters, or as close as five meters, or even as close as one meter, or even as close as 10 cm or even closer.

In one embodiment, the same material is used for energy absorption and energy storage, with no other material interposed between the incident sunlight and the energy absorption material.

In another embodiment, the transfer conduit comprises a light transfer optic.

In one embodiment, the light transfer optic is substantially straight, with little or no curvature.

In one embodiment, the system does not include significant numbers of transfer conduits with significant curvature.

In one embodiment, the light transfer conduit comprises a substantially solid monolith of transparent optical material, and does not include significant amounts of fibers or strands.

In one embodiment, the transfer conduit is less than 5 meters long and less than 5 cm in diameter, but may be less than 1 meter long or even less than 10 cm long or even shorter.

In another embodiment, the light transfer optic comprises a solid glass rod.

In another embodiment, the light transfer optic further comprises a ceramic straw.

In another embodiment, the thermal energy storage material is a solid material.

In another embodiment, the thermal energy storage material comprises a solid-state aggregate.

In another embodiment, the thermal energy storage material comprises graphite.

In another embodiment, the thermal energy storage material comprises sand.

In one embodiment, the thermal energy storage material comprises basalt sand.

In another embodiment, the system also comprises a gap between the upper insulation layer and the thermal energy storage material.

In another embodiment, the top surface of the module is angled.

In another embodiment, the module comprises a railroad hopper car.

In another embodiment, the module comprises a shipping container.

In another embodiment, the module comprises a dumpster.

In another embodiment, the module includes openings to permit a heat transfer fluid to flow through the container, thus comprising a conduit.

In one embodiment, the concentrating solar energy collector is beneath a transparent cover.

Another embodiment includes a self-powered control system, comprising
(a) A photovoltaic panel
b) Power management electronics
c) Tracking electronics, and
d) Motors that are operatively coupled to the solar collectors to cause them to point at the sun.

Another embodiment is a method of energy collection and storage, comprising the acts of:
(a) using a concentrating solar energy collector to collect energy,
(b) using a proximal light transfer optic to transfer the solar energy through an insulating layer, and
(c) absorbing and storing the transferred energy into a proximal energy storage medium.

In one embodiment, the proximal energy storage medium is a solid.

In one embodiment, the proximal energy storage medium is fixed in location and is substantially immobile.

Another embodiment is a concentrating solar collector, comprising,
(a) At least one collecting aperture
(b) A first optical axis aligned with a first axis of rotation
(c) A second optical axis aligned with a second axis of rotation,
(d) A pair of first fold mirrors oriented at about 45 degrees with respect to the incoming light, which reflect light along the first optical axis,
(e) A second fold mirror oriented at about 45 degrees with respect to the incoming light, which reflects light along the second optical axis.

One embodiment includes a solar collector comprising a Risley prism.

In a further embodiment, the Risley prism is Fresnelized.

In a further embodiment, the solar collector comprises a secondary concentrating optical element.

In another embodiment, the solar collector comprises a "cap" mirror to help prevent energy loss at night.

In one embodiment, a heat transfer fluid is used to extract heat from a substantially fixed solid thermal storage material.

In one embodiment, openings are provided in the energy collection and storage modules to permit a heat transfer fluid to flow through the modules.

In one embodiment, voids are provided in the bed of energy storage material.

In one embodiment, modules are coupled together to form a conduit through which a heat transfer fluid flows.

In one embodiment, the heat transfer fluid flows due to forced convection.

In one embodiment, the heat transfer fluid flows due to natural convection.

In another embodiment, the heat transfer fluid flows due to both forced and natural convection.

In one embodiment, the heat transfer fluid flows in one or more closed circuits.

In one embodiment, the heat transfer fluid flows in one or more open circuits.

In one embodiment, the heat transfer fluid flows in a hybrid system including elements of both open and closed circuits.

In one embodiment, adjacent conduits or modules share a common wall.

In one embodiment, the heat transfer fluid flows over the collector modules in addition to flowing through the interior of the modules.

In one embodiment, soil is included in the energy storage and/or insulation material.

One embodiment includes a heat exchanger that extracts heat from the heat transfer fluid.

Another embodiment includes a solar collector array, comprising
(a) A plurality of solar collectors,
(b) A frame which articulates a first axis of the collector array, and
(c) A linkage which articulates a second axis of the collector array.

Another embodiment includes a system for energy extraction, comprising
(a) an apparatus for extracting the heated thermal storage material from a solid state solar thermal energy collector, and
(b) a heat exchanger for transferring the heat from the thermal storage material into another medium.

Another embodiment is a system for generating electricity, comprising:
(a) a solid state solar thermal energy collector,
(b) an energy extraction system,
(c) an electrical generation apparatus to convert heat into electricity.

In one embodiment, the electricity generation system comprises a solar updraft tower.

In one embodiment, the electricity generation system comprises a Brayton engine.

In one embodiment, the electricity generation system comprises a Stirling engine.

In one embodiment, the electricity generation system comprises a thermoelectric generator.

Another embodiment provides a means for flowing a heat transfer fluid through a fixed conduit containing thermal energy storage material for energy extraction, including
A mechanism for causing the heat transfer fluid to move, comprising either forced or natural convection,
A mechanism for converting the heat in the heat transfer fluid into a useful form of energy,
a) A mechanism for recirculating the heat transfer fluid and/or exhausting the heat transfer fluid to the environment, and/or drawing fresh heat transfer fluid into the system.
b) Another embodiment includes valves or baffles to help manage the flow of heat transfer fluid.
c) Another embodiment includes a manifold where the flow of a plurality of conduits is combined together, and/or where the flow of individual conduits is throttled.

In another embodiment the modules and/or the thermal storage material and/or insulation include locally available materials, including but not limited to the soil at the site.

Another embodiment is a method of generating electricity, comprising the acts of:
(a) Concentrating sunlight,
(b) Transferring sunlight from the outside of an insulated region to the inside of an insulated region,
(c) Absorbing and storing energy in a thermal storage medium inside the insulated region, and
(d) using the heated thermal storage material to provide heat to generate electricity.

Another embodiment is a system for purifying water, comprising:
(a) a solid state solar thermal energy collector,
(b) an energy extraction system,
(c) an apparatus that uses heat to purify water, either directly or indirectly.

Another embodiment is a system for irrigating crops, comprising:
(a) A solid state solar thermal energy collector,
(b) an energy extraction system,
(c) a water pumping system.

Another embodiment is a means of transporting embodiments of the solid state solar thermal energy collector to pumping sites.

Another embodiment is a system for powering an off-grid electrical system, including
(a) A solid state solar thermal energy collector,
(b) A heat extraction system,
(c) A heat engine to convert heat to electricity.

In a related embodiment, the off-grid electrical system is a cellular phone tower.

Another embodiment is a system for providing hot water to supplement an existing water heater, including
(a) A solid state solar thermal energy collector,
(b) A mechanism for transporting collected heat to the hot water tank of the existing water heater, and
(c) A means for controlling the flow of collected heat to the hot water tank.

Another embodiment is a method of providing a relocatable solid state solar thermal energy collector, comprising the acts of
(a) Deploying a solid state solar thermal energy collector to a first site,
(b) Operating the solid state solar thermal energy collector to provide energy for on-site use at or near the first site,
(c) Removing the solid state solar thermal energy collector from the first site after a period of time, and
(d) Redeploying the solid state solar thermal energy collector to a second site.

Another embodiment is a method of collecting, storing, transporting, and using solar energy, comprising the acts of
(a) Collecting and storing energy in a conduit module,
(b) Operatively coupling conduit modules to a manifold,
(c) Flowing a heat transfer fluid through the conduit modules and manifold, and
(d) Extracting heat from the heat transfer fluid in the manifold.

Another embodiment provides at least one common uninsulated wall between parallel conduits.

Another embodiment is a method of collecting, storing, transporting, and using solar energy, comprising the acts of
(a) Collecting and storing energy in a conduit module,
(b) Flowing a heat transfer fluid through the conduit modules using natural convection, and
(c) Extracting heat from the heat transfer fluid in the manifold.

In another embodiment, natural convection is induced via coupled updraft and downdraft chimneys, and heat is extracted via a counterflow heat exchanger that is operatively coupled to the chimney(s).

Another embodiment is a system for boiling water, comprising:
(a) A solid state solar thermal energy collector, and
(b) Pipes embedded in the bed of thermal material, which enter and exit the insulated container, and which carry water or air for heating to boiling temperatures or higher.

Another embodiment is a system for powering an air conditioner or chiller system, comprising:
(a) A solid state solar thermal energy collector,
(b) A heat extraction system,
(c) An absorption, adsorption, or other thermally-driven cooling unit.

Another embodiment is a system for collecting and storing wind and solar energy, comprising:
(a) A solid state solar thermal energy collector, and
(b) at least one wind turbine operatively coupled to the system so as to produce heat that is also stored in the thermal storage medium.

Another embodiment is a method of energy extraction and maintenance, comprising the acts of:
(a) Transporting an insulated container to an energy extraction and maintenance facility,
(b) Removing or opening a portion of the insulated container,
(c) Emptying at least a portion of the thermal storage material from the insulated container,
(d) Extracting energy from the thermal storage material,
(e) At least partially refilling the insulated container with thermal storage material, and
(f) Replacing or closing the opened or removed portion of the insulated container.

Another embodiment is a method wherein the removed portion is a lid comprising a glass cover, an array of solar collectors, and an upper portion of the insulated container.

Another embodiment is a method wherein the energy extraction method uses bulk solids cooling equipment.

Another embodiment is a method further comprising a step of vacuum pumping of the insulation.

Another embodiment is a method further comprising a step of cleaning a removed portion of the insulated container.

Another embodiment is a process for selling solar energy, comprising the acts of:
(a) Collecting and storing solar thermal energy at a first site,
(b) Transporting at least one container of stored thermal energy to a second site,
(c) Leaving the at least one container at the second site for a period of time for customer use,
(d) Retrieving at least one container from the second site, and
(e) Charging the customer for the use of the container.

Another embodiment is a process for providing emergency and/or disaster relief, comprising the acts of:
(a) Deploying modules to a disaster site,
(b) Operatively coupling the modules to disaster and/or emergency relief equipment,
(c) Relocating the modules as needed, and
(d) Leaving the modules in situ until relief services conclude.

In a related embodiment, the emergency and/or disaster relief process also includes an additional first acts of maintaining an inventory of pre-charged modules in preparation for future emergencies.

According to an embodiment of the present invention there is provided a system for receiving, transferring, and storing solar thermal energy, including: a concentrating solar energy collector; a transfer conduit; a thermal storage material; and an insulated container, the insulated container containing the thermal storage material, the transfer conduit being configured to transfer solar energy collected by the solar energy collector to the thermal storage material through a wall of the insulated container.

In one embodiment, the transfer conduit includes a light transfer optic.

In one embodiment, the thermal storage material is a solid material.

In one embodiment, the solid material includes basalt.

In one embodiment, there is at least one opening in the insulated container to permit a fluid to flow through the container.

In one embodiment, the system includes a transparent cover over the concentrating solar energy collector.

In one embodiment, the transfer conduit has an input and an output, and the system includes a moveable cap capable of covering the input or the output of the transfer conduit.

In one embodiment, the system includes a self-powered control system, including a photovoltaic panel; power management electronics; tracking electronics; and at least one motor that is operatively coupled to the concentrating solar energy collectors to cause them to point at the sun.

In one embodiment, the system includes an energy extraction system configured to convert heat to mechanical energy.

In one embodiment, the system is operatively coupled to a water pumping system.

In one embodiment, the system is operatively coupled to a water purification system.

In one embodiment, the system is operatively coupled to a heat engine.

In one embodiment, the system is operatively coupled to an electrical generator.

In one embodiment, the electrical generator is operatively coupled to an off-grid piece of equipment.

In one embodiment, the off-grid equipment includes a cellular phone tower.

In one embodiment, the system is operatively coupled to a conventional hot water heater having a hot water tank, the system being configured to transport collected heat to the hot water tank, and configured to regulate the flow of collected heat to the hot water tank.

In one embodiment, the concentrating solar energy collector includes a Risley prism.

In one embodiment, the system includes a tank configured to hold water, and an air circulation system configured to convey air: first through the thermal storage material, and second through the tank.

In one embodiment, the system includes: an oil recovery system configured to receive energy from the thermal storage material.

In one embodiment, the system includes: a mining system configured to receive energy from the thermal storage material.

In one embodiment, the concentrating solar energy collector includes: at least one collecting aperture for receiving incoming light from the sun, a first optical axis aligned with a first axis of rotation, a second optical axis aligned with a second axis of rotation, a pair of first fold mirrors oriented at about 45 degrees with respect to the incoming light, which reflect light along the first optical axis, and a second fold mirror oriented at about 45 degrees with respect to the incoming light, which reflects light along the second optical axis.

In one embodiment, the concentrating solar energy collector, the transfer conduit, and the energy storage material are all within ten meters of one another.

According to an embodiment of the present invention there is provided a method of energy collection and storage, including the acts of: using a concentrating solar energy collector to collect solar energy, using a light transfer optic to transfer the solar energy through an insulating layer, and absorbing and storing the transferred energy in an energy storage medium, the distance between the energy storage medium and the concentrating solar energy collector being less than 10 meters.

In one embodiment, the energy storage medium is a solid.

In one embodiment, the energy storage medium is fixed in location and is substantially immobile.

In one embodiment the method is performed at the location of a recent natural disaster.

BRIEF DESCRIPTION OF THE DRAWINGS

FIG. 7 has been distorted (expanded) in the horizontal direction for clarity.

FIG. 10A is schematic view of the function of a primary fold mirror in a collector module.

FIG. 10B is a perspective view of the function of a primary fold mirror in a collector module.

FIG. 14 is a section view of a tertiary fold optic and associated secondary concentrator. The figure is drawn to scale.

FIG. 15A is a perspective view of a mechanism used to articulate the primary axis of the collector modules. The figure is drawn to scale.

FIG. 18 is a block diagram of a cellular phone tower installation including an embodiment of the invention as a power source.

DETAILED DESCRIPTION

The systems, apparatus, and methods presented herein describe a solar energy collection and storage system that comprises a bed of material with proximal concentrating optics. Embodiments described herein are exemplary and do not represent all possible embodiments of the principles taught by the invention. In particular, embodiments of the invention have direct application in the fields of concentrating solar power and solar thermal heating. Nevertheless, the apparatus and methods described herein can be applied and adapted by those skilled in the art for use in any alternative application that requires stored heat.

Several terms have been used throughout this document, and this paragraph recaps their meaning A "module" comprises a concentrating solar energy collector, an insulated region, a transfer conduit for transferring the received energy from outside the insulated region to inside, and a thermal energy storage material. In a "solid state solar thermal energy and collection storage module", the energy storage material comprises a solid. A "transfer conduit" or "energy transfer conduit" comprises a means for transferring concentrated solar energy from the outside of the insulated region of a module to the inside. A "light transfer conduit" or "light transfer optic" comprises a transfer conduit that transfers the energy as concentrated light. A "conduit" comprises an insulated region with openings to allow a fluid to enter and exit the insulated region. A conduit may also further comprise a concentrating solar energy collector, a transfer conduit for transferring the received energy from outside the insulated region to inside, and a thermal energy storage material. Such a conduit may be called a "conduit module". A "container" comprises a module. A container may comprise a portable module. A module may comprise a removable cover.

Figure 1:
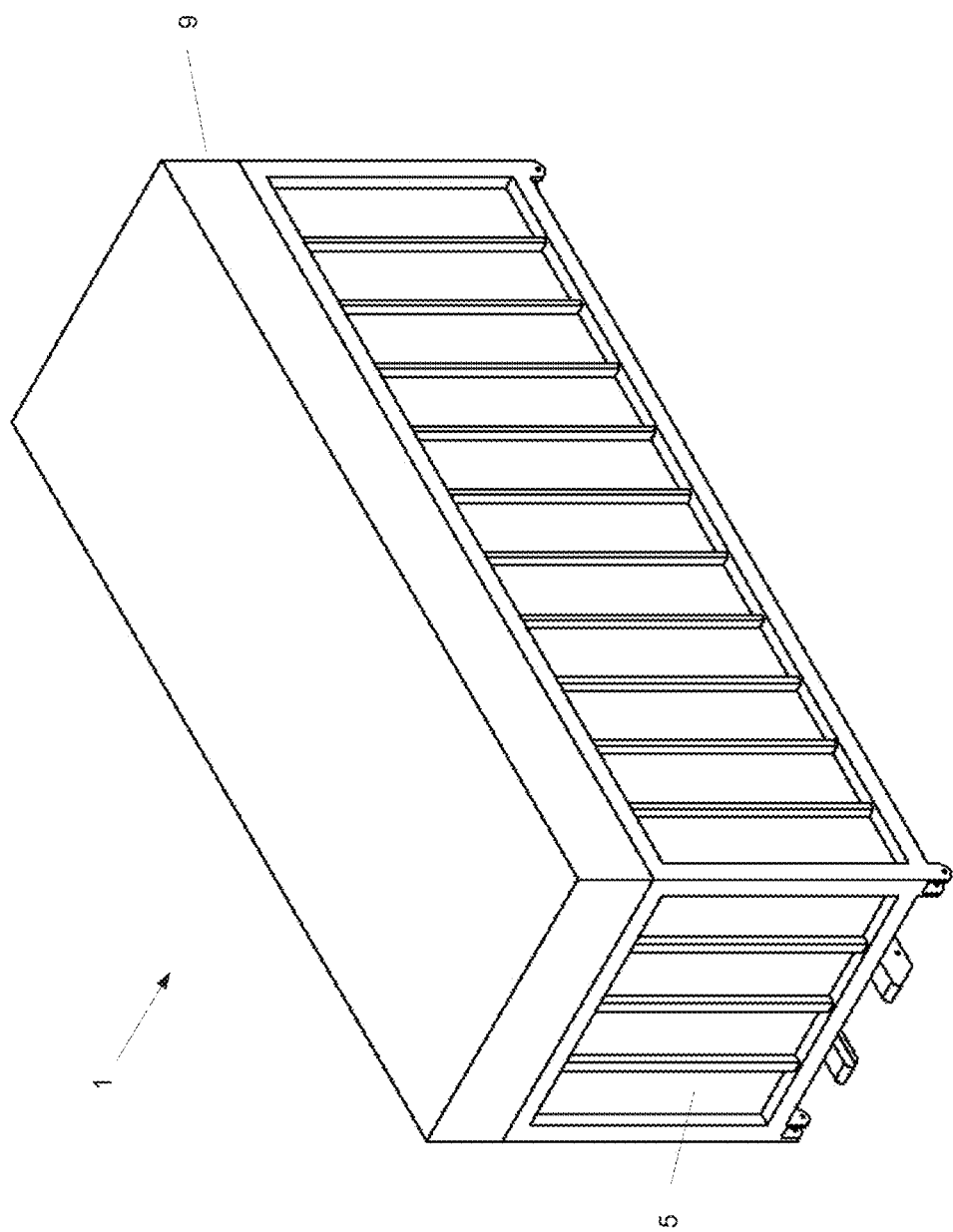
FIG. 1 is a schematic perspective view of an exemplary thermal energy collection and storage embodiment of the invention. The figure is drawn to scale.
Figure 2:
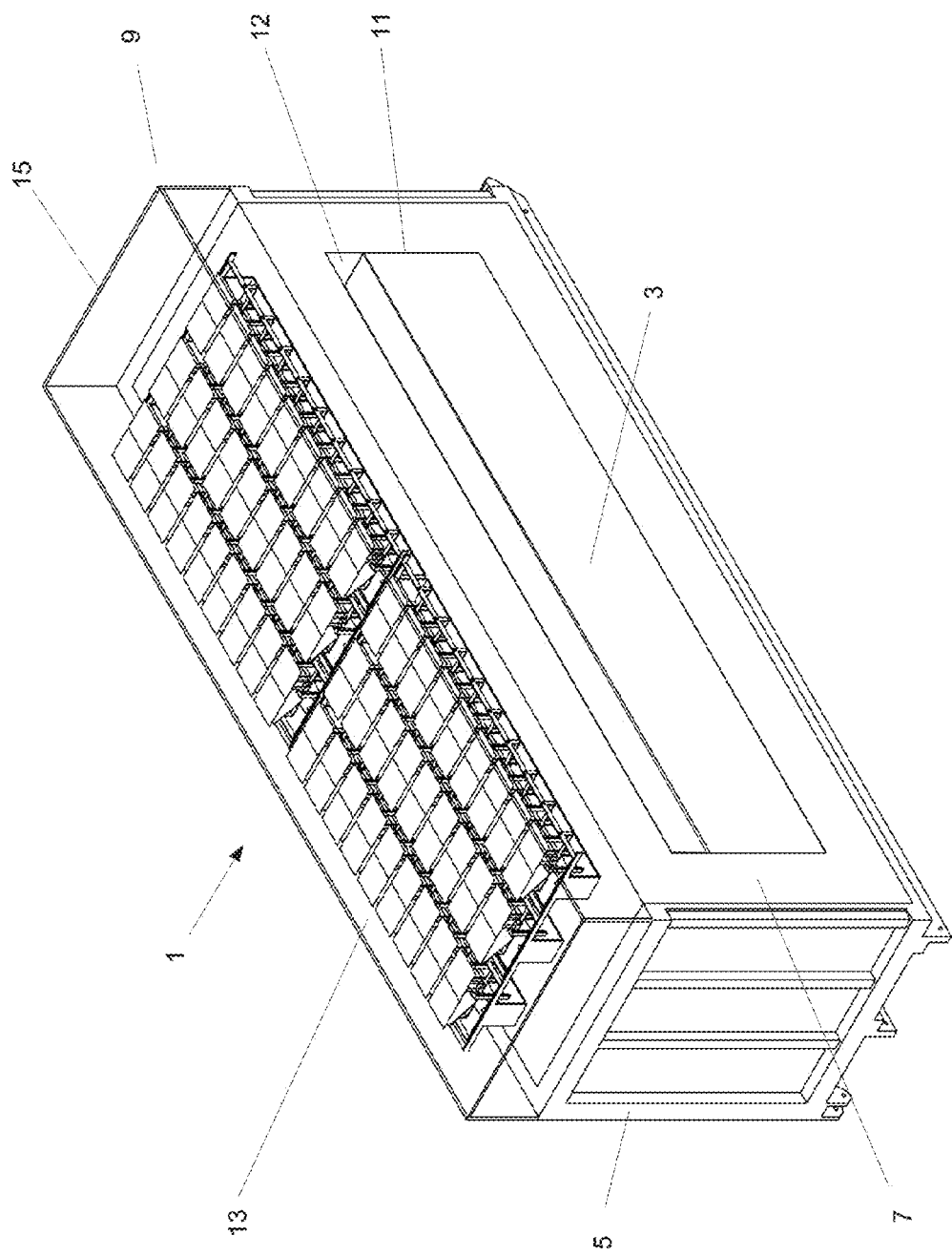
FIG. 2 is a cutaway view of the exemplary thermal energy collection and storage embodiment of FIG. 1, showing the interior of the system. The figure is drawn to scale.

Referring to FIGS. 1 and 2, a solid state solar thermal energy collection system 1 is shown that consists of a bed of thermal energy storage material 3. System 1 also includes a container 5 with an interior layer of insulation 7 and a proximal energy injection source 9. Insulation layer 7 forms a substantially enclosed cavity 11 in which the thermal energy storage material rests. The cavity 11 may not be completely full of material, but may leave a gap 12 between the top of the bed and the bottom of the upper layer of insulation.

In one embodiment, the bed of thermal energy storage material 3 is in solid aggregate form, in the form or powder, flakes, grains, pebbles, or the like, but any convenient material may be used, including but not limited to phase change materials or liquids such as molten salt.

In an alternative embodiment, the bed of thermal energy storage material may comprise one or more solid blocks of material. Since a solid block of material may be difficult to remove from the cavity 11, an embodiment may introduce an array of pipes or tubes into the bed of material to assist with heat injection or extraction.

In one exemplary embodiment, the energy injection source 9 comprises an array of one or more concentrating solar collectors 13 as shown in FIG. 2, but any convenient energy source may be used, including but not limited to wind, grid electricity, or some external source of heat.

In one embodiment where the energy injection source 9 comprises an array of concentrating solar collectors 13, as shown in FIG. 2, system 1 also may include a transparent cover 15 for the array of collectors 13, to help protect it from wind, rain, soiling, and other environmental forces. In one embodiment, the components of the system are all proximal to each other. For example, the distance between the energy storage material and one of the collectors may be less than 10 meters, or less than 5 meters, or even less. In one embodiment, the distance between the energy storage material and one of the transparent covers is less than 10 meters, or less than 5 meters, or even less. As used herein, the distance between two elements is the shortest distance, i.e., the distance between respective points on the two elements that are nearest to each other.

In one embodiment, the invention stores solar energy in the form of sensible heat—that is, by elevating the temperature of the energy storage material 3 to a temperature above ambient.

An alternate embodiment of the invention uses the latent heat of a phase change material. In one embodiment, the bed of thermal storage material may comprise aluminum, which will melt once it achieves a sufficiently high temperature. Another embodiment may comprise a eutectic mixture.

An alternative embodiment may store energy as sensible heat in a liquid such as molten salt.

One embodiment stores sensible heat by heating a solid energy storage material to as high as 2000° F. (~1100° C.), or even higher. Temperatures as high as 1400° C. may be used with materials that are readily available. Still higher temperatures such as 1550° C. are possible with more exotic materials.

One embodiment includes graphite (in a powder or flake form) as the solar thermal energy storage material 3, while another embodiment includes ordinary silica sand, while yet another includes basalt sand, but other materials with similar qualities can be substituted for these materials. An embodiment that uses a grain-like material may help simplify extraction of the heat energy.

Energy extraction can take many forms. While the solid state solar thermal energy collection and storage system is itself a standalone embodiment according to the invention, there are expanded systems that also may include systems and methods for extracting the stored energy. One embodiment of such an expanded system uses a solid-to-fluid heat exchanger. Such products are known in the bulk solids cooling industry, where they are used for the purpose of cooling hot particles. One such product is made by Solex Thermal (U.S. Pat. No. 8,578,624). Current research into the "falling particle receiver" concept by Ho et al at Sandia National Laboratories similarly contemplates such a heat exchanger. Such a heat exchanger includes a series of tubes through which a fluid flows, and the solid material is then poured over the tubes. In one embodiment, the heat exchanger has an hourglass shape, with solid material being poured in the top, flowing over the tubes in the body, and then exiting a narrow mouth at the bottom.

Figure 30:
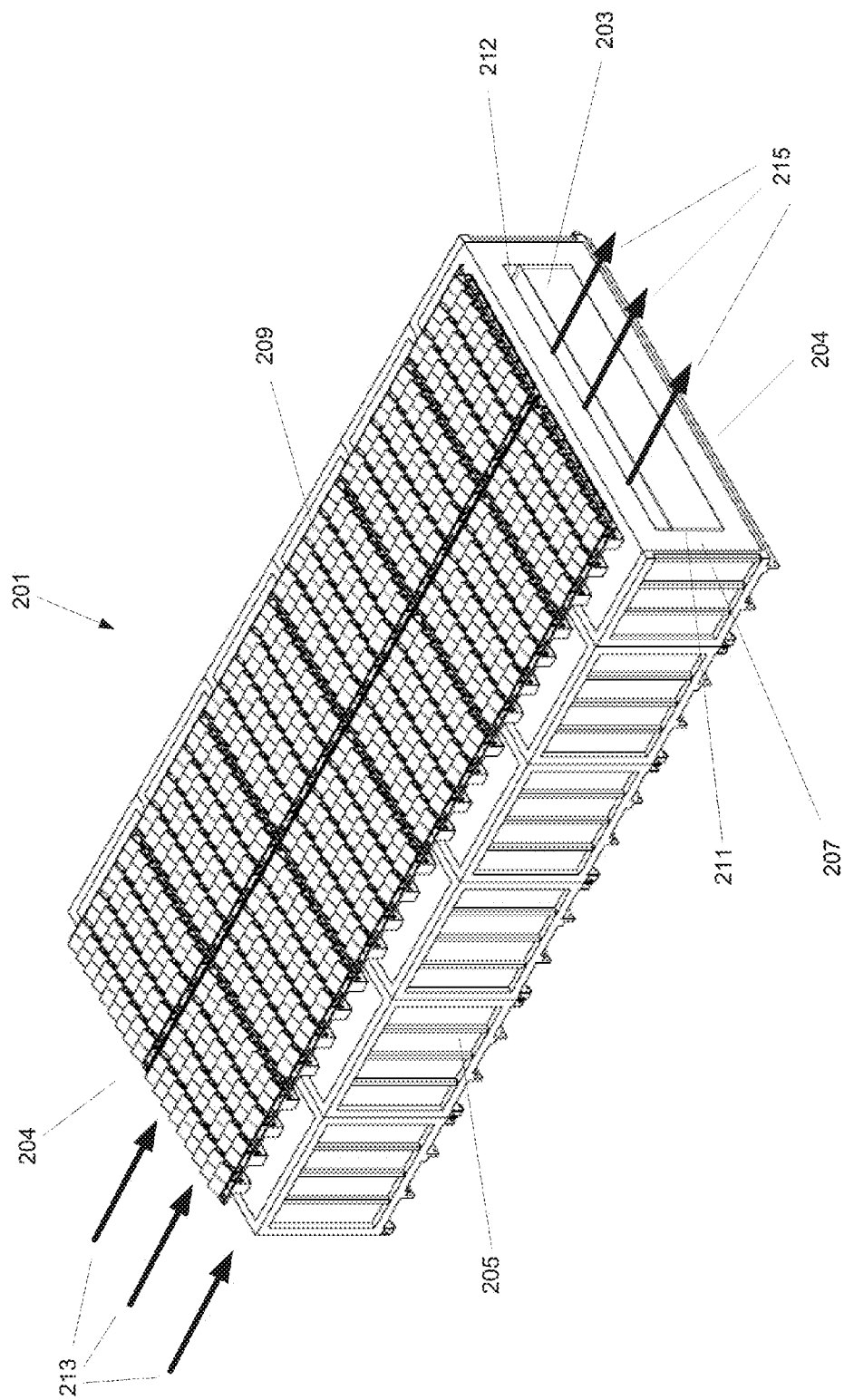
FIG. 30 shows an embodiment comprising a conduit module through which a heat transfer fluid can flow. The figure is drawn to scale.

Another embodiment 201, shown in FIG. 30, replaces the container 5 of FIG. 1 with an insulated conduit 205 that includes openings 204 that allow a fluid to flow through the cavity 211 above the energy storage material 203, as illustrated by inlet flow arrows 213 and outlet flow arrows 215. Like the embodiment of FIG. 1, this embodiment includes insulation 207 and proximal energy injection source 209. Further embodiments incorporate the numerous variations possible with the FIG. 1 embodiment.

The insulated conduit of FIG. 30 may be used in an embodiment of energy collection and storage system that is nominally fixed in place. In this embodiment, heat may be extracted from the storage material 203 by flowing a heat transfer fluid through the cavity 211 of the conduit.

In one embodiment, a gap 212 provides a space through which the heat transfer fluid may flow.

In another embodiment, the heat transfer fluid may instead, or also, flow through voids in the bed of storage material 203. By way of example, if the material is gravel, air can flow through the air gaps between pieces of gravel. Such flow would tend to be slow, but would also tend to involve significant heat exchange due to the high surface area of the gravel and the long dwell time of the air.

Figure 31:
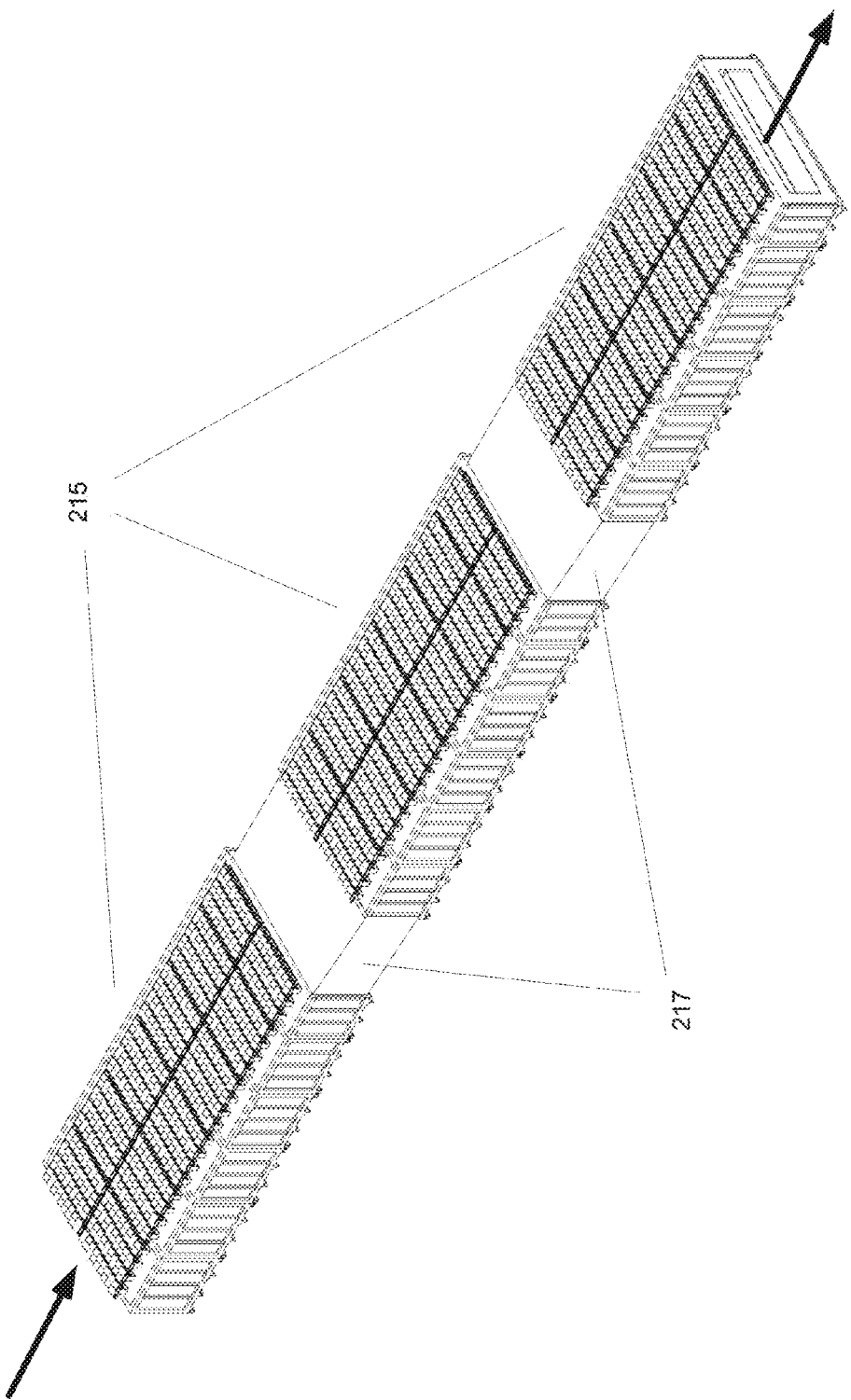
FIG. 31 shows a plurality of conduits operatively coupled to form a longer conduit. The figure is drawn to scale.
Figure 32:
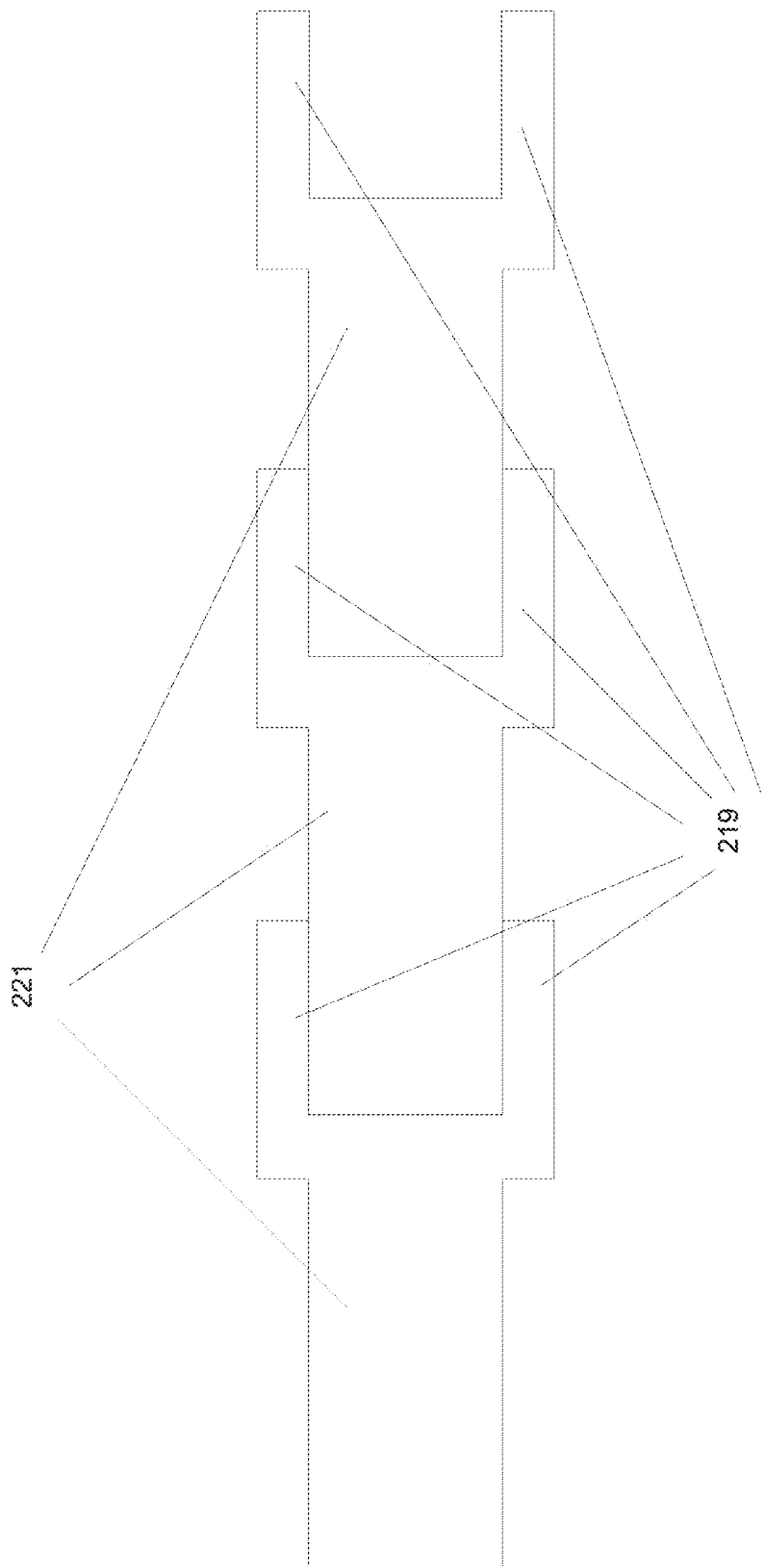
FIG. 32 illustrates how conduits may be coupled using overlap features.

An embodiment that includes an insulated conduit may comprise a plurality 215 of insulated conduits coupled together, as shown in FIG. 31. For example, the conduits may be coupled end to end to form a longer conduit. Conduits may be coupled in series, or in parallel, or both, or in any convenient combination. As in FIG. 30, conduits may include an energy injection source 209, and may also include storage material 203, or they may simply be configured to transport heat transfer fluid, as illustrated by non-collecting conduit segments 217.

Where conduits are coupled, they may include overlap features 219 as shown in FIG. 32, to help connect and attach the conduits 221, to accommodate thermal expansion, or other useful functions.

An embodiment that includes an insulated conduit may provide a means for causing the heat transfer fluid to flow through the conduit, helping to transport heat to a location where it may be converted into work or another useful form of energy. As the flow of the heat transfer fluid may be controlled by any useful combination of valves, baffles, fans, turbines, or the like. Flow of the heat transfer fluid may be instigated by forced convection (i.e. fans, etc.) or means may be provided to cause natural convection to occur, taking advantage of the fact that the heated fluid exiting a conduit is generally more buoyant than the nominally cooler fluid entering a conduit.

Figure 33:
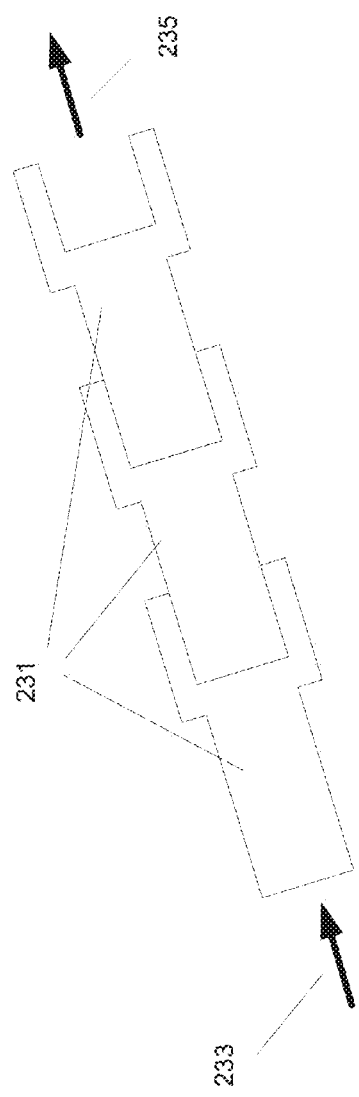
FIG. 33 illustrates the use of a net incline to help induce natural convection.
Figure 34:
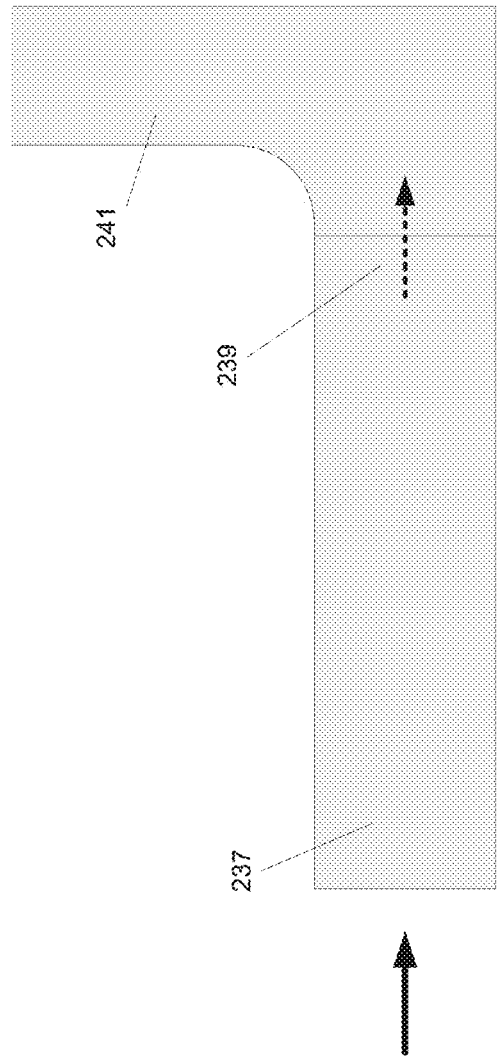
FIG. 34 illustrates the use of a chimney to help induce natural convection.

As shown in FIG. 33, an embodiment may induce natural convection by placing the conduit or group of conduits 231 in such a way that there is a net incline, so that the exhaust 235 of the conduit(s) is higher than the inlet 233. FIG. 34 illustrates the use of a chimney 241 at the exhaust 239 of a conduit 237. In this embodiment, the conduits may be placed nominally all at ground level, with the chimney providing an elevation difference helping to induce convection.

Both forced flow and natural convection systems may be either open or closed. An open system draws in fresh heat transfer fluid from a reservoir (for example, ambient air from the environment) and exhausts it back to a collecting reservoir (again this may be air into the ambient environment). A closed system recirculates its exhaust back to the inlet. An exemplary system will extract heat from the exhaust, converting it to work or another useful form of energy, resulting in the exhaust being cooled. This cooled fluid may then be recirculated back through the system to extract additional heat from the thermal storage material.

Figure 35:
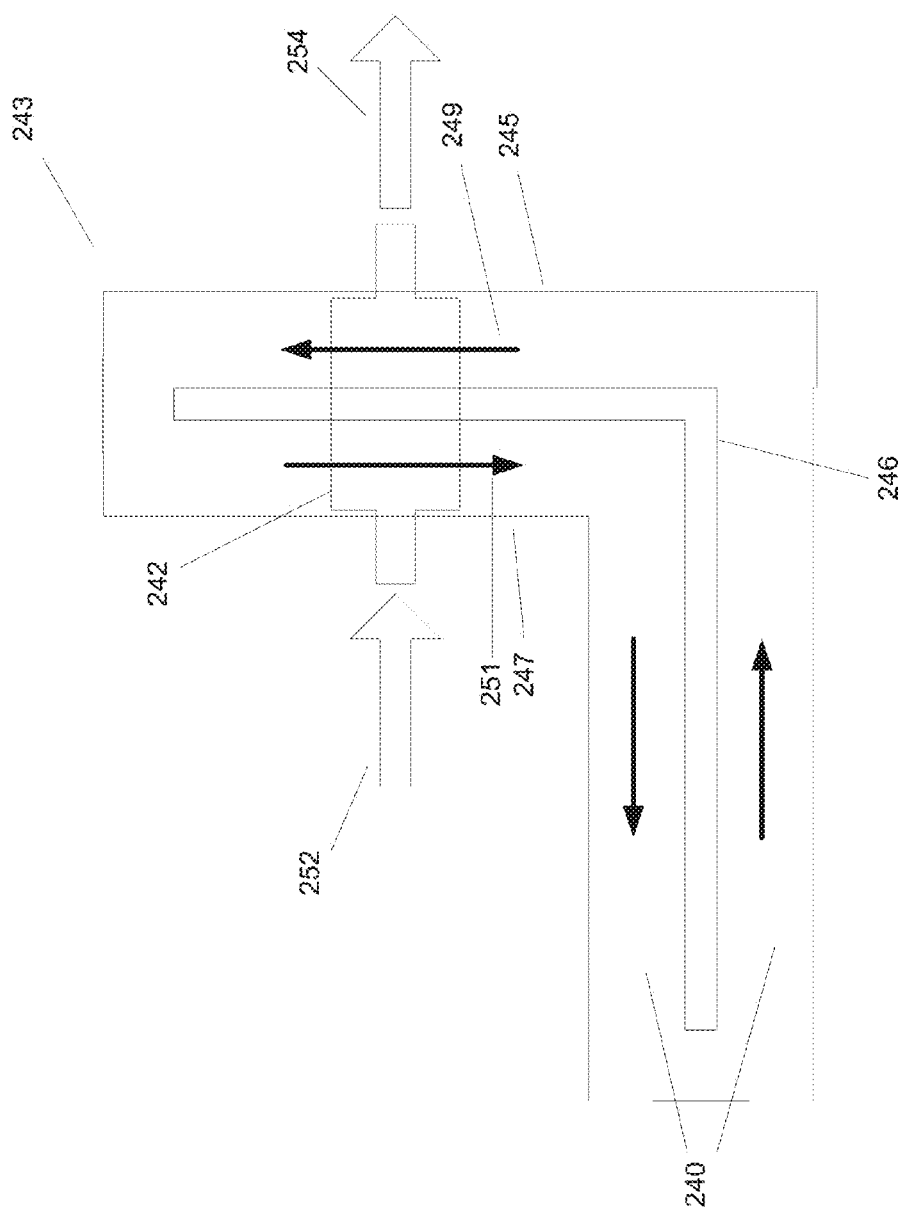
FIG. 35 illustrates the use of a chimney with a counter-flow heat exchanger, helping to both transfer heat and induce natural convection.

All types of forced and natural convection may be used with either open or closed systems. An embodiment of a closed chimney system is shown in FIG. 35. As shown in the figure, conduits 240 form a circuit that provides airflow through chimney 243. A counterflow heat exchanger 242 may be included in both the updraft portion 245 and downdraft portion 247 of chimney 243. A barrier 246 separates the conduits and the two portions of the chimney. In the figure, the cooler part of the heat exchanger is in the downdraft portion, while the warmer part is in the updraft portion. This configuration has the property that the fluid is cooled as it rises up the chimney, losing buoyancy. It then is cooled further as it goes down the downdraft portion, gaining density and naturally sinking. In the figure, rising arrow 249 indicates rising warmer fluid, while arrow 251 indicates sinking cooler fluid. Meanwhile, cool fluid 252 enters the counterflow heat exchanger, while hot fluid 254 exits the heat exchanger and is available to produce other forms of energy.

One embodiment of a system that uses thermal energy couples either container or conduit collection modules, or both, to any process that makes use of heat. An embodiment may include one or more components that generate electricity by including Stirling engines, steam engines, boilers and steam turbines, gas turbines including those operating on the Brayton cycle, thermoelectric generators, and so on.

Another embodiment may use the heat to produce a motive force or for some other benefit, such as in heat-driven pumps, chillers and air conditioners, boilers, and desalination systems. Any system that includes useful conversion of the stored heat to work or another form of energy represents a useful embodiment of the invention.

Figure 36:
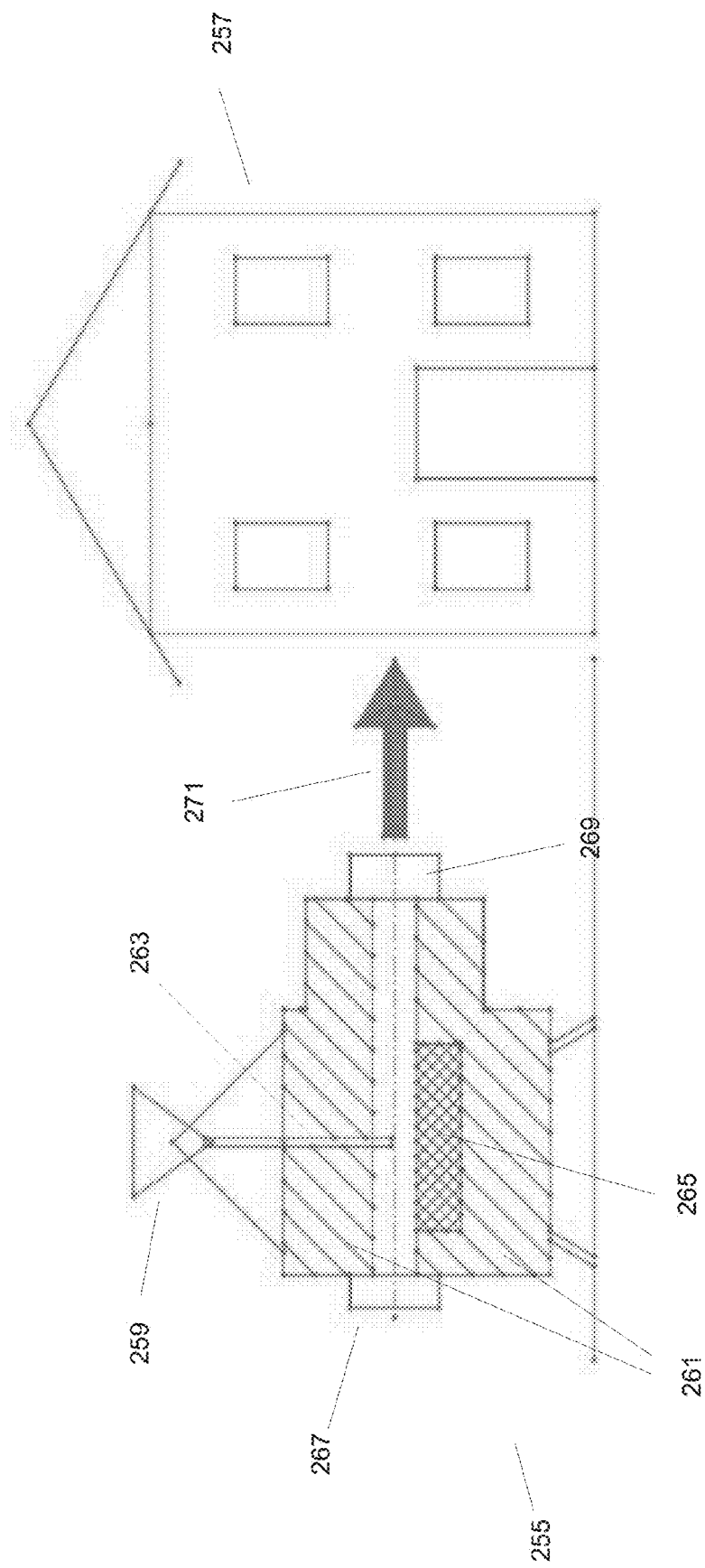
FIG. 36 illustrates a fixed energy collection and storage system providing energy to a home.

The modularity and scalability of both types of collection systems enables embodiments that can be used for home energy or heating purposes, commercial or industrial purposes, or utility-scale energy generation. FIG. 36 shows an embodiment of a home energy system 255 mounted on legs outside a home 257. In the figure, energy is collected by one or more solar energy collectors 259, transferred through insulation 261 by light transfer conduit 263, and absorbed into thermal energy storage material 265. When energy is needed by the home, a fan, valve, or other device 267 causes or permits air to flow through the module. An energy conversion device 269 converts the energy into a useful form (including electricity, hot water, hot air, cold air, or any useful form), which is then transmitted to the home as indicated by arrow 271. Another embodiment may be mounted on the roof of a building, possibly taking advantage of the slope of the building to help induce natural convection.

One useful embodiment includes the transport of the collected and stored energy, either over short distances, such as, for example, a kilometer or less, to a central power conversion facility at a utility-scale power plant, or over long distances, for example, ten kilometers or more, such as to an end user who requires heat for some process. Such processes may include residential (e.g. air conditioning), commercial (e.g., pasteurization), industrial (e.g., drying or boiler firing), or utility-scale (desalination or EOR) processes.

Referring back to FIG. 2, the insulation layer 7 is a key component of the embodiment. A well-insulated embodiment may allow as little as 1% of the stored heat to escape each day. At the temperatures involved, one skilled in the art will appreciate that this may require 1-2 feet of insulation, depending on the composition of the insulation. However, some embodiments may include substantially more or substantially less insulation. In some embodiments the insulation is between 0.1 meters and 5.0 meters thick.

Any convenient insulation may be used. One embodiment may repurpose insulation materials used in the refractory (metal refining) industry. However, such insulations can sometimes be expensive. Especially at utility scale, the opportunity to buy material in bulk may present new opportunities. One embodiment includes insulating material that comprises fumed silica, which can be purchased in bulk at very low prices. Another embodiment comprises insulating material comprising cementitious foam, for example, the commercial product Airkrete.

Any number of different insulating materials may be used. One skilled in the art will appreciate that different materials are best suited to different temperature ranges, so one exemplary embodiment includes a "stack" of insulating materials, with a first material closer to the bed of thermal storage material 3, while a second material is closer to the surface of the container 5, where temperatures are cooler.

In order to improve the insulating properties of the selected materials, it may help to use them under vacuum. Therefore, in one useful embodiment, the insulation 7 comprises an outer skin, which contains the insulating material. The outer skin is generally airtight and has its interior pumped free of air, for example, down to a vacuum level as low as 1 Torr, or even lower.

The outer skin may or may not provide the structural strength to withstand the compression due to vacuum forces.

Therefore in one embodiment, additional internal structural supports help to keep the skins spaced apart. These support structures may include material such as fire brick, which is reasonably insulative but also structurally strong, or they may include any convenient material.

Figure 3:
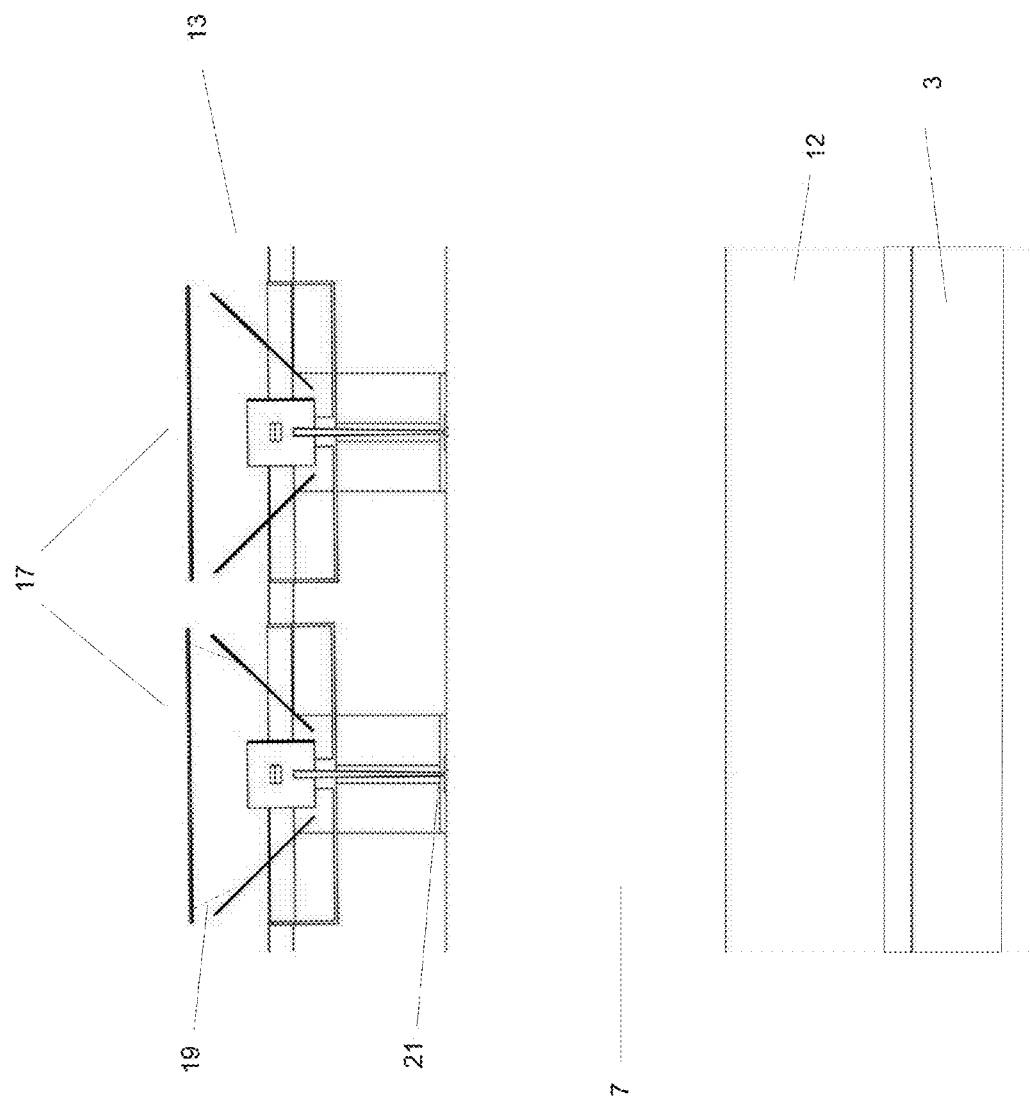
FIG. 3 is a section view of a portion of a thermal energy collection and storage system, as seen from the end of the unit, exposing the optical components of some of the solar collectors.

Referring further to FIG. 3, in one embodiment, the array of concentrating solar collectors 13 comprises one or more individual concentrating collectors 17. FIG. 3 shows a view of a pair of solar collectors and their relationship to the insulation 7 and thermal storage material 3. As shown in the figure, one embodiment of a solar collector brings a cone of converging light 19 to a focus 21, where it is ready for transfer into the bed of thermal storage material 3.

An interesting engineering challenge in producing a practical embodiment of the invention, which requires a significant inventive step—given that the insulation may be quite thick—is transferring the concentrated light from its focal point 21 into the interior of the cavity 11 (of FIG. 2) without allowing heat to escape back out through the insulation.

Figure 4:
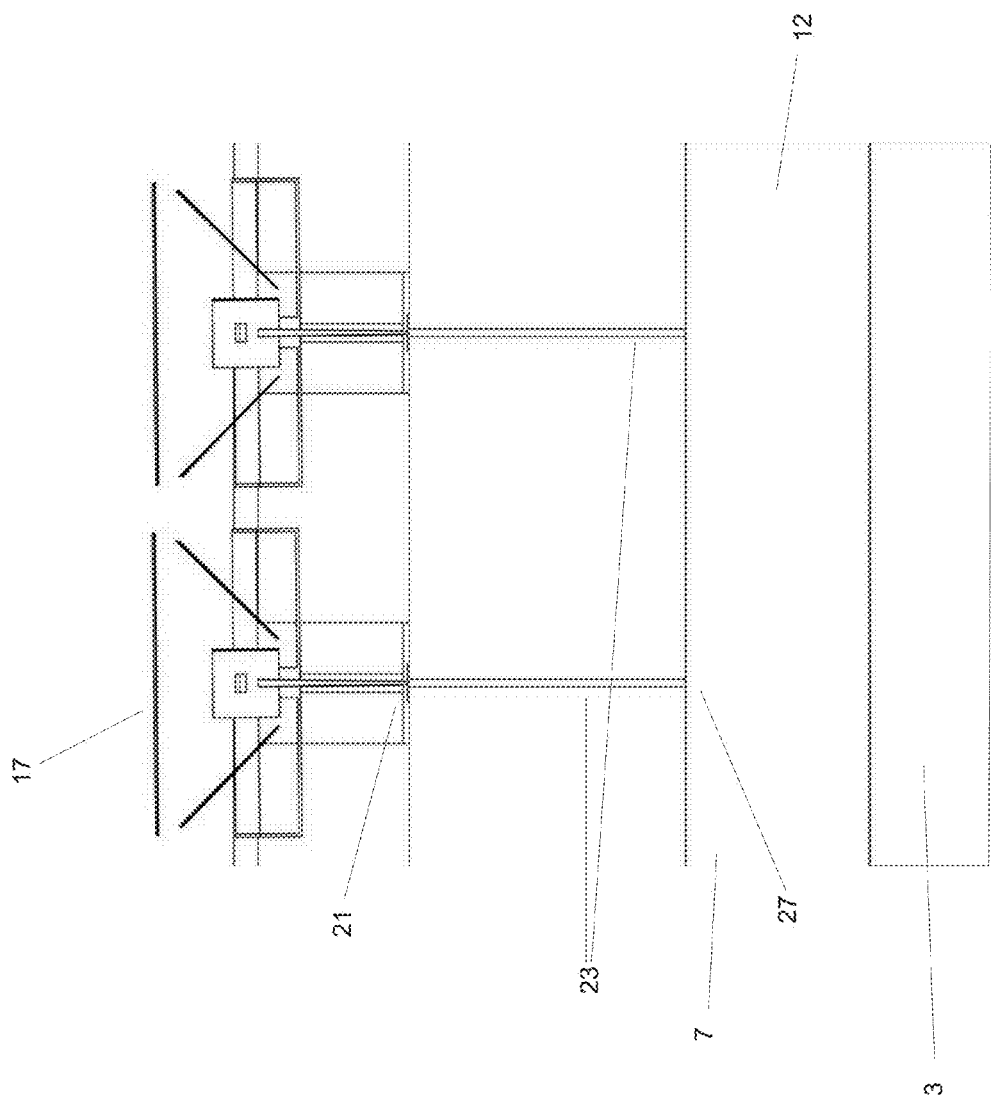
FIG. 4 is a further view of the optical components of the solar collectors, showing aspects of the device that relate to transferring concentrated light through the insulation layer.

One approach is shown in FIG. 4. The figure shows an embodiment with an insulation layer 7 that provides transfer conduits 23 through the insulation, so that the concentrated light can reach the interior of the cavity 11 (of FIG. 2).

One skilled in the art will appreciate that these transfer conduits will lose less heat due to convection and radiation if they are made small.

Heat loss due to radiation follows the Stefan-Boltzmann Law. One skilled in the art will appreciate that the maximum temperature that can be reached by the material within the cavity is related to the concentration factor of the incident sunlight at the input port of the transfer conduit. By way of example, if a concentration factor of 500 is used, an internal temperature of up to about 1400° C. is theoretically possible. Higher concentration factors lead to yet higher theoretical internal temperatures. The theoretical maximum internal temperature is the temperature at which re-radiation from the hot bed of material is in balance with the injection of new radiation from the solar collectors.

Figure 5:
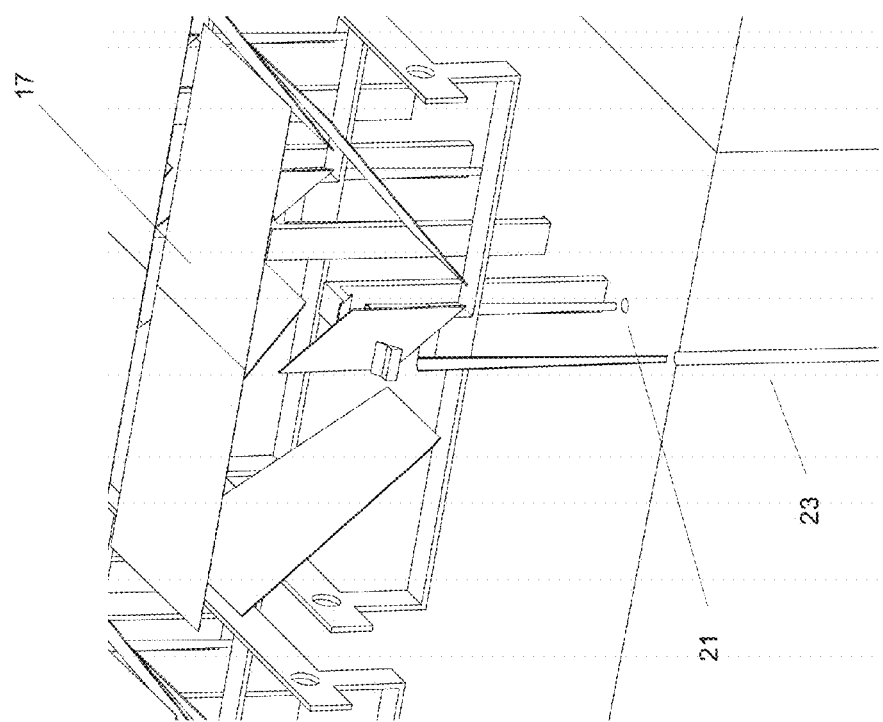
FIG. 5 is a perspective view of the optical components of one of the solar collectors. The figure is drawn to scale.

Because of this re-radiation phenomenon, at night, or anytime sunlight is not available, it may be desirable to "cap" the port to prevent the radiation from getting out. A convenient way to do this is to provide a small mirror that covers the port at either end. For engineering simplicity, one embodiment provides a cap at the input end of the port, where temperatures are cool. One location where the cap may be placed is shown in FIG. 5. At night, or anytime insufficient light is available to provide further heating, a cap mirror may slide or flip into place to reflect potential radiative losses back into the interior of the cavity. FIG. 5 shows an opening at focus 21 that feeds one of the transfer conduits 23; this is one place where a mirror may be placed to help prevent heat loss.

While a simple unfinished narrow port through the insulation is one embodiment for a transfer conduit for transferring light from the focal point 21 to an exit port 27 proximal to the cavity interior 11 and its gap 12, another embodiment that better manages the concentrated light may be useful. It is desirable to transfer a high percentage of the light to the interior with minimal loss.

Figure 6:
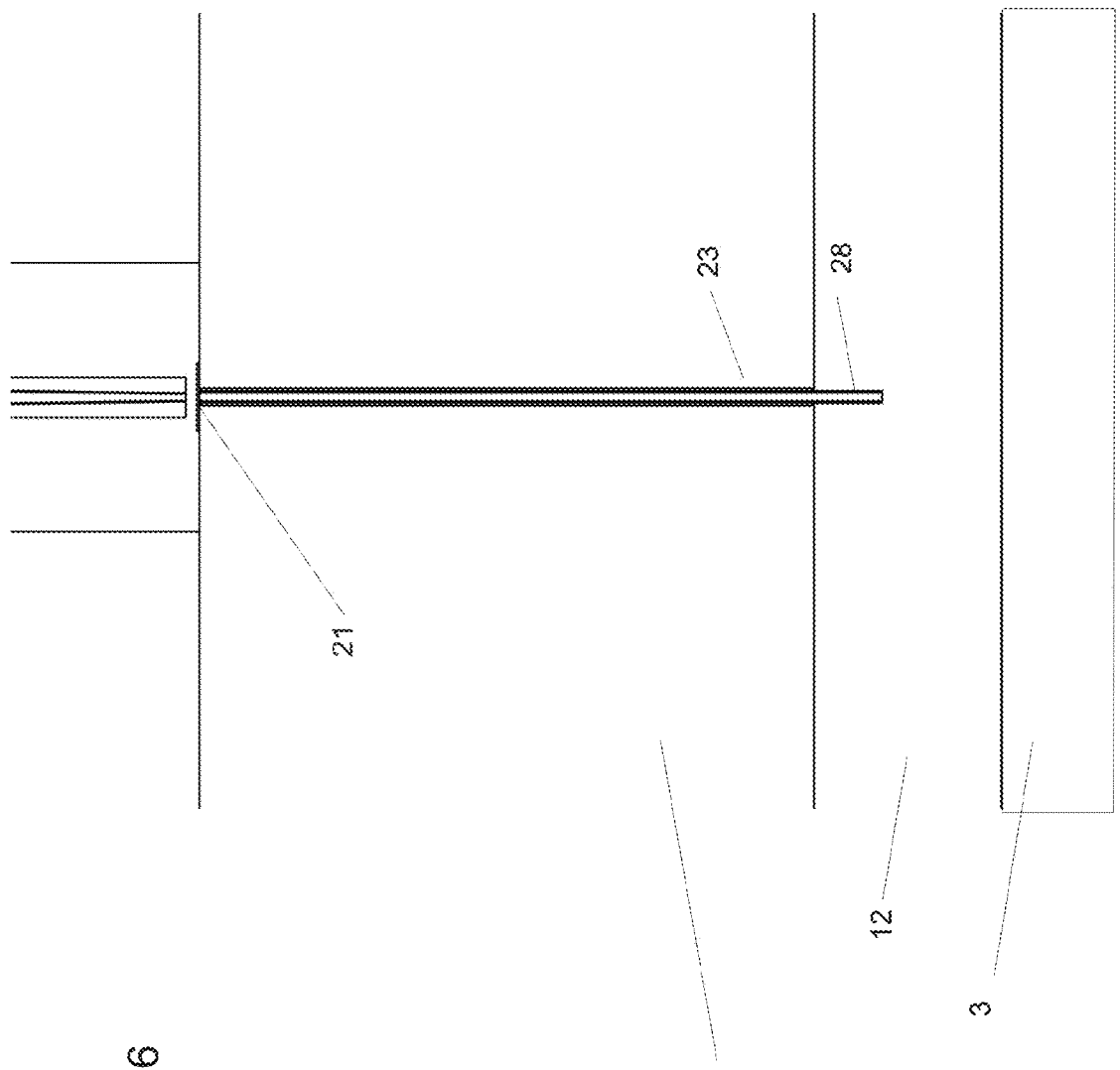
FIG. 6 is a view of a simple light transfer optic for transporting concentrated light through the insulation layer. The figure is drawn to scale.

One embodiment of a transfer conduit includes a light transfer optic that comprises a hollow round or rectangular tube 28 of polished stainless steel, as shown in FIG. 6. This embodiment has two desirable properties—it is highly reflective, so losses are managed, and stainless steel is tolerant of high temperatures.

Another embodiment comprises a glass rod with a mirror coating on its exterior. The challenge for this embodiment, however, is that it may be expensive to provide a mirror coating that can withstand the high temperatures of 1000° C. or more that may be present at the exit port.

One useful embodiment therefore takes advantage of the phenomenon of total internal reflection (TIR), which provides theoretically lossless reflections without requiring a mirror coating.

Figure 7:
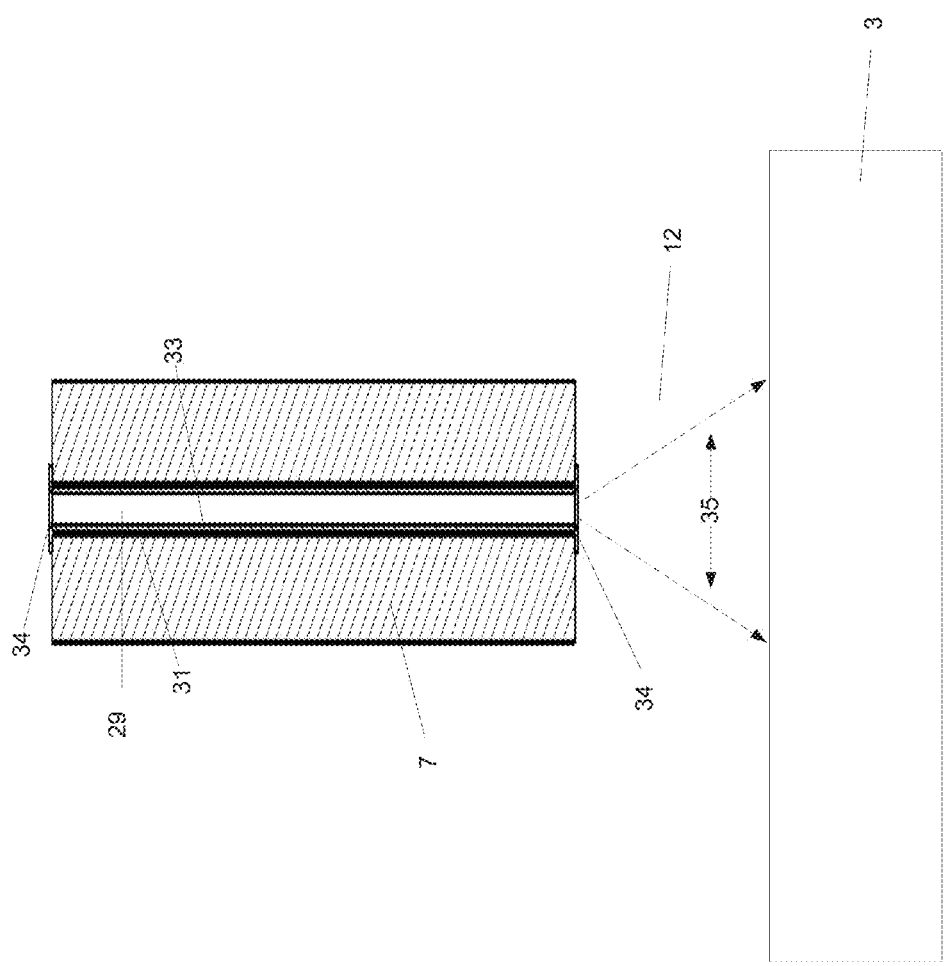
FIG. 7 is a schematic view of a light transfer optic including a glass rod and a ceramic straw.

FIG. 7 shows one embodiment for a light transfer optic. It comprises a rod of glass 29, enclosed in a thin ceramic "straw" 31. In one exemplary embodiment, the rod of glass may comprise a glass suitable for high temperature use, including pyrex, or even fused silica. However, any suitable glass will do.

The physics of TIR require that nothing be touching the glass rod; otherwise light can leak out at the contact points. In one embodiment, a narrow air gap 33 (shown with horizontal hash marks) is therefore provided by the ceramic straw 31, which does not substantially contact the glass rod, providing contact only as necessary in order to help support the rod. The ceramic straw provides a convenient assembly for handling and installation, is a good insulator, and protects the glass rod from dust.

The air gap 33 provides an (undesirable) path for convective losses, so is kept narrow in this embodiment, such as narrow as a millimeter. However, any convenient gap width may be used. By way of example, the gap may be as wide as 1 cm, or even as wide as 5 cm, or even wider.

In an exemplary embodiment, convective losses are controlled by washers 34 at the top and bottom of the tube. The washer at the bottom of the tube may comprise ceramic for temperature tolerance. The washer at the top may also comprise ceramic, but any convenient material will do.

Further convection control can be achieved by adding additional (often thin) washers along the length of the rod, if desired. Any contact point will tend to lead to some loss of light, so engineering may be used to guide the balance between energy lost to convection and to lost light.

In one embodiment, the transfer conduit is substantially straight.

In one embodiment, the transfer conduit comprises an energy transfer component that is substantially a solid monolith of material.

Referring back to FIG. 2, a typical embodiment may include a gap 12 between the bed of thermal energy storage material 3 and the upper layer of the insulation 7. One skilled in the art will appreciate that extremely intense concentrated solar energy may emerge from the exit port 27 of the light transfer conduit 23 of FIG. 4. While many energy storage materials 3 exist that can tolerate this level of radiation, an embodiment may choose to avoid needless heat concentrations within the material by providing a gap 12.

By providing a gap 12, the light emerging from the transfer conduit 23 has room to expand in a cone 35, as shown in FIG. 7, before reaching the energy storage material. This helps to spread the heat more evenly, which helps in many practical ways.

Another embodiment that may have practical utility in some applications uses another type of transfer conduit to transfer energy from focal point 21 to the cavity interior 11. In one embodiment, the transfer conduit is a simple heat-conducting rod, comprising a metal such as steel. In this embodiment, light at the focal point is absorbed into the rod and is transmitted into the interior by thermal conduction. While this process tends to be inefficient and lossy compared to the light transfer conduit, it may be low cost and may be useful, especially in systems operating at lower temperatures.

In one embodiment, the transfer conduit is long and thin. By way of example, the transfer conduit may be at least ten times longer than it is wide, or even twenty times longer, or even longer.

In one embodiment, the transfer conduit provides transport through a substantial thickness of insulation, as much as 10 cm, or 50 cm, or even up to a meter or even thicker. The long length of the transfer conduit helps to enable a thick insulation layer, minimizing energy loss. Likewise, a thin conduit helps to minimize conductive and convective losses through the conduit itself, which is typically not as good an insulator as the insulation material.

Regardless of the embodiment of the transfer conduit, an embodiment of the invention may provide the thermal storage material proximal to the energy collection system.

In order to achieve efficient transfer of the focused light 21 to the interior 11 of the cavity, it is desirable that the incident light be provided at both the proper location and with a desired limited range of incidence angles. This task is the job of the concentrating solar collectors 17.

While it is possible to provide non-tracking collectors, the high concentrations required to achieve high temperatures (400° C. to 1000° C. or more) will generally require a tracking collector.

While any tracking collector known to one skilled in the art may be used, one embodiment of a tracking collector is shown in FIGS. 8-14.

Figure 8:
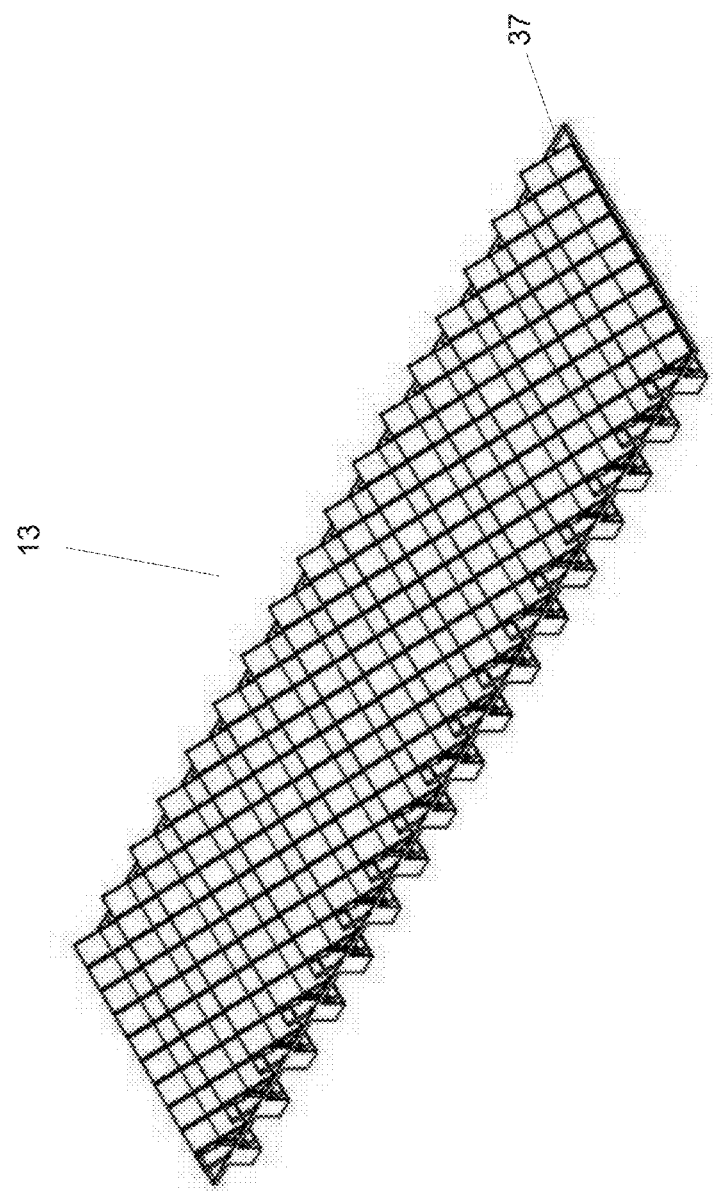
FIG. 8 is a perspective view of an array of collecting optics such as might comprise an upper portion of a solar thermal energy collection and storage system.

A concentrating solar collector 17 (FIG. 5) redirects incident solar radiation onto the thermal storage material 3. One embodiment of an energy injection source comprises a solar collector assembly 13, comprising individual collectors mechanically coupled to a frame 37, as shown in FIG. 8.

Each concentrating solar collector includes an input aperture to receive incident solar radiation and an exit aperture through which it delivers this radiation to the thermal storage material. To minimize thermal losses due to convection and radiation it is advantageous for the exit apertures to be substantially smaller than the entrance apertures. The ratio between the entrance and exit apertures is the geometric concentration ratio of the optical assembly.

To collect solar radiation, the concentrating optical assembly 17 must point the entrance apertures substantially toward the sun. This requires that the collectors have one or more degrees of freedom. In one exemplary embodiment, collectors have two rotational degrees of freedom.

In one exemplary embodiment, the concentrating optical assembly 17 delivers solar radiation to the thermal storage material through fixed transfer conduits 23 in the insulating material. The concentrating optical assembly therefore must provide a means to transport solar radiation from articulating entrance apertures to fixed exit apertures. One embodiment includes a combination of concentrating optical elements and fold mirrors. In particular, one exemplary embodiment includes two concentrating optics and five fold mirrors (with one of the fold mirrors having two sides, so effectively acting as two mirrors).

Figure 9:
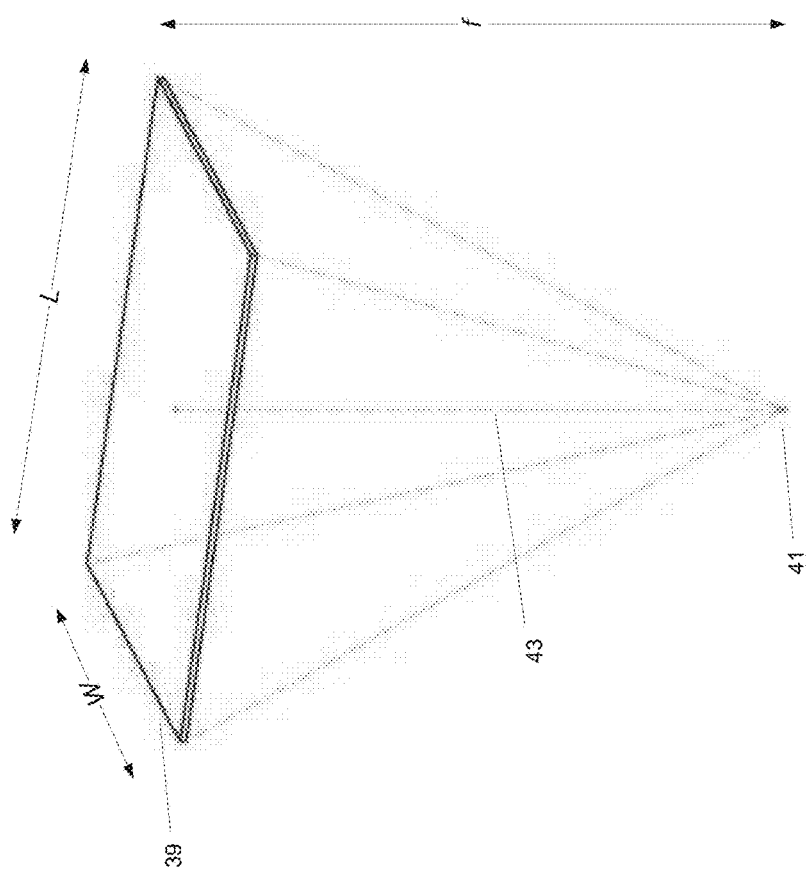
FIG. 9 is a Fresnel lens forming one of two entrance apertures in a collector module.

In one exemplary embodiment, shown in FIG. 9, the entrance aperture is a rectangular point focus Fresnel lens 39 having length L, width W, and focal length f. For clarity we will assume that L>=W. Incident solar radiation substantially normal to the plane of the lens is concentrated at the nominal focus of the lens 41. In one embodiment, the concentrating optical assembly includes a plurality of Fresnel lenses that articulate so that each lens rotates about its focal point. In practice, implementation of such a mechanism may be impractical as it requires the axes of rotation to be coincident with the target plane. Consequently, a typical embodiment allows articulation of the entrance aperture non-coincident with the focus of the optical system.

One observes that rotating the Fresnel about its optical axis 43 does not alter the location of the focus 41. Modifying the optical axis using fold mirrors advantageously allows portions of the optical assembly to be articulated without moving the focus.

In one embodiment, a primary fold mirror 45 is therefore placed relative to the Fresnel lens to redirect the focus rays into a direction generally orthogonal to the optical axis 43 of the Fresnel, as indicated by the folded optical axis 47, with the fold mirror bringing the light to a new focal point 49. This is shown in FIG. 10A in a side view and in FIG. 10B in a perspective view.

The primary fold mirror 45 is oriented at about 45 degrees relative to the optical axis 43 of the Fresnel lens 39, and redirects rays into a direction that is generally aligned with the folded optical axis 47. The distance from the Fresnel lens to the fold mirror along the optical axis dictates the size of the fold mirror required to intersect the ray pyramid from the Fresnel. Increasing the distance will tend to allow a useful embodiment to decrease the fold mirror size and move the reflected focus 49 closer to the original optical axis 43. The effective optical axis 47 of the reflected beam defines an axis about which the Fresnel and fold mirror can rotate without affecting the location of the focus 49. Consequently the positioning of the primary fold mirror 45 can be chosen to advantageously define a rotation axis of the concentrating assembly. For clarity we define this axis of rotation, which is coincident with effective optical axis 47, as the tip axis.

In an exemplary embodiment, to enable articulation of the Fresnel lens and primary fold mirror about a second axis of rotation, a secondary fold mirror is included. This fold mirror may be positioned before the redirected focus 49 and oriented so that the rays are redirected perpendicular to the tip axis of rotation and coincident with the primary axis of rotation. For clarity we define this new axis of rotation as the tilt axis 53. In an exemplary embodiment, the secondary fold mirror is large enough to reflect rays over the full range of the tip axis rotation.

Figure 11:
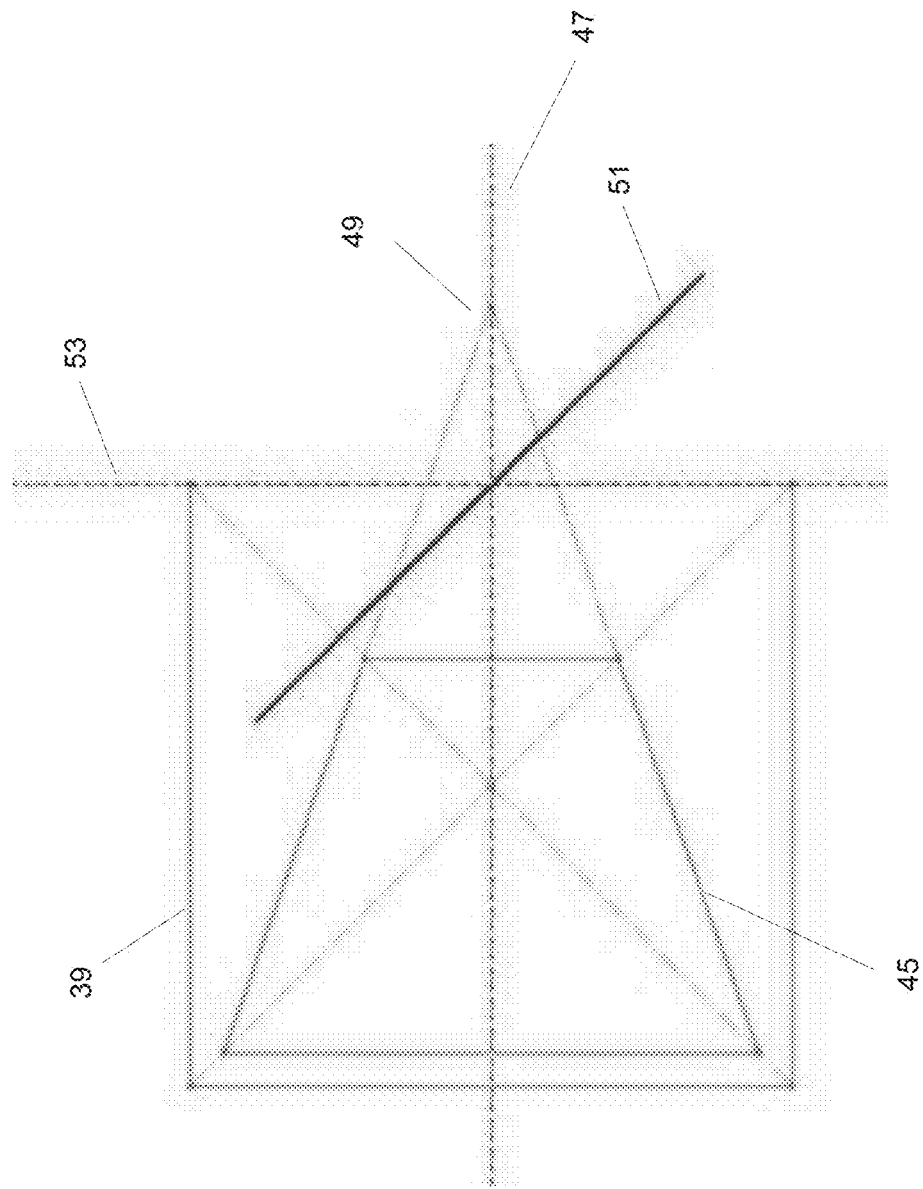
FIG. 11 is a top view helping to illustrate the plane of the secondary fold mirror in a collector module.

FIG. 11 shows a top view projection of the Fresnel lens 39 and primary fold mirror 45. The secondary fold mirror is located on a plane 51 that intersects the primary and secondary rotation axes and is generally orthogonal to the plane defined by these axes. In an exemplary embodiment, the angle between the plane 51 and the secondary rotation axis 47 is around 45 degrees.

Figure 12:
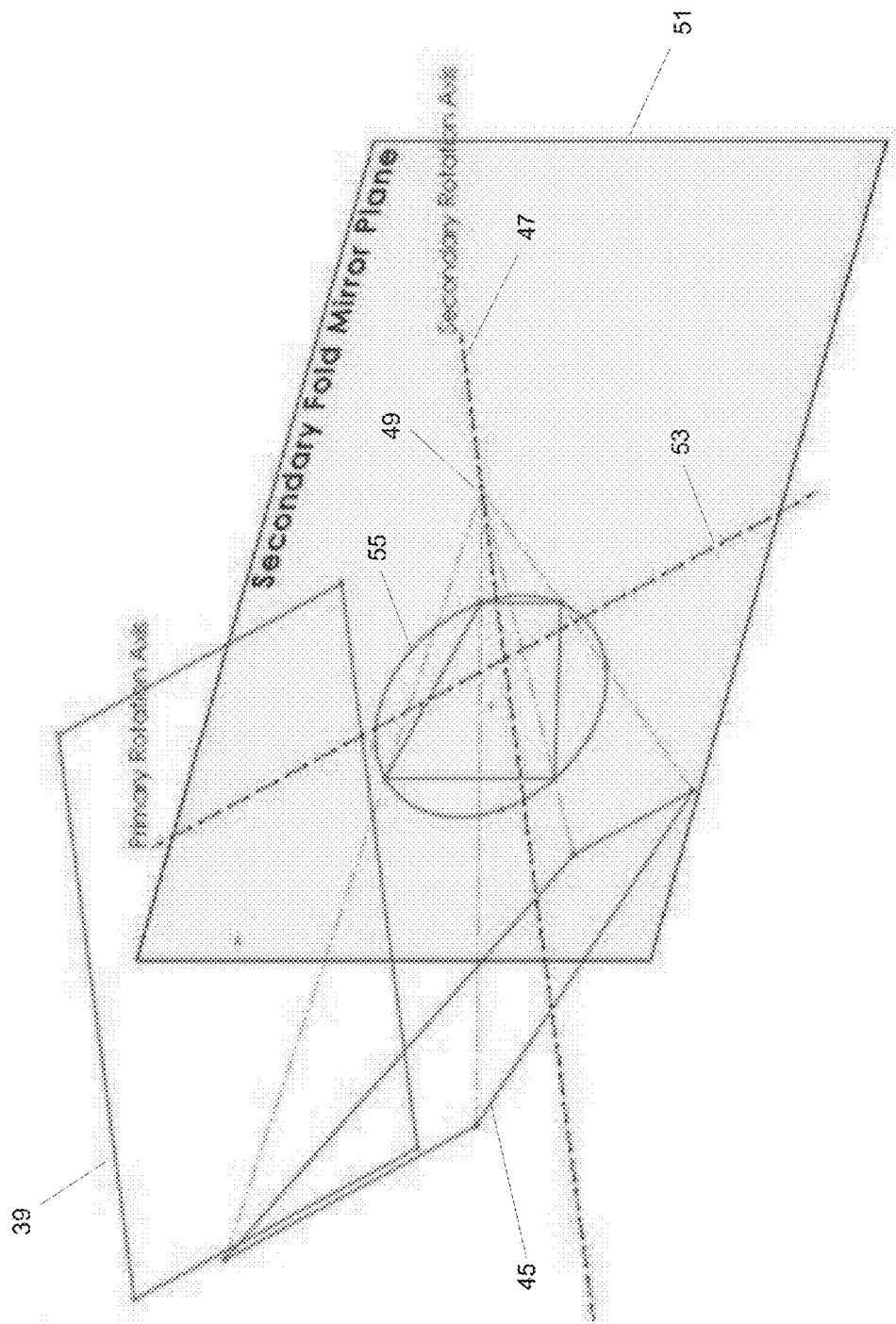
FIG. 12 shows the secondary fold mirror plane, and the mirror rotation axes, of a collector module.

FIG. 12 is a perspective view of the Fresnel 39, primary fold mirror 45, and the secondary fold mirror plane 51. A possible minimum extent of the secondary fold mirror is determined by the intersection of the secondary fold mirror plane 51 and the extreme rays from the primary fold mirror 45 as it rotates about the tip axis 47. Extreme rays emanate from the corners of the primary fold mirror and pass through the focus 49 on the tip axis. The intersections of these rays with the secondary fold mirror plane define an ellipse which is the locus of intersections of these extreme rays with the plane. In one embodiment, this ellipse defines a minimum extent of the secondary fold mirror. In one embodiment the secondary fold mirror is an ellipse 55 having a shape defined by these loci of points. In an alternative embodiment, the secondary fold mirror is another shape that is a superset of these loci of points.

The secondary fold mirror 55 reflects rays to a focus that lies on tilt axis 53. This advantageously allows the Fresnel 39, primary fold mirror 45, and secondary fold mirror 55 to rotate about this axis as a rigid body and not affect the focal point of the optical system. However, because it may not be practical to have the focus of the optical system lie along the tilt axis, in one exemplary embodiment, a tertiary fold mirror 57 may be placed before the focus to redirect the rays in a more suitable direction.

Figure 13:
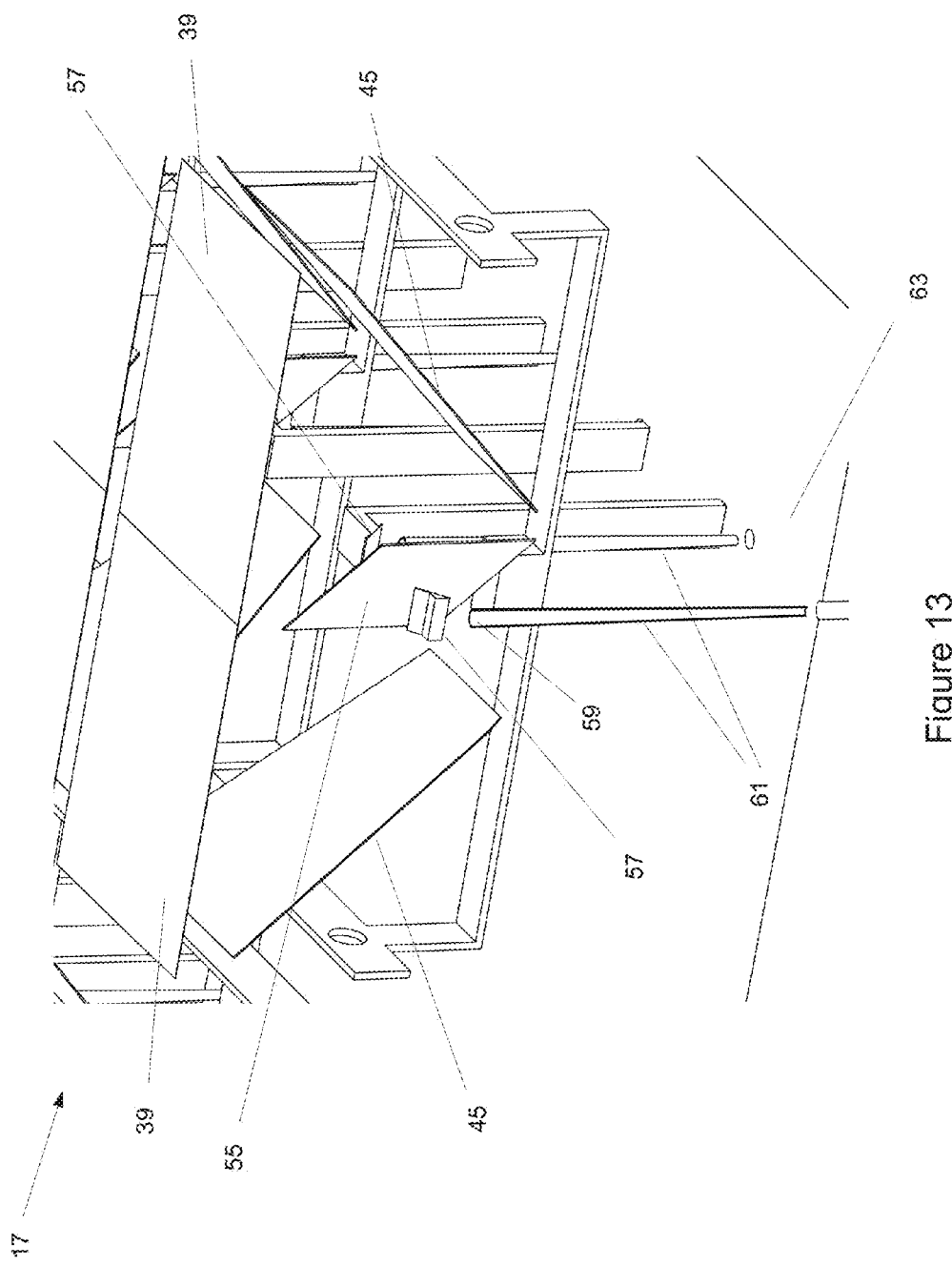
FIG. 13 is a perspective view of a collector module. The figure is drawn to scale.

In FIG. 13 the tertiary mirror plane is defined to intersect the tilt axis at a distance (d) before the virtual focus. The tertiary mirror plane makes about a 45 degree angle relative to the tilt axis. In one embodiment the tertiary mirror plane is oriented such that the optical axis at the focus of the optical assembly is substantially parallel to the normal vector of the target plane 63. In another embodiment the tertiary mirror plane is oriented such that the focus of the optical assembly is at a fixed angle to the normal vector of the thermal target plane. In such an embodiment, the angle may be advantageously chosen to bias the articulation ranges in one or more rotation axes due to the latitude of the installation.

One minimum extent of the tertiary fold mirror is an ellipse defined by the intersection of rays from the secondary fold mirror to the virtual focus and the tertiary fold mirror plane.

A key aspect of this optical design is that the focus 59 of the concentrating optical assembly after the tertiary fold 57 is fixed and independent of the articulation of the collector assembly elements about the tilt and tip axes. The location of the focus in an embodiment may be not coincident with the target plane 63. To deliver the solar radiation to the target plane, a so-called secondary concentrating element 61 may be included in the optical assembly to act as a concentrating light pipe to transport radiation from the focus 59 to the target plane 63. In one embodiment the secondary concentrator may be a hollow truncated conical reflector having an entrance aperture proximal to the focus 59 of the optical assembly, as shown in FIG. 14. The entrance aperture diameter may be advantageously chosen to account for pointing and other mechanical tolerances to help ensure that incident radiation is collected and delivered to the target plane. The exit aperture diameter may be advantageously chosen to provide additional geometric concentration.

The functions of the secondary concentrator and the light transfer conduit may be combined. By way of example, one embodiment includes a tapered light transfer conduit, whose entrance aperture area is larger than its exit aperture area.

In another embodiment, the light transfer conduit may have an exit aperture larger than the entrance aperture. While this would tend to reduce concentration and maximum temperature, it may have other useful benefits.

In one embodiment, the entrance-to-exit aperture area ratio may be as low as 0.1 or even lower, or as high as 10.0 or even higher.

A key aspect of one embodiment is the "shared" nature of secondary mirror 55. Whereas in one embodiment the collector 17 includes two collecting lenses 39 as shown in FIG. 13, the two apertures share a common secondary plane 51, and may thus share a common secondary optic 55, if it is double-sided. The illustrated embodiment, therefore, includes a secondary mirror 55 that is mirrored on both sides.

In an alternative embodiment, the secondary concentrator 61 is a hollow cylinder. In another alternative embodiment the secondary concentrator is a hollow rectangular frustum. In another alternative embodiment the secondary concentrator is a hollow rectangular pipe. In another alternative embodiment the aforementioned secondary concentrator elements are solid transparent elements that rely on total internal reflection to deliver the solar radiation to the target plane. In practice, any convenient shape may be used that transports rays from the focus 59 to the target plane 63.

In another embodiment, an alternative optical system using a Risley prism may be used to help steer the incident sunlight beam. The optical system developed and marketed by Zettasun, Inc. of Boulder, Colo. (US patent application 2010/0175685), the entirety of which is incorporated herein by reference, uses a Fresnelized Risley prism and lens to redirect and focus incident sunlight.

Figure 16:
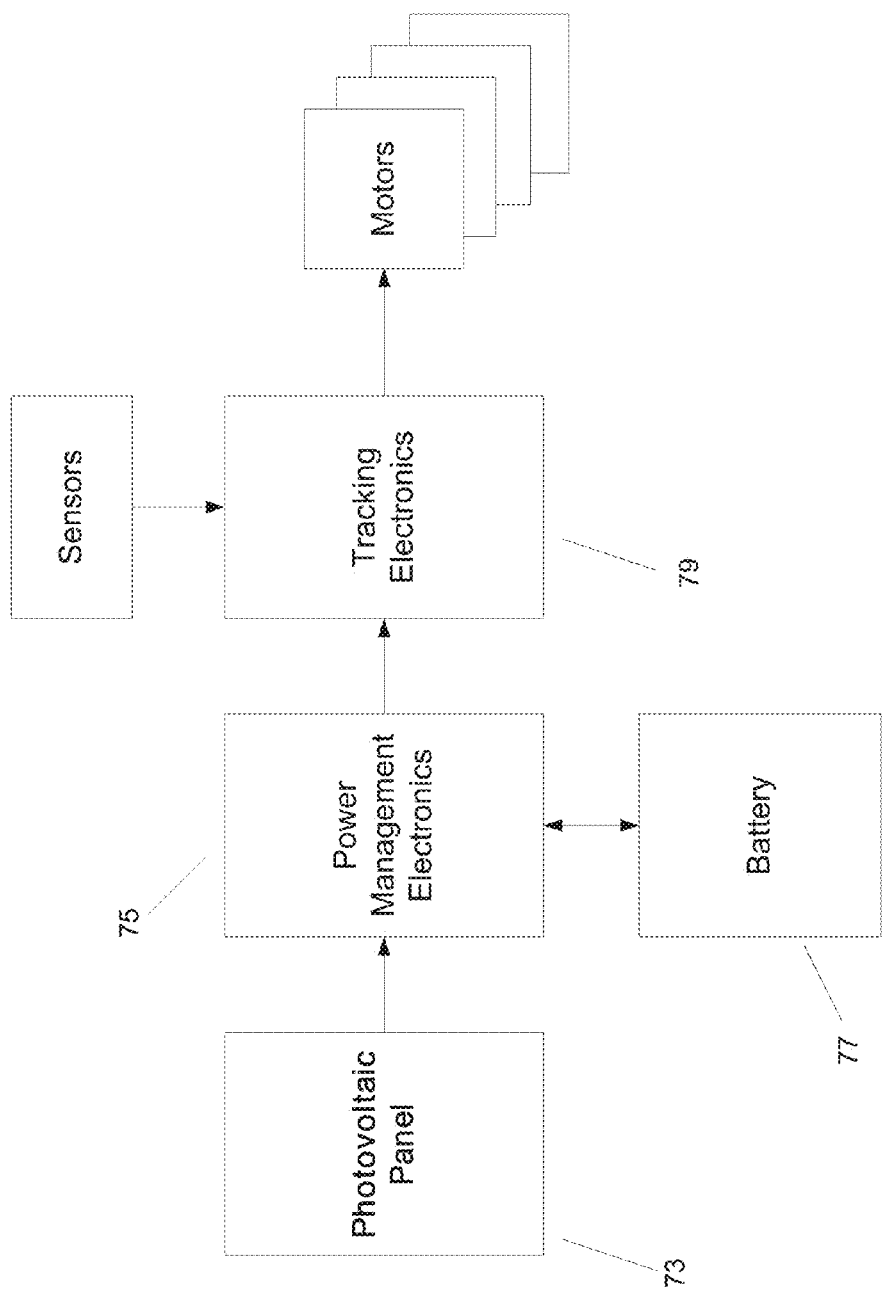
FIG. 16 is a block diagram of a power and control system that can operate an embodiment of the invention.

In order to collect maximum energy, it is necessary to point the tracking collector at the sun properly, and also to properly articulate the intermediate optics. Many approaches are possible, and any method known to one skilled in the art may be used to point the collector. One difficulty that may arise in some practical applications is related to the portability of the system and the concomitant uncertainty about system geometry on any given day. To help mitigate these concerns, one useful embodiment includes a closed loop tracking system to help point the collectors. Closed loop tracking systems tend to be tolerant of temperature and other systematic variations in the system. An embodiment may use any closed-loop tracking scheme that causes the collectors to sense and point at the sun. A block diagram for such an embodiment is included in FIG. 16.

In order to help a central control station track the state of each container, an exemplary embodiment provides simple temperature monitoring of the thermal storage bed. Any wired or wireless communications approach may be used. In one embodiment, a wireless ZIGBEE™ mesh network is provided for communications, and each container is a node on the network. At convenient intervals (e.g. once per hour), each node reports its status to the central control station. The central control station then may select units for energy extraction as desired, and also may monitor for anomalies and can retrieve units for service as needed.

Proper pointing of the collector assemblies 17, comprising moving optical elements 39, 45, and 55, may be done via any convenient combination of motors and mechanisms. In one embodiment, these three elements may be mounted in a frame that holds them fixed relative to one another, and then a mechanism may be used to rotate them about the axes of rotation 47 and 53 of FIG. 12. While many such mechanisms are possible, one embodiment of a mechanism is shown in FIG. 15A.

In the figure, it can be seen that groups of collector assemblies 17 have been placed together in a pivot frame 65. Pivot frame 65 can pivot about its long axis, driven by motor 67, thus causing rotation of the entire group of supported collector assemblies about their primary rotation axes 53, which axes tend to be approximately coincident within the group of collector assemblies.

One skilled in the art will appreciate that the size of the collector assemblies tends to be related to the size of the individual collector apertures 39, while the complexity of the collector assemblies is related to the number of collector apertures. In order to help reduce or minimize cost, it is helpful to optimize the collector apertures to balance cost and complexity.

One embodiment includes a smaller number of large collectors, including collecting apertures with an area as high as 0.2 square meters, or even as high as 1 square meter or even 2 square meters or even higher.

Another embodiment includes a larger number of smaller collectors, with an area as small as 0.2 square meters, or even as small as 0.01 square meters, or even as small as 0.001 square meters or even smaller.

Figure 15B:
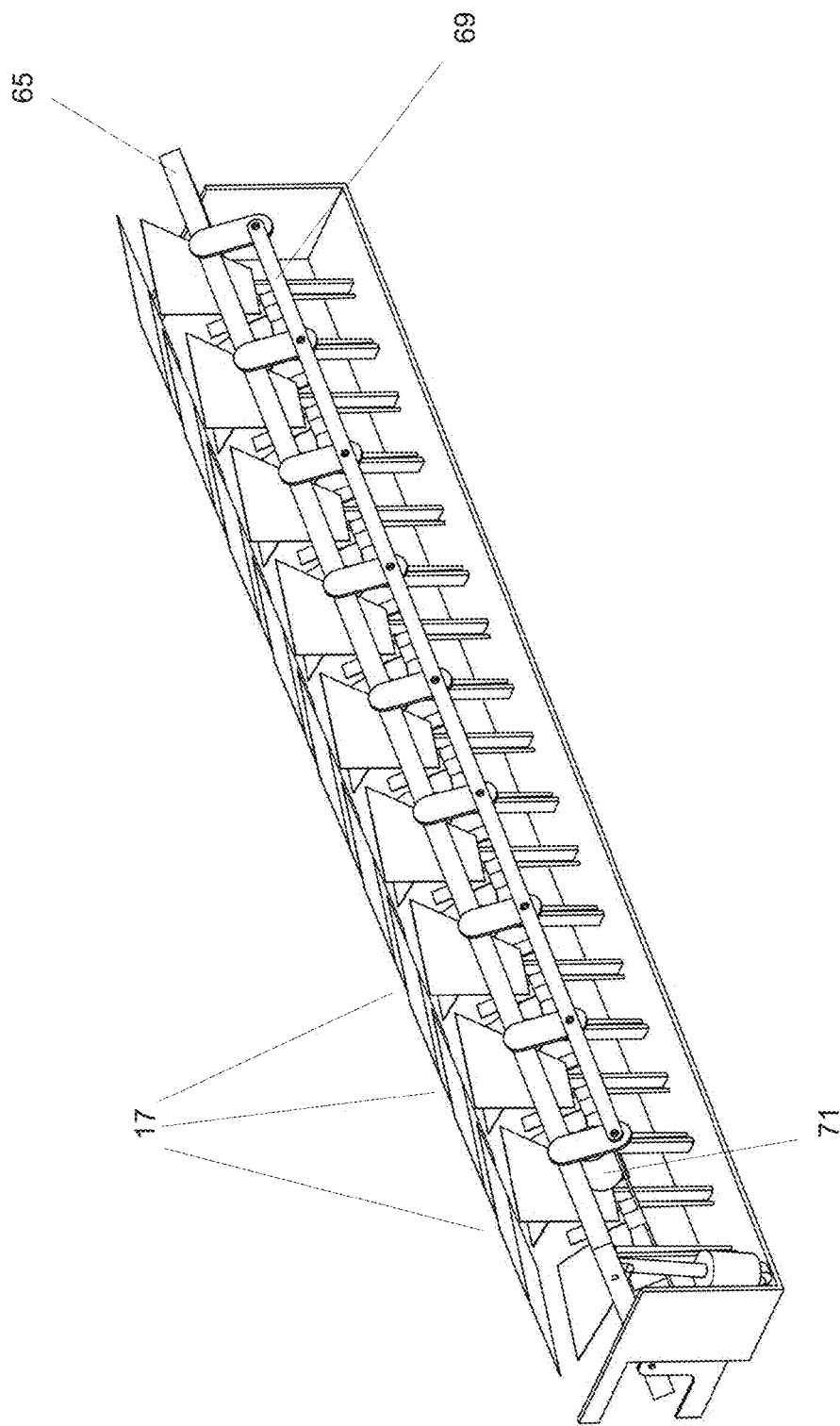
FIG. 15B is a perspective view of a mechanism used to articulate the secondary axis of the collector modules. The figure is drawn to scale.

Continuing, and referring further to FIG. 15B, which shows a single pivot frame 65 with its supported collector assemblies 17, the illustrated embodiment then uses a linkage 69 driven by a motor 71 to pivot the supported collector assemblies in a ganged fashion, causing each individual collector assembly to pivot about its secondary rotation axis 49.

Since some embodiments of the system are portable, it may be helpful if an embodiment requires no external power. In one exemplary embodiment, shown in FIG. 16, one or more small photovoltaic panels 73 and a small backup battery 77 provide power to power management electronics 75 that provide conditioned power to tracking electronics 79 that implement a closed-loop tracking capability of the system, all using techniques well known to those skilled in the art. Since, in a typical embodiment, the optical elements are quite light and are protected from wind, and since they move very slowly, power consumption may be quite small even for a large assembly, perhaps even as little as 25 watts when moving and 1 watt or less when idle.

Because some embodiments protect the optics under a glass cover, one skilled in the art will appreciate that light losses can occur whenever light enters or exits the glass. A typical embodiment therefore provides an antireflective (AR) coating on the interior side of the cover glass or other transparent cover 15. A coating may also be provided on the exterior of the cover, but coatings that can resist damage from environmental forces such as blowing sand tend to be expensive, so an embodiment may omit an exterior coating.

A typical embodiment may also provide AR coatings on both sides of the Fresnel lenses and on the input and output of the non-imaging concentrator element 63, and on the input and output of the light transfer optic 29. A useful anti-reflective coating present in an exemplary embodiment is magnesium fluoride, due to its low cost.

In one embodiment, collector assembly 17 described earlier may have a range of motion in one axis that is limited to around 90 degrees. In order to help this limitation to have minimal impact, one embodiment of the invention may provide an overall tilt to the optical system. By way of example, in the northern hemisphere, the optical system may be tilted in a generally southern direction.

Figure 17B:
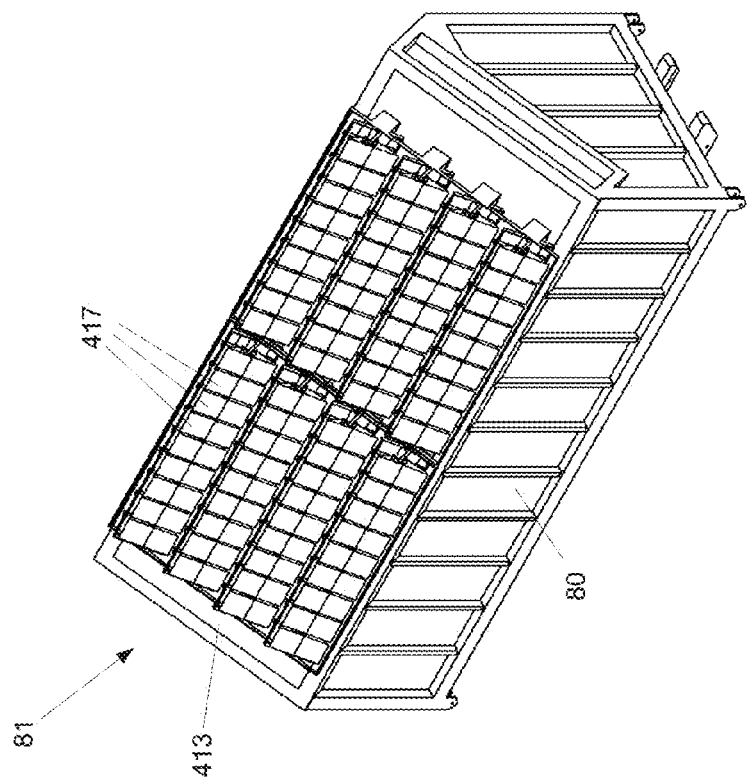
FIGS. 17A and 17B are perspective views of an embodiment with an angled top. The figure is drawn to scale.
Figure 17A:
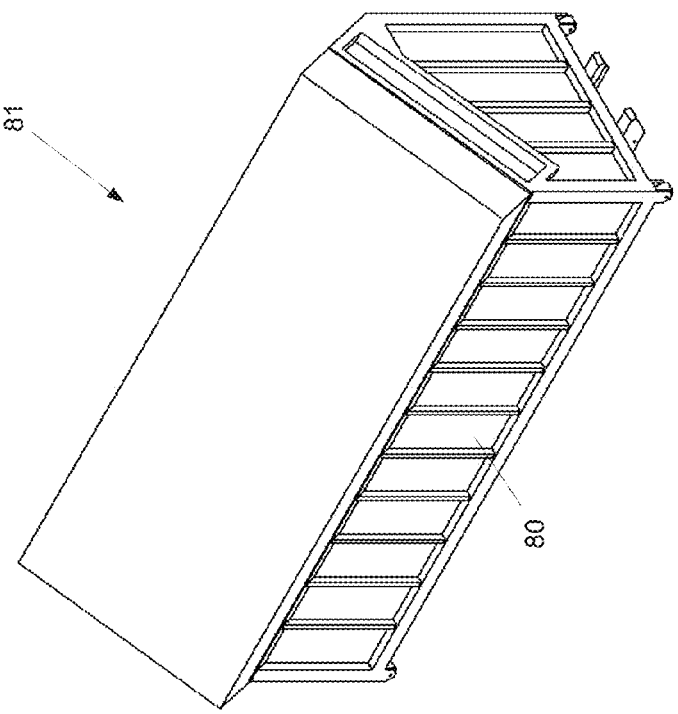

An alternative embodiment that helps provide tilted optics is shown in FIGS. 17A and 17B. In these figures, a modified system 81 is shown. In FIG. 17B, the transparent glass cover has been removed to show the interior. In this embodiment, rather than tilting the individual optical assemblies 417, the entire collector array 413 has been tilted to one side. This helps to both reduce the impact of any limited range of motion in the primary axis of collector assemblies 417, and also helps to minimize the degree to which individual collectors block each other from receiving light. One skilled in the art will appreciate that in the northern hemisphere, for example, such an embodiment may be deployed with its lower side to the south and its higher side to the north. In the figures the collector array 413 is mounted to an angled container 80. In the embodiment, insulation layer 7 has been replaced by a modified insulation layer (not shown) that conforms to the angled container. The bed of thermal storage material may be substantially similar to the bed of thermal storage material 3 of FIG. 1, but the interior cavity will thus tend to take on a different shape from cavity 11 of FIG. 2.

Following is a discussion of how various embodiments of the invention may be integrated into useful systems.

FIG. 18 is a block diagram of an embodiment of a power system incorporating an embodiment of the invention, connected to a remote cellular phone tower to help provide power for cell phone signal relay and transmission. The solar thermal collection system 1 is coupled to a static heat extraction system 91, which is coupled to a heat engine 93, which produces electricity to power the cellular installation 95. The heat extraction method may be any useful heat extraction method known in the art, including conducting rods or liquid-filled pipes embedded in the bed of thermal storage material. The heat engine may include any useful heat engine or heat-to-electricity device known in the art, including Stirling engines, steam engines, thermoelectric devices, thermal photovoltaic cells, or the like.

Figure 19:
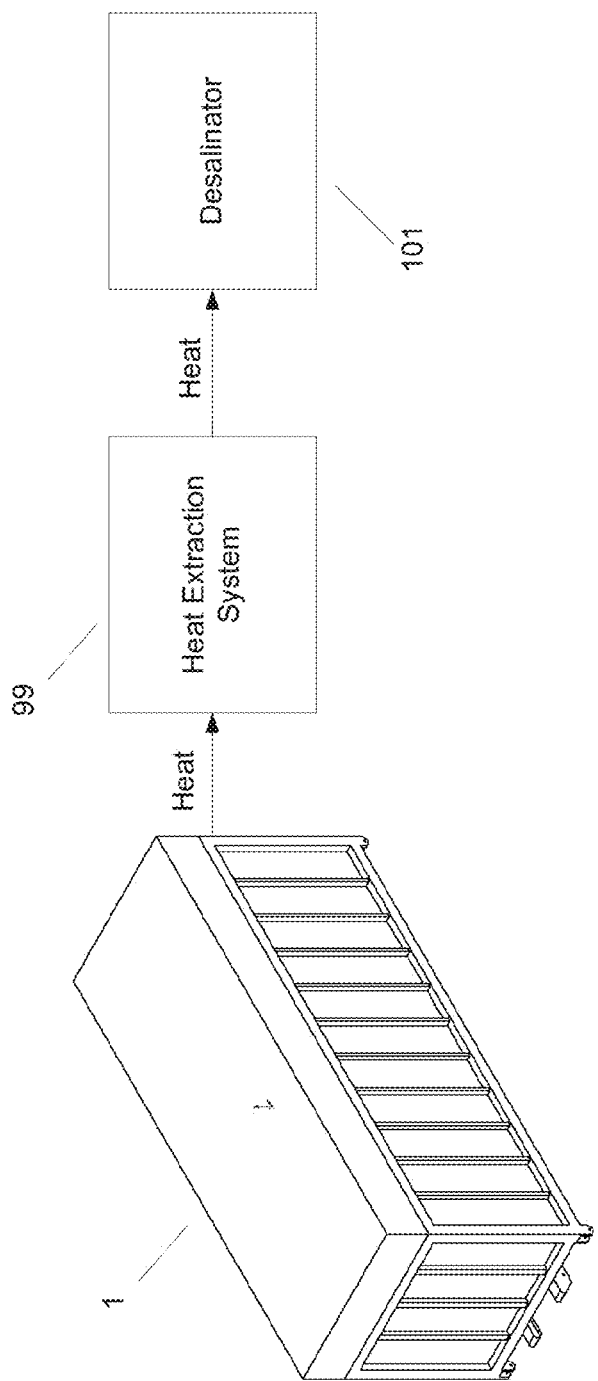
FIG. 19 is a block diagram of a desalination system including an embodiment of the invention as a heat source.

FIG. 19 shows a block diagram of an embodiment of a water desalination or purification plant incorporating an embodiment of the invention. The solar thermal collection system 1 is coupled to a static heat extraction system 99. The heat extraction method may be any useful heat extraction method known in the art, including conducting rods or liquid-filled pipes embedded in the bed of thermal storage material. The heat may then be used by a desalinator 101 to purify water. In another embodiment (which differs from the figure), the water to be purified may be pumped directly through pipes embedded in the thermal storage material, causing it to boil, from whence it may be sent on to distillation for purification.

Any method of desalination or purification may be used. One embodiment may use distillation, wherein the stored heat of bed of thermal storage material may be used to boil the water, which is then re-condensed in a purified form. Another embodiment may use the stored heat to help provide motive power for driving a pump to help provide pressure for reverse osmosis.

Figure 20:
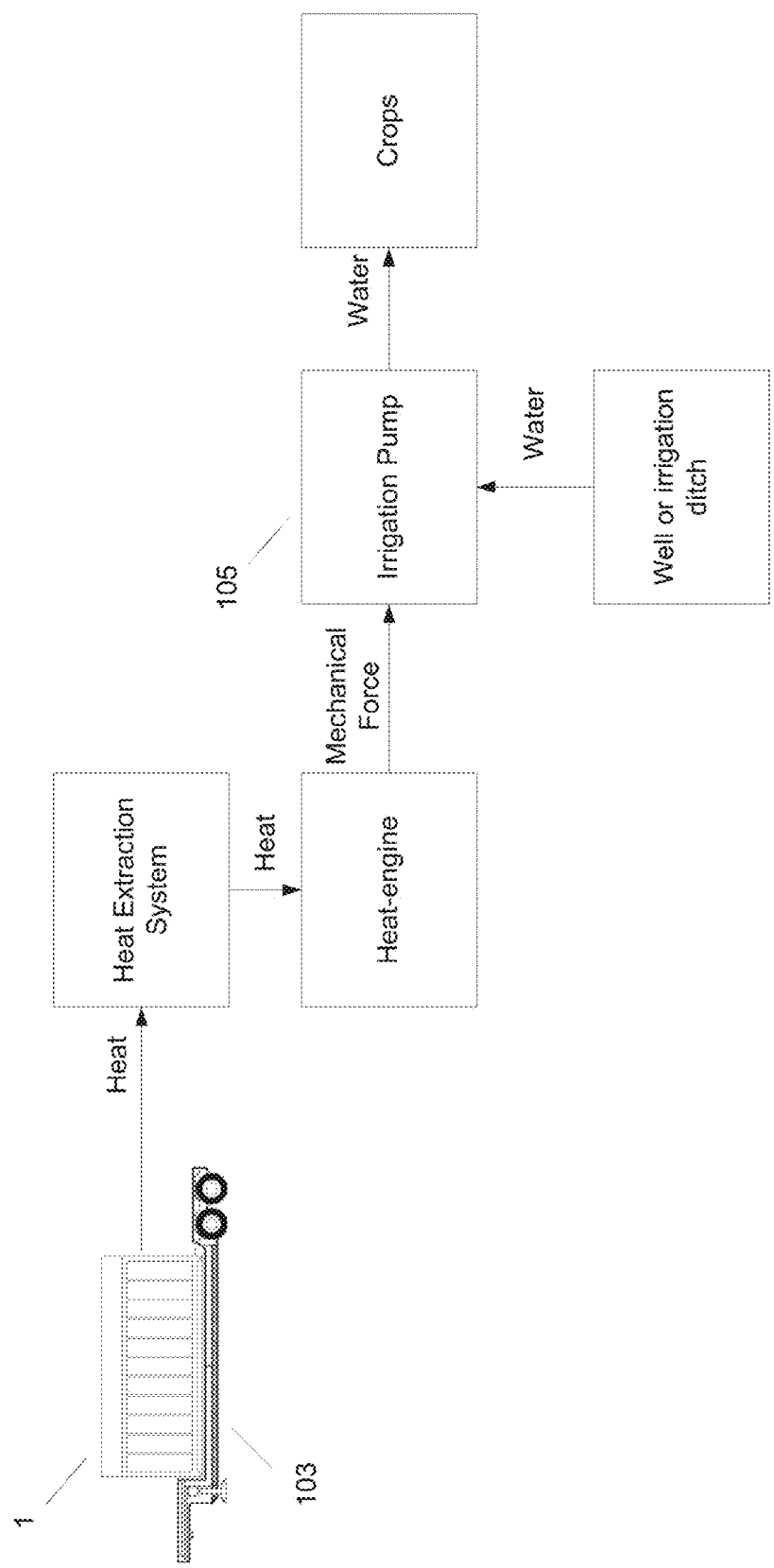
FIG. 20 is a block diagram of an agricultural irrigation system including an embodiment of the invention to provide energy to drive an irrigation pump.

FIG. 20 shows a block diagram of an embodiment of an agricultural irrigation pumping system incorporating an embodiment of the invention. Solar thermal system 1 is shown mounted on a portable platform, such as a truck trailer 103. A heat extraction system and heat engine help to provide motive power for an irrigation pump 105, which helps to deliver water to crops. In one embodiment, units may be placed in fallow fields for charging over a period of time, and then may be transported to the desired irrigation site when pump power is needed. Providing a portable system helps to match the farmer's need to flexibly provide occasional power to a large number of pumping sites, without incurring the cost of many fixed installations.

Figure 21:
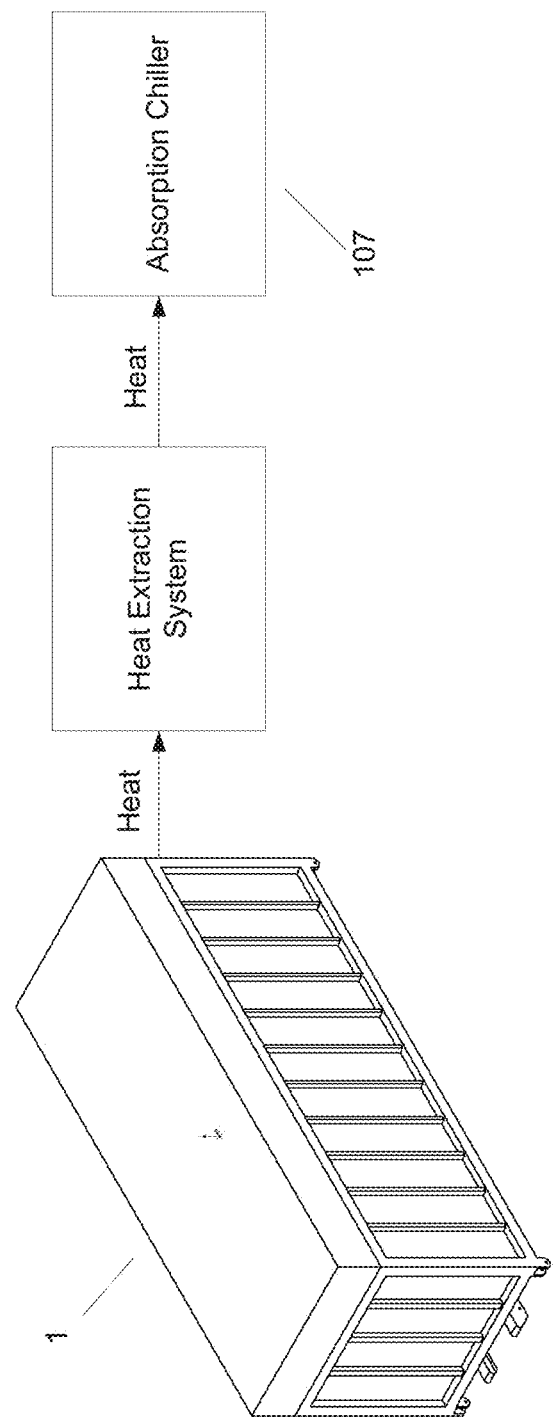
FIG. 21 is a block diagram of a commercial/industrial chiller system including an embodiment of the invention to provide heat to help drive an absorption chiller.

FIG. 21 shows a block diagram of an embodiment of a cooling system comprising an embodiment of the invention coupled to a commercial/industrial air conditioning unit or chiller 107. Typical air conditioning or chiller units that may be used with embodiments of the invention include the absorption and adsorption types.

Figure 22A:
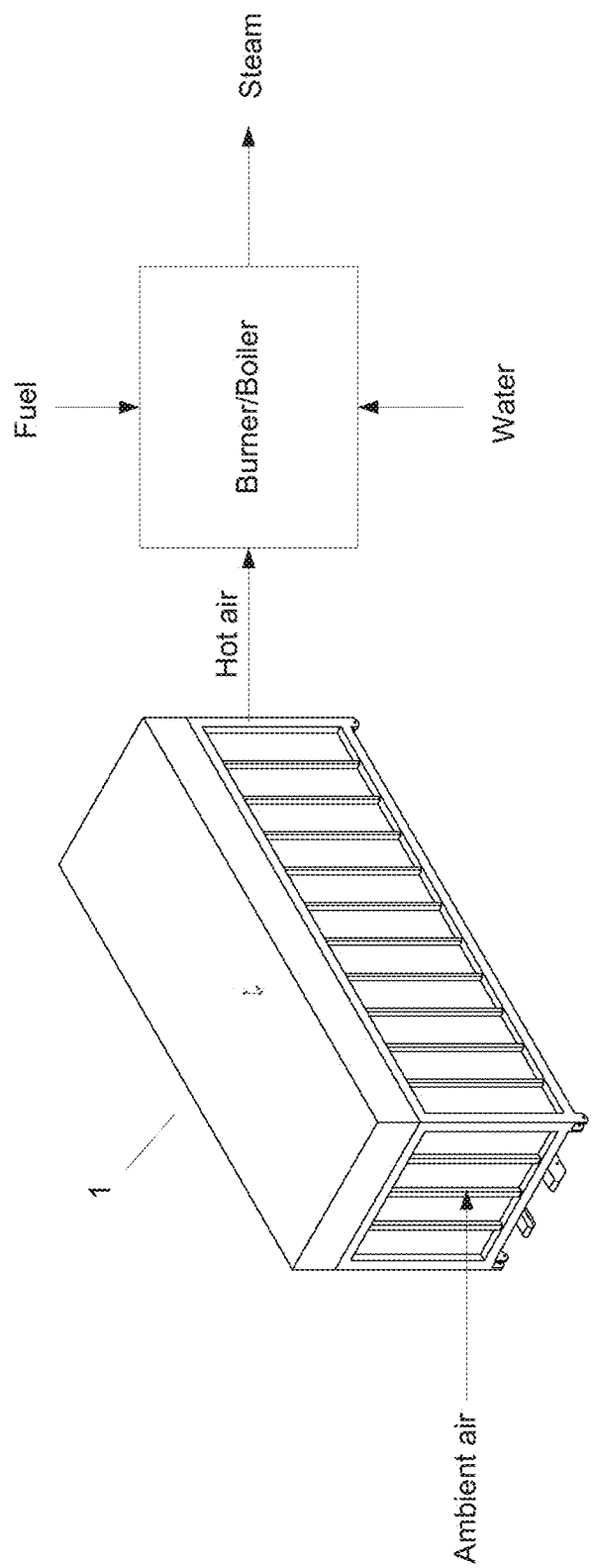
FIG. 22A is a block diagram of a boiler system including an embodiment of the invention to help preheat the boiler's combustion air.
Figure 22B:
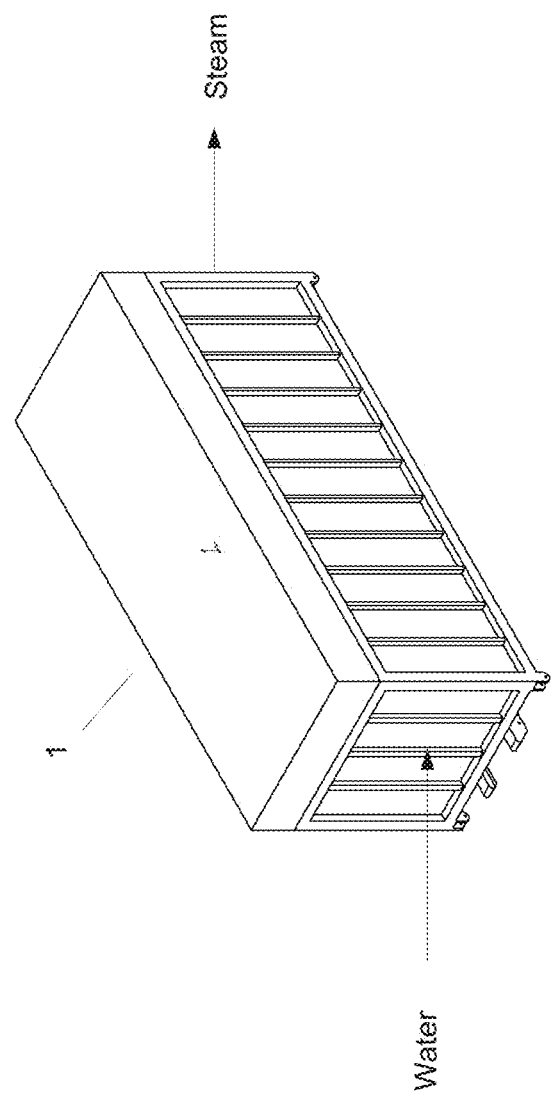
FIG. 22B is a block diagram of a boiler system including an embodiment of the invention wherein water is boiled within the container.

FIGS. 22A and 22B show block diagrams of an embodiment of the invention coupled to an industrial boiler. While any convenient coupling known in the art may be used, one embodiment may preheat combustion air for a standard fossil fuel boiler, while another embodiment may include conventional "fire tube" and/or "water tube" approaches. FIG. 22A shows combustion air preheating. Air intended for combustion may be heated in any convenient fashion; the figure conceives of air being fed through pipes embedded in the thermal storage bed. FIG. 22B shows an embodiment of the invention being used as a water tube boiler, wherein water is passed through pipes which are heated by the stored thermal energy, either in situ within the bed of storage material, or using a heat exchange process which brings heat from within the container to an external pressure vessel where the water is boiled.

A fire tube boiler approach may also be used, wherein the stored heat is used to heat air which is passed through pipes which course through a pool of water which boils.

Figure 23:
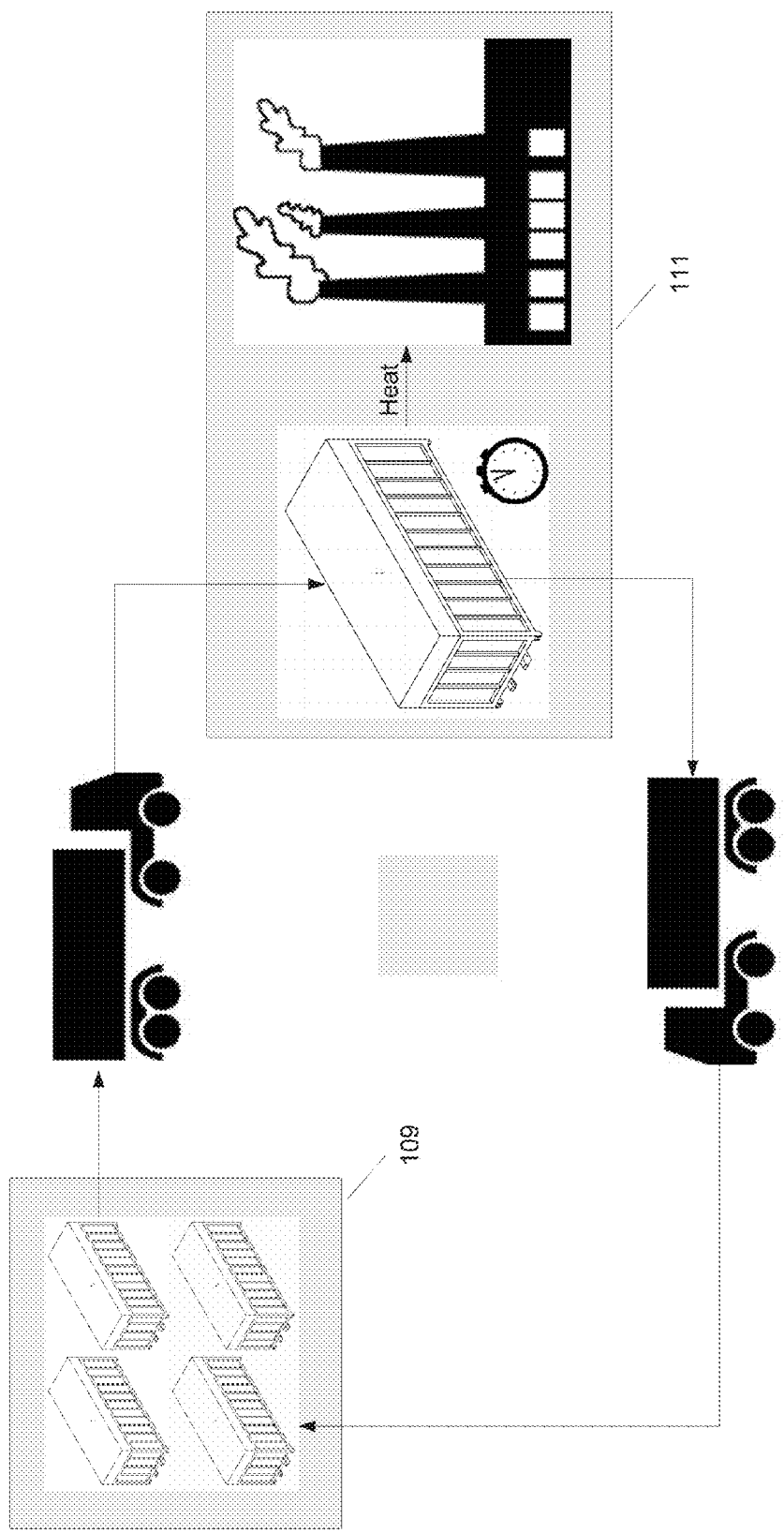
FIG. 23 is a schematic diagram of a method of providing solar energy as a service.

FIG. 23 is a diagram showing an embodiment of a method for providing "solar as a service". In the diagram, two sites are shown—an energy collection site 109 and an energy use site 111. In one embodiment of the method, a service operator owns, leases, or otherwise operates a fleet of energy collectors comprising embodiments of the invention, and places them at one or more energy collection sites 109 for charging. Once a desired level of charge has been achieved, the heated unit may be transported to an energy use site 111. By separating these processes, the rate of energy use can be much higher than the rate of energy collection for an individual container, without requiring large amounts of land (and the concomitant permits) at the energy use site. This helps to permit an end user to be a prodigious user of solar energy without having to have solar collection equipment on site. For example, a given end customer might have 30-40 containers dedicated to his use, but only have one container on site at any given time. Once the container has discharged, the service operator may replace it with a fresh container and take the spent container back to the energy collection site for recharging. The service operator then may bill the end user for the energy used or for hours of container use, or any convenient measurement. Any method of billing may be used, from spot pricing and ad hoc payment to payment in advance and long-term contracts.

In the figure, the end user is illustrated as using the heat directly, but the energy may be converted to any useful form using any useful technique; by way of example, a Stirling engine may be used to provide electricity for the end user.

While the figure illustrates trucks that ship containers, many other embodiments are possible. In one exemplary embodiment, the heated thermal material from containers may be emptied into an insulated oceangoing tanker, which may then transport the heated material to another location where it may be used for energy generation, desalination, or any convenient use.

Figure 24A:
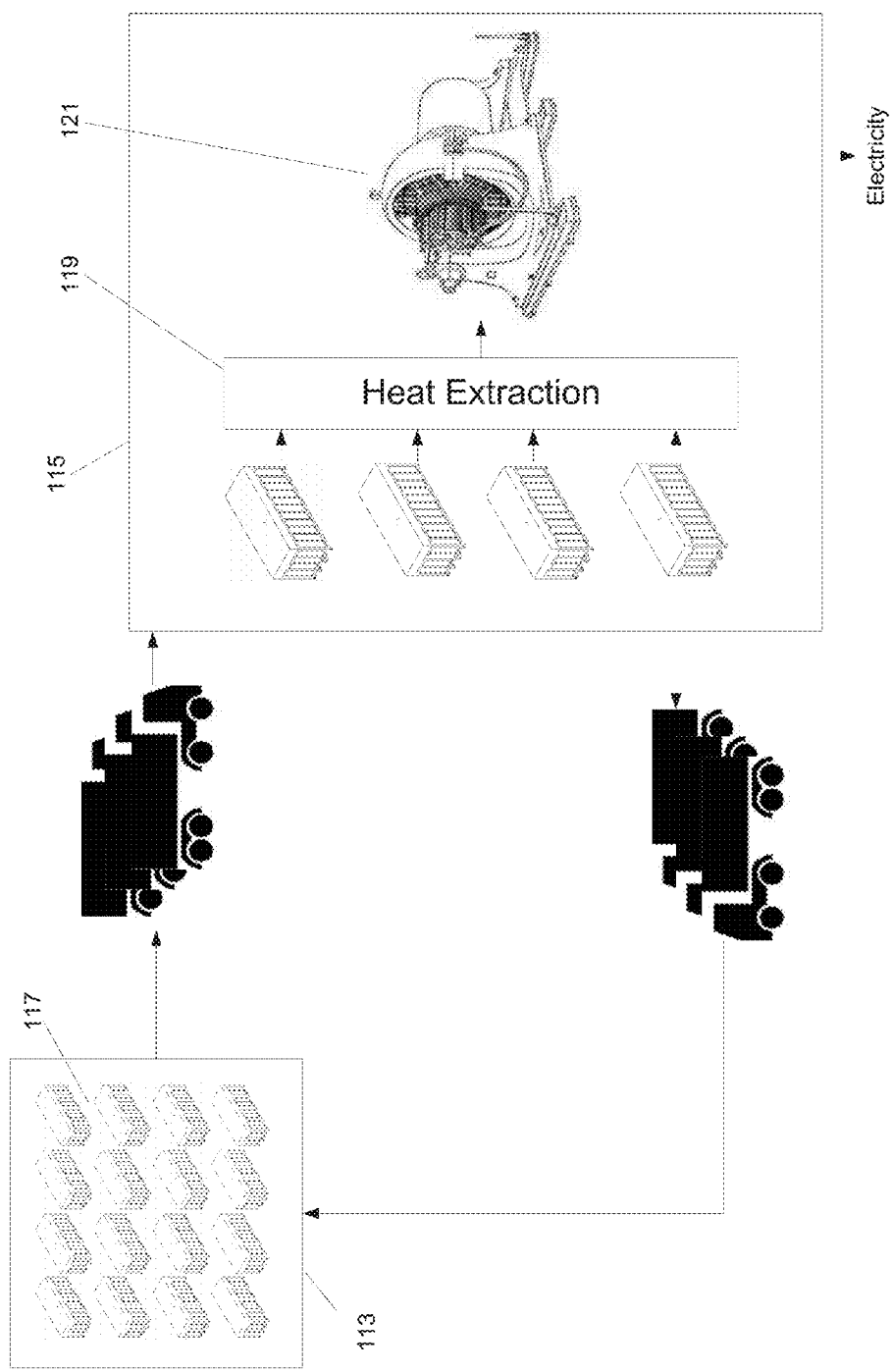
FIG. 24A is a schematic diagram of a utility-scale power plant including a plurality of embodiments of the invention.

FIG. 24A shows a utility-scale power plant incorporating numerous embodiments of container-type collection and storage modules. While the discussion that follows focuses on electricity generation, the principles and concepts described are applicable to any large-scale installation, including large-scale desalination, enhanced oil recovery, or the like.

A utility-scale site may be generally divided into two parts—an energy collection field 113 and an energy extraction site 115. In the energy collection field, an array of containers 117 may be placed, where they collect energy over days or weeks, until ready for energy extraction.

When a container is ready for energy extraction, it may be transported to the energy extraction site of the plant. Any convenient method may be used for energy extraction. One embodiment includes a method to remove the top of the unit—an assembly including the glass cover, optics, and upper layer of insulation—exposing the bed of hot thermal material. The hot material may then be dumped by standard rotary dumping equipment into a heat extraction unit 119.

Any suitable technique for heat extraction may be used. For example, for an embodiment where the material has a powder or grain structure, air may be passed through the material to extract the heat. However, in one useful embodiment, a convenient heat extraction apparatus is a commercially available bulk solids cooler, such as those available from Solex Thermal, that may have been tuned for heat extraction.

The Solex Thermal units pass a fluid (water or air, for example) through an array of plates that come into contact with the hot material as it sifts through the unit. The heated water or air may then be used to generate electricity, with a steam turbine, or a closed cycle gas turbine, or a steam engine or Stirling engine, or any convenient electricity generator 121.

One skilled in the art will appreciate that energy collection and energy extraction are decoupled in the illustrated power plant embodiment. At any given point in time energy collection might be at a maximum while production is at a minimum, or vice versa. By way of example, energy demand may spike in the early evening in the summer, as people return home as the sun is setting. At this point, the power plant operator may choose to begin rapidly moving charged units from the field 113 to the energy generation site 115, to produce large amounts of electricity, often at premium pricing, thus maximizing revenue from the power plant.

One embodiment of the power plant uses a closed cycle gas turbine, since it is capable of taking advantage of the very high temperatures (relative to conventional CSP), and thus higher efficiencies, that may attainable with embodiments of the invention. Another embodiment of the power plant also includes fossil fuel combustion, using the heat from combustion to produce energy either alongside or in combination with the collected heat in the containers.

Figure 24B:
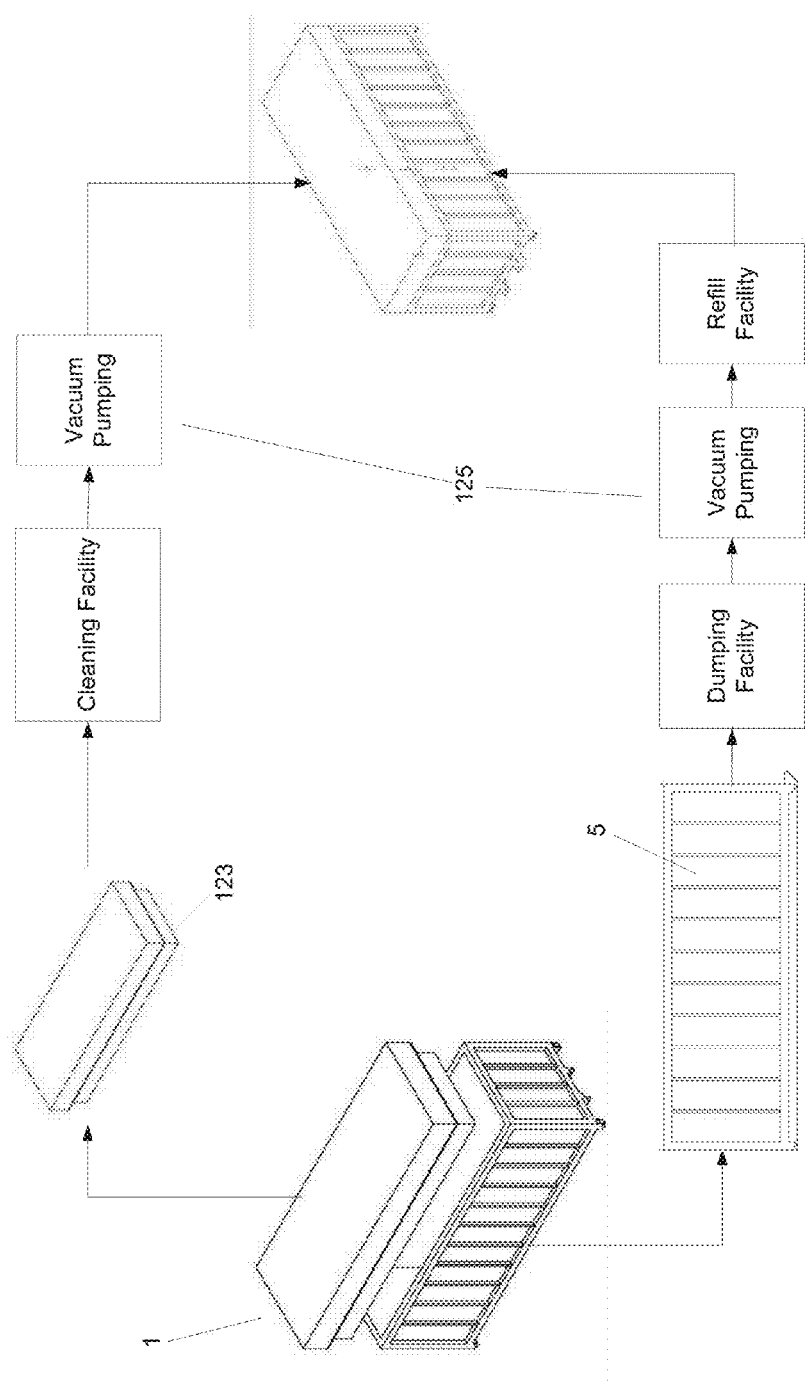
FIG. 24B is a flowchart of processes that may occur at the energy generation site of a utility-scale power plant using an embodiment of the invention.

In one exemplary embodiment, while heat is being extracted from the thermal storage material, the other parts of the unit undergo maintenance processes, as shown in FIG. 24B. As shown, the cover assembly 123 may be sent to a fixed cleaning facility, not unlike a car wash, where the glass cover is cleaned, in order to help improve system efficiency. Compared to conventional CSP plants, the ability to use a fixed cleaning facility is a major advantage, as it allows the use of ordinary water, and also cleaning agents, that are not normally permitted at large sites for environmental reasons. It also allows water to be reclaimed easily, greatly reducing water use. In one embodiment, excess heat from the energy production process can be used to re-purify the cleaning water, thus requiring no external energy for that process.

One exemplary embodiment may also include a maintenance step to help maintain vacuum in the insulating panels, if they are evacuated. The main container and the container top may be sent to pump-down facilities 125, where vent ports on the insulation panels may be connected to vacuum, to extract any undesirable pressure that has built up inside the panels.

Meanwhile, as shown in the figure, the container with its bed of heated thermal storage material may go to a dumping facility, where the material may be dumped for heat extraction. Maintenance operations (such as insulation pumping) may occur on the emptied container, and then it may be refilled with spent thermal storage material.

In one embodiment of power plant operations, spare containers and cover assemblies may be kept near the energy extraction site, and swapped for active units when desired, in order to help allow longer maintenance operations to take place when desired.

Figure 25:
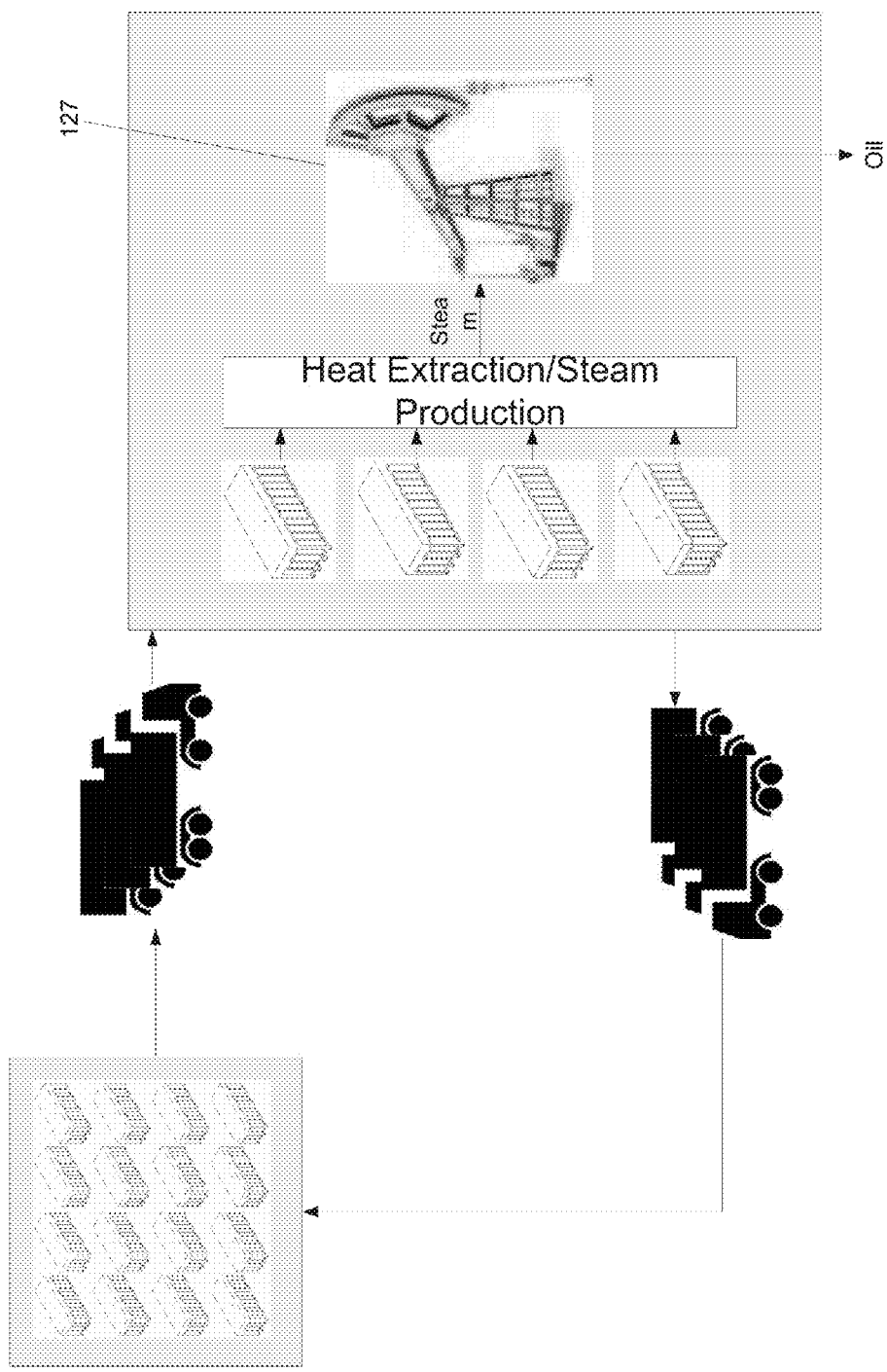
FIG. 25 is a schematic diagram of an enhanced oil recovery plant including a plurality of embodiments of the invention.

FIG. 25 shows an embodiment of an Enhanced Oil Recovery (EOR) operation incorporating an embodiment of the invention. Like with the electricity generating application, large fields of units may be provided which heat up over a period of days or weeks. Once heated to a desired level, units may be transported to a wellhead 127 where they may be used to heat steam for injection into the wellhead as in the figure, or to drive pumps for injection. The portable nature and long-term storage capability of the embodiment helps to make possible installations that run completely on renewable energy 24/7.

One embodiment of an EOR system includes substantially fixed conduit modules.

An embodiment of the invention may use other forms of energy in addition to solar energy in order to help heat the bed of thermal storage material.

One exemplary embodiment provides multiple ways to heat up the bed of thermal storage material. In such an embodiment, grid electricity may be used to help heat the material, either by itself or in concert with solar energy. This may be advantageous in places where grid electricity is very cheap (or even free) at night. Use of nighttime electricity coupled with daytime sunlight provides for a complementary charging pattern for the embodiment.

Similarly, in another embodiment, wind energy may be used to help heat the material, either by itself or in concert with solar energy or other forms of energy. Since windy conditions tend to occur at hours when the solar resource is low, this tends to be another complementary form of energy. In one exemplary embodiment, one or more small wind turbines may be attached to the container. As the turbines spin, they generate heat which is stored in the bed of material. Heat can be generated in any convenient fashion. One embodiment may use a set of vanes spinning in a viscous fluid, which heats up. Another embodiment may use eddy current heating, helping to allow for direct transfer of heat into the energy storage bed without requiring plumbing.

Figure 26:
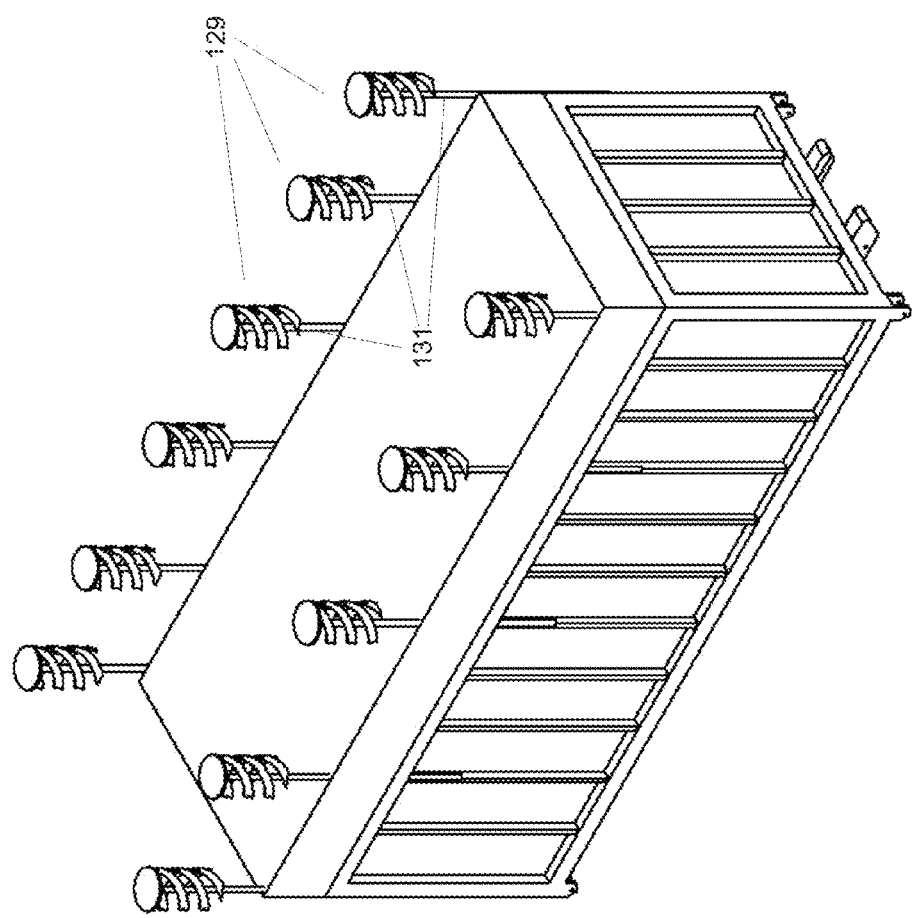
FIG. 26 shows an embodiment including wind turbines.

An embodiment using wind turbines and eddy current (a.k.a. induction) heating is shown in FIG. 26. The wind turbines 129 shown are of the Darrieus type, but any type of wind turbine may be used. As shown in the figure, the turbines cause axles 131 to spin. The axles each may connect via a transmission to a shaft that passes through the insulation layer 7 and spins a magnetic disk. A non-ferrous plate is provided proximal to the magnetic disk. As the disk spins, eddy currents are induced in the non-ferrous plate, which generates heat, which is then conducted into the thermal storage material.

Figure 27:
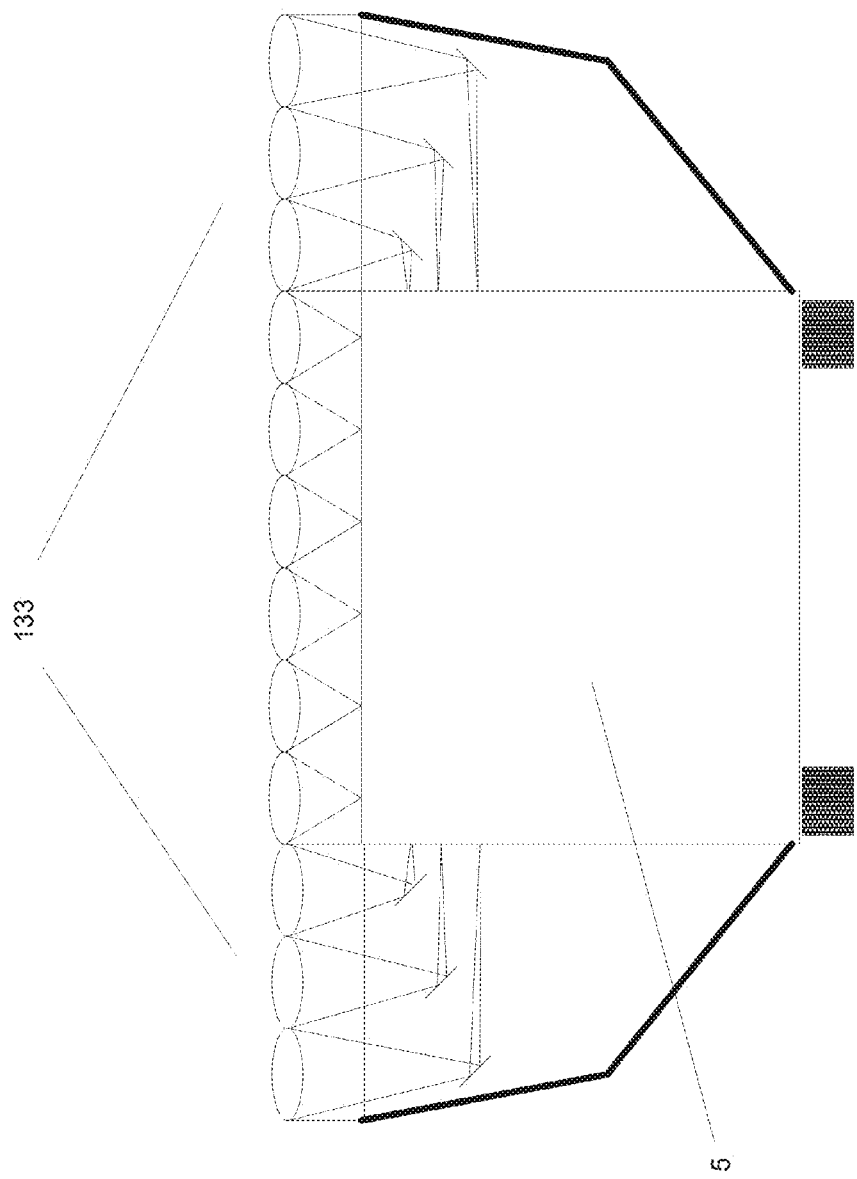
FIG. 27 shows an embodiment including "wings" for additional solar energy collection capacity.

In some installations, it may be desirable to add additional light collecting area to a container, so that it may be heated faster. As shown in FIG. 27, therefore, one embodiment includes an extended collector array 133, along with external light transfer optics to bring the additional concentrated light into the container. These additional collector arrays may be referred to as "wings". The wings may be fixed, or they may be designed so that they fold up for transport, e.g. against the sides of the container.

The discussion thus far has generally considered the use of a lightly customized dumpster as the container 5. However, any convenient container may be used. A typical embodiment may use a standard or lightly customized 40-foot open-top oceangoing shipping container. Another embodiment may use a railroad car, especially a light-duty hopper car. A hopper car is convenient to include in an embodiment, in that there is a wide variety of equipment available off-the-shelf for purchase for handling the cars, dumping them quickly, maintaining them, etc.

Railroad cars are also convenient because they can be placed on railroad track at a power plant and can be easily transported from the field to the plant's energy generation facility. In one embodiment, track may be laid out in a continuous "S" shape. In another embodiment, the track may be laid out in rows with simple switching equipment at the end, and an engine may transit back and forth to the field, retrieving whole rows for energy extraction and returning them when done.

Figure 28:
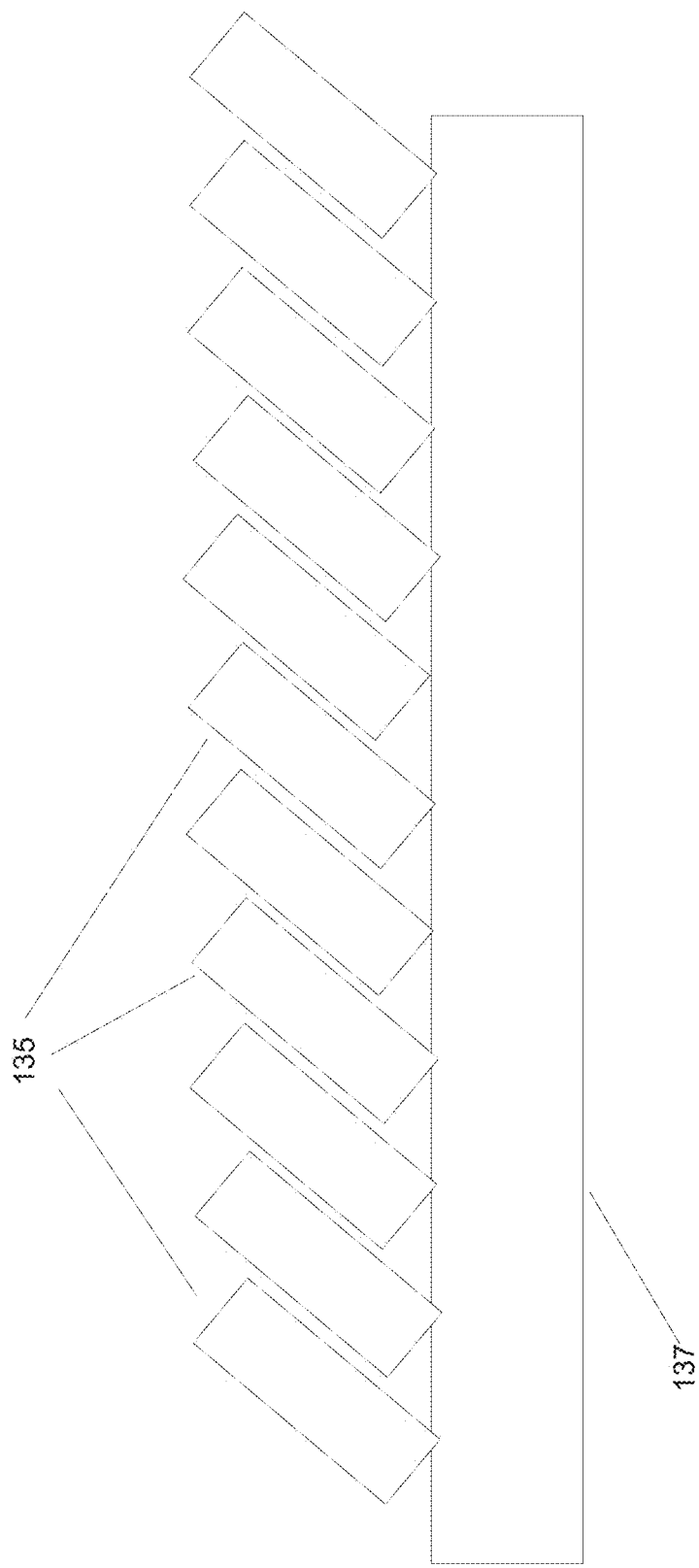
FIG. 28 is a birds-eye view of a plurality of embodiments of the invention arrayed beside a road.
Figure 29:
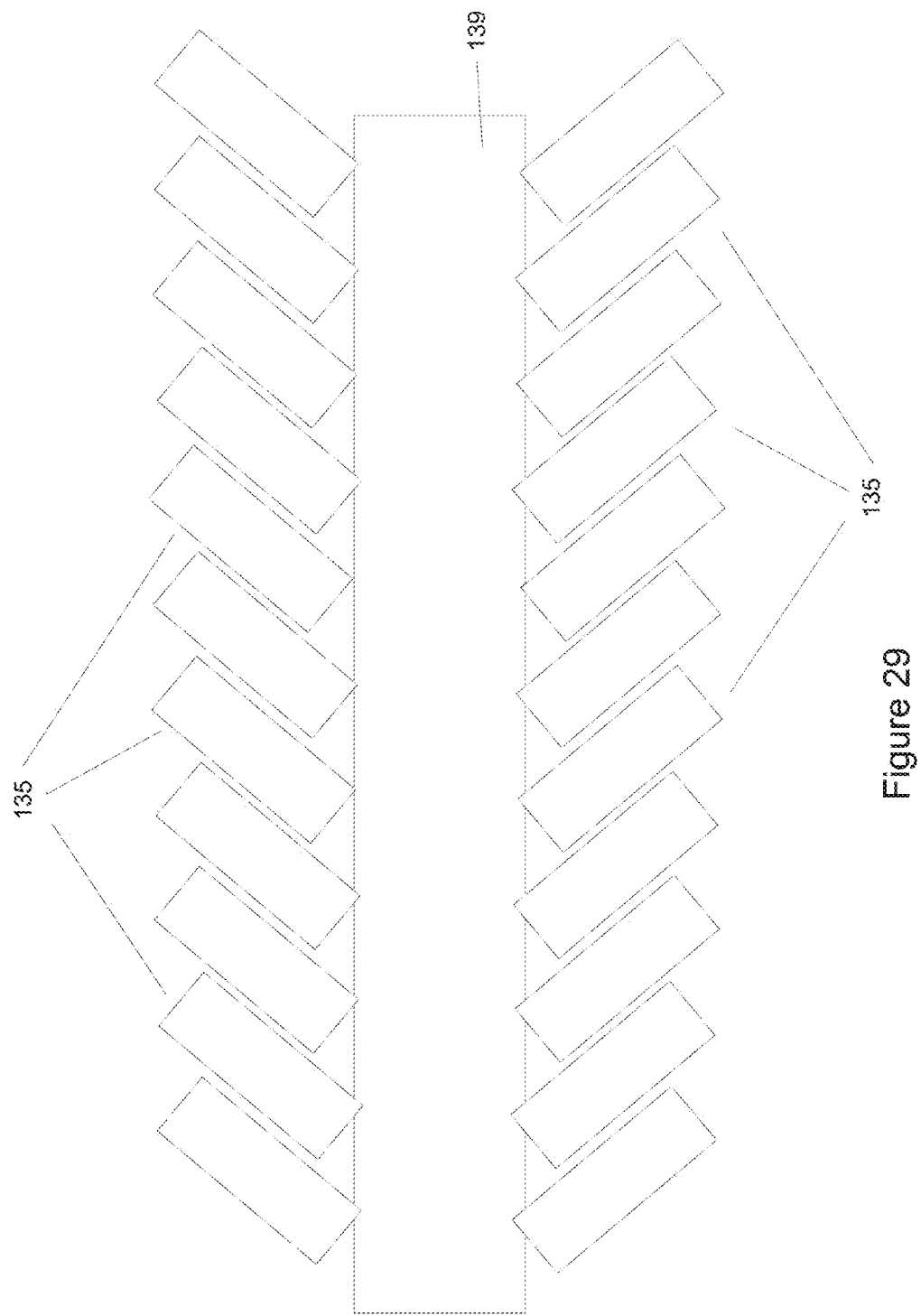
FIG. 29 is another birds-eye view of another plurality of embodiments of the invention arrayed beside a road.

In one embodiment of a power plant, dumpsters or shipping containers may be used as containers. In such an embodiment, one layout of the containers 135 is shown in FIG. 28. This layout provides for easy access for a "tug" truck to drive down road 137 and attach to or load the container. Another embodiment, shown in FIG. 29, allows for a single access road 139 to serve two rows of containers.

Figure 37:
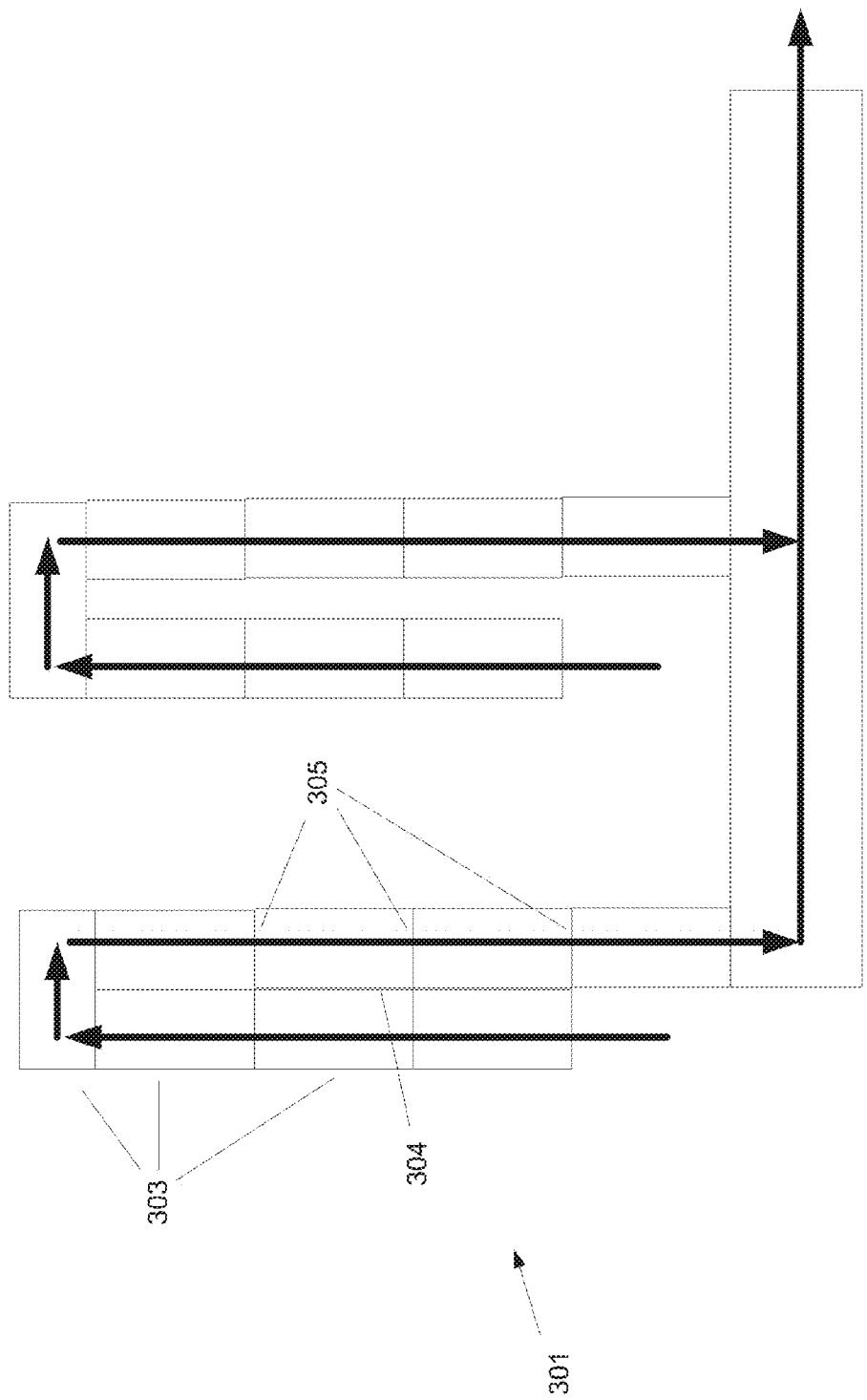
FIG. 37 illustrates a large-scale solid state energy collection and storage system including conduit modules.

FIG. 37 is a top view of an embodiment 301 of a large-scale energy collection and storage system including embodiments of insulated conduit modules 303. The conduits may have any desirable number of openings 305. One practical embodiment provides an opening at each end of each conduit. Conduits may be any useful length and any useful number of conduits may be coupled together. When conduits share a wall, such as wall 304, the wall may be uninsulated without impairing performance.

Figure 38:
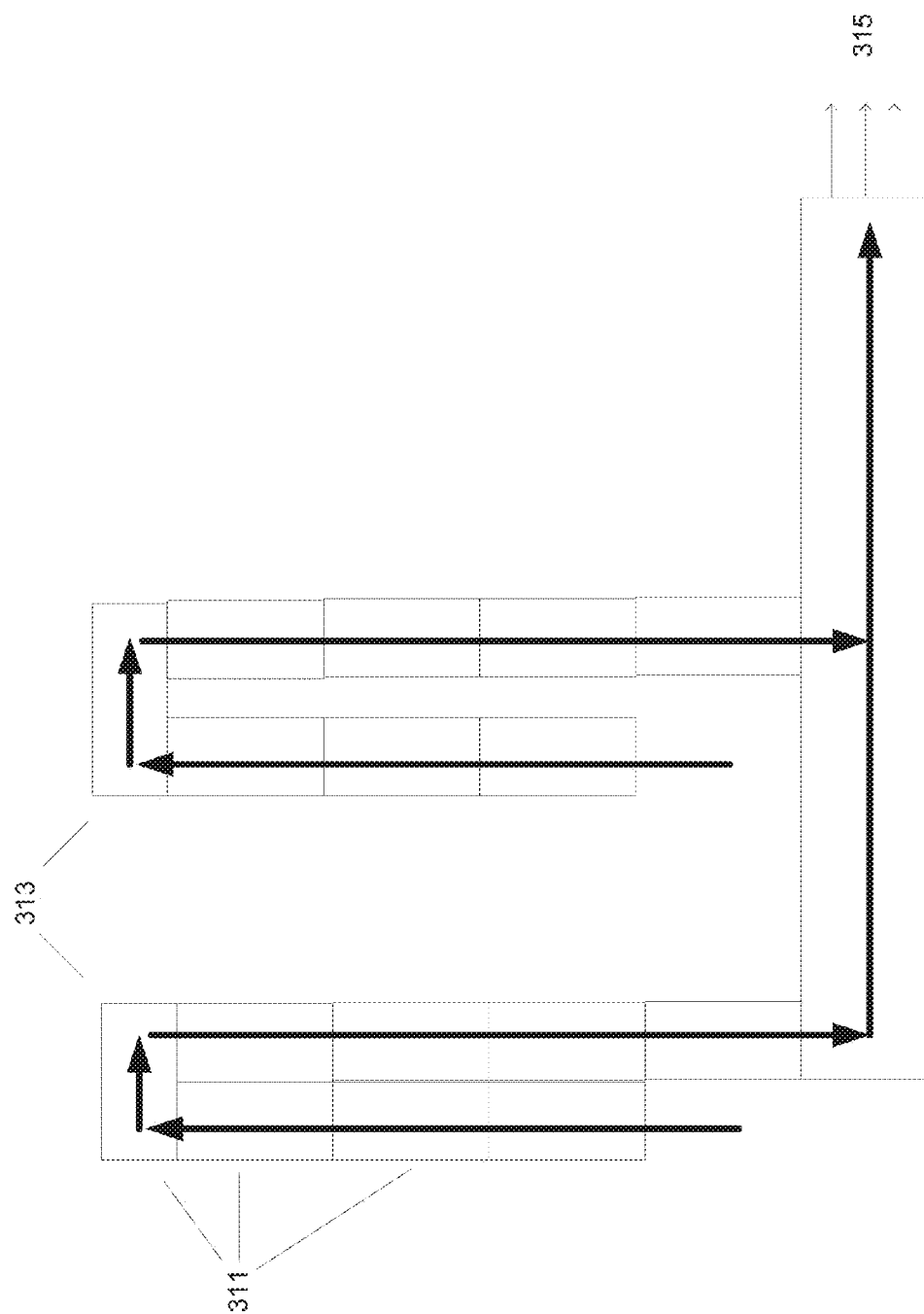
FIG. 38 shows a set of conduit modules coupled together in an open circuit.

In one embodiment, conduits 311 may be coupled together in open circuits 313, as shown in another top view of a large-scale energy collection and storage system in FIG. 38, in which the conduits draw fluid from and exhaust to a reservoir 315, for example, the ambient environment.

Figure 39:
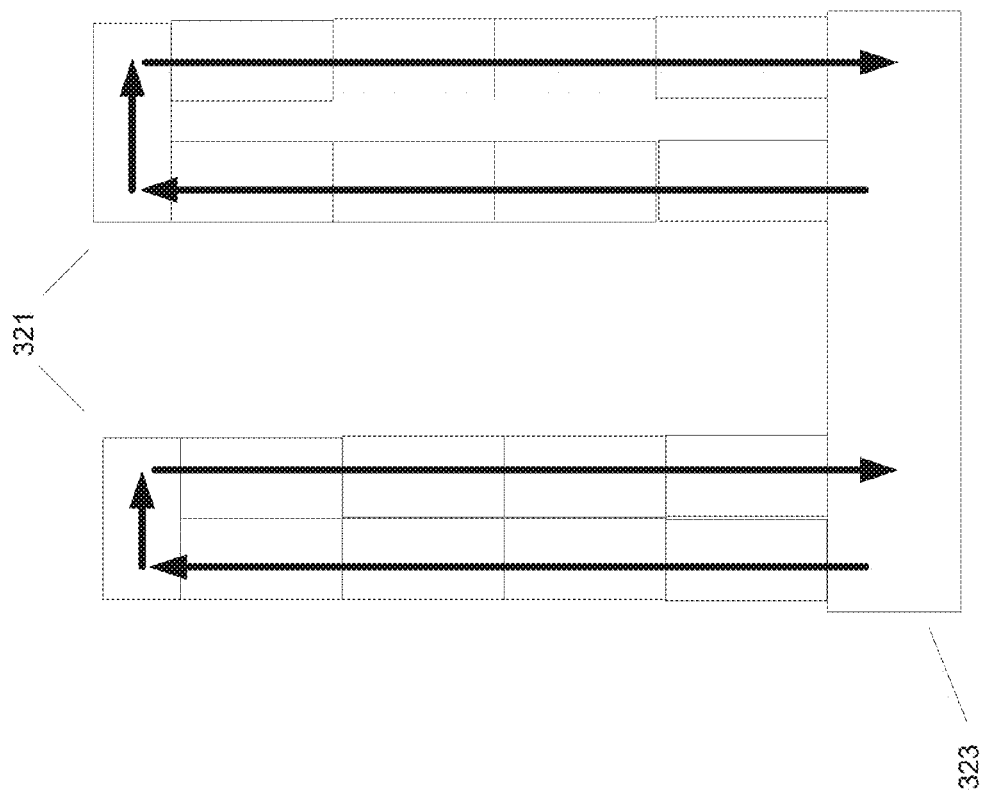
FIG. 39 shows a set of conduit modules coupled into a series of out-and-back circuits, and sharing a common manifold.

In one embodiment, conduits may also be coupled together in closed circuits. FIG. 39 illustrates an embodiment with conduits coupled into a series of out-and-back circuits 321, with the circuits sharing a common manifold 323. In one embodiment, flow of heat transfer fluid through the various circuits may be independently turned on or off and/or modulated as desired to achieve any desired rate of heat extraction from the collection and storage field. The heat extraction strategy may also elect to use certain circuits based on their level of "charge"—that is, how hot they currently are. In one embodiment, heat is extracted from circuits that are fully charged, while fluid flow is blocked through circuits that are not yet fully charged.

Within the manifold, the heated air from the circuits may be used for any convenient purpose. In one embodiment, a heat exchanger is provided in the manifold. In this embodiment, air at ambient pressure flows through the circuits 321, and the heat is transferred into a pressurized working fluid (for example, air at 10 atmospheres) circulating within a heat exchanger in the manifold.

In one embodiment, a circuit is provided where the outbound and inbound portions of the circuit share at least a portion of a common wall, as was shown in FIG. 37. This wall thus becomes an interior wall and may be provided without insulation, as its primary function is to control flow of the heat transfer fluid rather than to prevent heat flow between the two parts of the circuit. Further, this interior wall may provide additional structural support to the cover. One embodiment provides multiple interior walls over a serpentine circuit with many back-and-forth segments, thereby helping to reduce the total amount of insulation required, while increasing the amount of structural support for the cover.

In another embodiment, hybrid circuits may be used, wherein heat transfer fluid is recirculated but fresh heat transfer fluid is also drawn into the system.

In one embodiment, the insulation that comprises the conduits may be structurally self-supporting. In another embodiment, additional structural elements may be used to provide structural strength.

In one embodiment, additional structure and/or texture is provided on the interior walls of the conduit, thereby helping to increase turbulence in the heat transfer fluid as it flows, and helping to increase heat transfer.

In one embodiment, the bed of storage material may be formed or sculpted into shapes to help enhance heat transfer. Said shapes include fins, pins, walls, spikes, poles or the like. The shapes may be formed using any useful technique, including fusing the bed material using heat and/or one or more additives, admixing it with native soil, pouring concrete or cementitious foam, or the like.

In one embodiment, yet another material is provided to improve heat transfer. Such materials may comprise stakes, pins, struts, fins, or any useful shape, comprised of metal, ceramic, or any suitable material.

In one embodiment the other material comprises rocks placed in the conduit and/or partially buried into the ground.

Figure 40:
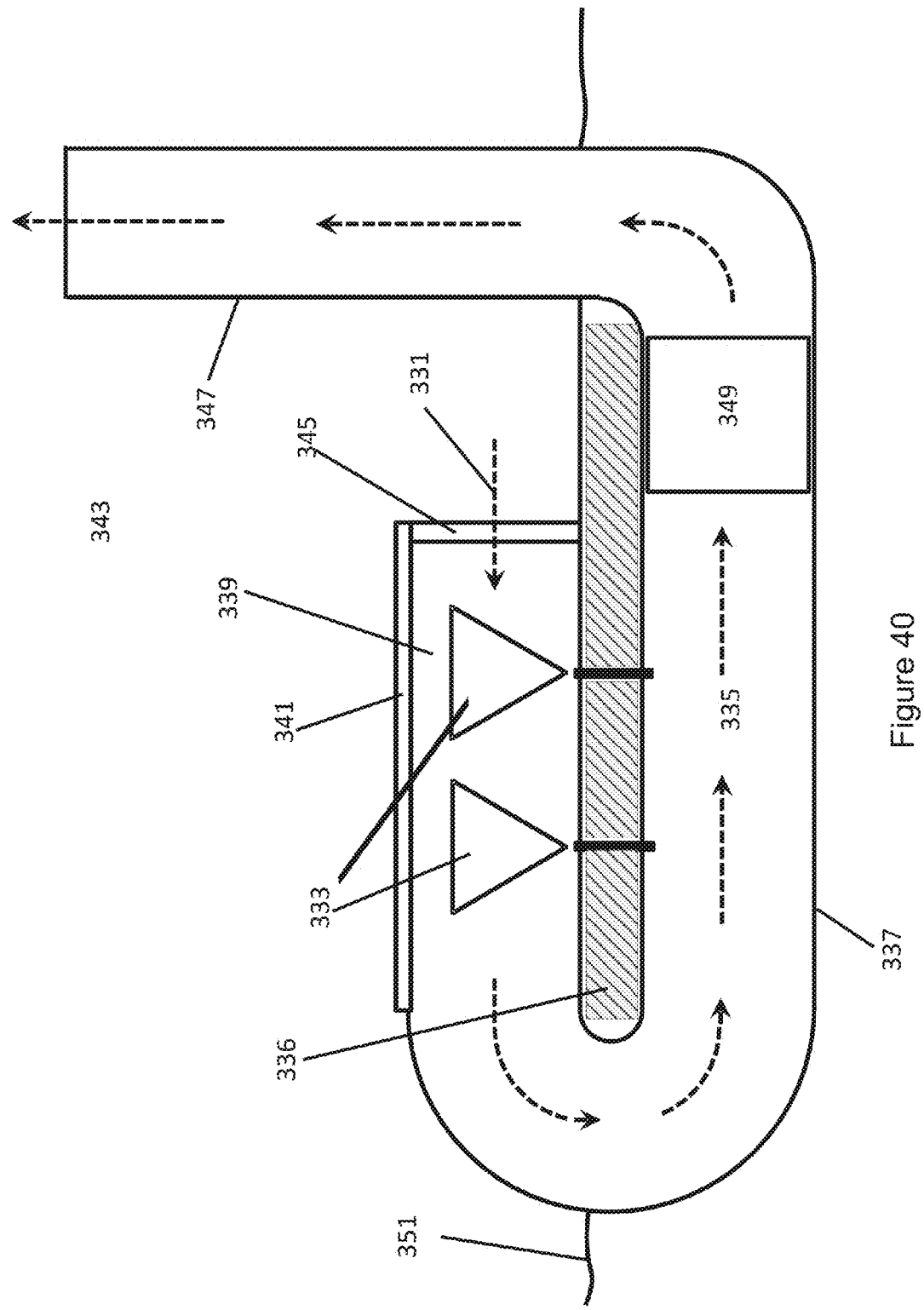
FIG. 40 shows how a heat transfer fluid can be caused to flow over solar collectors prior to entering the interior of a module.

In one embodiment, as shown in FIG. 40, as indicated by arrow 331, heat transfer fluid is caused to flow through and/or over collector(s) 333, outside the insulation, prior to flowing into the interior 335 of conduit(s) 337. This may be especially useful in embodiments that include a transparent cover 341 over the collectors, as the region 339 under the cover but above the insulation 336 will tend to become warm. By flowing the heat transfer fluid through the region under the cover, this heat may be extracted, helping to increase the overall efficiency of the system. In one embodiment, filters are provided to help prevent dust and other contaminants from being carried by the heat transfer fluid into the region under the cover.

FIG. 40 illustrates an embodiment of an open circuit system, with air being drawn in from the environment 343. The air may be pulled in through an air filter 345. The embodiment in FIG. 40 also may include chimney and/or solar updraft tower 347, to enhance natural convection and/or provide for the generation of energy by including a wind turbine 349 in the chimney.

In the embodiment in FIG. 40, the ground 351 comprises at least a portion of the insulated conduit. The soil may be used directly, or it may be treated, fused, or otherwise modified. The soil may perform any useful function. In one embodiment, the soil acts as an insulator. In another embodiment, it participates in energy storage. In yet another embodiment, it performs both functions.

In one embodiment, the conduit is constructed directly on top of the soil.

In another embodiment, a trench is dug in the soil and the conduit is at least partially embedded into the trench.

In one embodiment, the soil is compacted during construction, to help minimize the impact of settling during operation, for example, as moisture evaporates and/or other volatiles evolve out of the soil.

In one embodiment, a preparatory surface, such as concrete, may be provided on the ground.

In one embodiment, the containers or conduits may be placed on legs to help achieve clearance above the ground.

In one embodiment, the ground may form at least a portion of the floor of the conduit.

In one embodiment, the ground may form at least a portion of the walls of the conduit.

In one embodiment, an insulating layer may be provided between the soil and the other parts of the conduit.

In one embodiment, a moisture barrier may be provided to help keep water and flooding out of the conduit.

In one embodiment, local materials may be excavated and emplaced into the conduits or containers to act as energy storage material, to help with heat transfer, or any useful function.

In one embodiment of the invention, the energy extraction system may comprise a wind turbine after the manner of solar updraft towers in the prior art. This embodiment may include embodiments of conduit collection and storage modules, container collection and storage modules, or both.

In one embodiment, a conventional gas turbine may be used instead of a wind turbine.

In one embodiment, a heat exchanger or boiler may be used to transfer heat into a working fluid prior to energy production. By way of example, ambient air from the conduits may be flowed over a heat exchanger to transfer heat into supercritical carbon dioxide. In another example, the particles from a container may be dumped through a Solex Thermal heat exchanger containing pressured air. In a third example, the hot air from the conduits may pass over a series of pressurized water tubes, comprising a water tube boiler.

In one embodiment, the solar collection optics are packed closely together. At some times of the day or year, the sun comes from relatively low angle in the sky. One skilled in the art will appreciate that the collectors tend to block each other's view of the sun. This can reduce the amount of sunlight available to each collector, reducing the peak concentration and thus peak temperature that can be achieved.

In light of this, one embodiment provides a sun tracking scheme that helps to provide high concentration even at low sun angles, by idling some of the collecting apertures while using others actively. When the embodiment idles collecting apertures, it orients them in such a way (conceptually, "sideways") so that they cannot collect light, but they also provide minimal shading of their neighbors. In this way, the active apertures can collect light that otherwise would have been shadowed, helping to achieving higher temperatures.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. As used herein, "types" of systems refers to "kinds" of systems.

All patents, patent applications, and publications cited herein are incorporated by reference as if individually incorporated. Unless otherwise indicated, all parts and percentages are by weight. The foregoing detailed description has been given for clarity of understanding only. No unnecessary limitations are to be understood therefrom. The invention is not limited to the exact details shown and described, for variations obvious to one skilled in the art will be included within the invention defined by the claims, and equivalents thereof.

What is claimed is:

1. A system for receiving, transferring, and storing solar thermal energy, the system comprising:
    a concentrating solar energy collector;
    a transfer conduit;
    a thermal storage material; and
    an insulated container,
    the insulated container containing the thermal storage material,
    the system being configured to track the sun, the transfer conduit being configured to transfer solar energy collected by the solar energy collector to the thermal storage material through an opaque, insulated wall of the insulated container, the transfer conduit including a first end for receiving incident solar energy and a second end proximal to the thermal storage material, wherein the transfer conduit is configured to transmit the incident solar energy substantially losslessly and to radiate the solar energy into the thermal storage material, and wherein the transfer conduit is at least 0.3 cm in diameter.

2. The system of claim 1, wherein the transfer conduit comprises a light transfer optic.

3. The system of claim 1, wherein the thermal storage material is a solid material.

4. The system of claim 1, comprising a capped transfer conduit, wherein the capped transfer conduit comprises a transfer conduit having an input and an output, and a moveable cap capable of covering the input or the output of the transfer conduit.

5. The system of claim 1, wherein the concentrating solar energy collector comprises a Risley prism.

6. The system of claim 1, wherein the concentrating solar energy collector comprises:
a first optical train, comprising:
at least one collecting aperture comprising a refractive element for receiving incoming light from the sun,
a first optical axis aligned with a first axis of rotation,
a second optical axis aligned with a second axis of rotation,
a first fold mirror configured to reflect light along the first optical axis, and
a second fold mirror configured to reflect light along the second optical axis,
wherein:
the first axis of rotation is an axis of rotation of a first subassembly including:
the refractive element, and
the first fold mirror; and
the second axis of rotation is an axis of rotation of a second subassembly including:
the first subassembly, and
the second fold mirror.

7. The system of claim 1, wherein the concentrating solar energy collector, the transfer conduit, and the thermal storage material are all within ten meters of one another.

8. A method of energy collection and storage, the method comprising:
using a concentrating solar energy collector to collect solar energy,
using a light transfer optic to transfer the solar energy through an opaque insulating layer, the light transfer optic comprising a monolithic, narrow path for light, through the opaque insulating layer, wherein the monolithic path is at least 0.3 cm in diameter, and
absorbing and storing the transferred energy in an energy storage medium, the distance between the energy storage medium and the concentrating solar energy collector being less than 10 meters.

9. The method of claim 8, wherein the energy storage medium is a solid.

10. The method of claim 8, performed at the location of a recent natural disaster, further comprising:
providing a readily transportable solar energy collection and storage system,
transporting the transportable system to the location of a recent natural disaster, and
operating the system at the location of the recent natural disaster.

11. A system for receiving, transferring, and storing solar thermal energy, the system comprising:
a concentrating solar energy collector;
a transfer conduit;
a thermal storage material; and
an insulated container,
the insulated container containing the thermal storage material,
the transfer conduit being configured to transfer solar energy collected by the solar energy collector to the thermal storage material through an opaque, insulated wall of the insulated container,
wherein the transfer conduit is further configured to radiate the solar energy towards the thermal storage material,
the transfer conduit including a first end exposed to incident solar energy and a second end opposite the first end and separated from the thermal storage material by a gap,
wherein the transfer conduit is configured to transmit the incident solar energy substantially losslessly and to radiate the solar energy onto the thermal storage material through the gap.

12. A system for receiving, transferring, and storing solar thermal energy, the system comprising:
a concentrating solar energy collector;
a transfer conduit;
a thermal storage material; and
an insulated container,
the insulated container containing the thermal storage material,
the transfer conduit being configured to transfer solar energy collected by the solar energy collector to the thermal storage material through a first insulated wall of the insulated container,
the transfer conduit being a narrow path for light, through the first insulated wall,
wherein the transfer conduit comprises a monolithic rod,
wherein the monolithic rod is at least 0.3 cm in diameter.

13. The system of claim 11, wherein the transfer conduit comprises a hollow tube having a mirror-like reflective interior surface.

14. The system of claim 11, wherein the transfer conduit comprises a transparent rod.

15. The system of claim 1, wherein the transfer conduit is at least 0.5 cm in diameter.

16. The system of claim 6, wherein the concentrating solar energy collector further comprises a second optical train comprising:
a collecting aperture comprising a refractive element for receiving incoming light from the sun,
a first optical axis aligned with the first axis of rotation,
a second optical axis aligned with the second axis of rotation,
a first fold mirror configured to reflect light along the first optical axis, and
a second fold mirror configured to reflect light along the second optical axis.

17. The method of claim 8, wherein the monolithic path is at least 0.5 cm in diameter.

18. The method of claim 10, wherein the readily transportable solar energy collection and storage system comprises an easily transportable container which contains substantially all of the energy storage medium.

19. The method of claim 10, wherein the easily transportable container comprises a dumpster or a shipping container.

20. The system of claim 12, wherein the monolithic rod is at least 0.5 cm in diameter.

21. The system of claim 11, wherein the concentrating solar energy collector comprises a Risley prism.

22. The system of claim 11, wherein the concentrating solar energy collector comprises:
   a first optical train, comprising:
      at least one collecting aperture comprising a refractive element for receiving incoming light from the sun,
      a first optical axis aligned with a first axis of rotation,
      a second optical axis aligned with a second axis of rotation,
      a first fold mirror configured to reflect light along the first optical axis,
      a second fold mirror configured to reflect light along the second optical axis, and
      a third fold mirror configured to reflect light into a transfer conduit,
   wherein:
      the first axis of rotation is an axis of rotation of a first subassembly including:
         the refractive element, and
         the first fold mirror; and
      the second axis of rotation is an axis of rotation of a second subassembly including:
         the first subassembly, and
         the second fold mirror.

23. The system of claim 6, further comprising another concentrating solar energy collector, wherein the two solar energy collectors are articulated by a common linkage and motor.

24. The system of claim 6, wherein the first optical train further comprises a third fold mirror configured to reflect light into a transfer conduit.

25. The system of claim 1, further comprising another concentrating solar energy collector, wherein the two solar energy collectors are at different heights.

26. The method of claim 8, further comprising transporting the heated energy storage medium to an energy use site.

27. The method of claim 8, further comprising absorbing and storing another form of energy, the other form of energy not being solar energy.

* * * * *